(12) United States Patent
Ishihara et al.

(10) Patent No.: US 8,158,281 B2
(45) Date of Patent: *Apr. 17, 2012

(54) ANODE ACTIVE MATERIAL AND BATTERY USING THE SAME

(75) Inventors: Hidetaka Ishihara, Fukushima (JP); Satoshi Mizutani, Fukushima (JP); Hiroshi Inoue, Fukushima (JP)

(73) Assignee: Sony Corporation, Tokyo (JP)

( * ) Notice: Subject to any disclaimer, the term of this patent is extended or adjusted under 35 U.S.C. 154(b) by 62 days.

This patent is subject to a terminal disclaimer.

(21) Appl. No.: 11/268,010

(22) Filed: Nov. 7, 2005

(65) Prior Publication Data

US 2006/0115734 A1    Jun. 1, 2006

(30) Foreign Application Priority Data

Nov. 8, 2004   (JP) ................. P2004-324441

(51) Int. Cl.
| | |
|---|---|
| H01M 4/13 | (2010.01) |
| H01M 4/58 | (2010.01) |
| B01J 21/00 | (2006.01) |
| B01J 23/00 | (2006.01) |
| B01J 23/14 | (2006.01) |

(52) U.S. Cl. ............... 429/218.1; 429/231.5; 429/231.8; 502/100

(58) Field of Classification Search .......... 429/219–221, 429/223–224, 218.1, 232, 326, 231.4, 231.8; 427/122, 126.6; 502/100–355; 29/623.1–623.5
See application file for complete search history.

(56) References Cited

U.S. PATENT DOCUMENTS

| | | | | |
|---|---|---|---|---|
| 4,950,566 | A |  | 8/1990 | Huggins et al. |
| 6,835,332 | B2 | * | 12/2004 | Yamamoto et al. ........ 252/519.1 |
| 6,949,312 | B1 | * | 9/2005 | Kawakami et al. ........ 429/218.1 |
| 2001/0012586 | A1 | * | 8/2001 | Hong et al. ................... 429/223 |
| 2002/0055041 | A1 | * | 5/2002 | Kobayashi et al. ........... 429/221 |
| 2002/0197531 | A1 | * | 12/2002 | Inoue et al. ................... 429/220 |
| 2004/0029004 | A1 | * | 2/2004 | Miyaki ....................... 429/218.1 |
| 2004/0033419 | A1 | * | 2/2004 | Funabiki .................... 429/218.1 |
| 2004/0214087 | A1 | * | 10/2004 | Sheem et al. ............. 429/231.8 |
| 2006/0068292 | A1 | * | 3/2006 | Mizutani et al. ........... 429/231.8 |
| 2006/0099511 | A1 | * | 5/2006 | Fukushima et al. ......... 429/232 |
| 2006/0121348 | A1 | * | 6/2006 | Mizutani et al. .......... 429/218.1 |

FOREIGN PATENT DOCUMENTS

| | | | |
|---|---|---|---|
| JP | 08283701 | A  * | 10/1996 |
| JP | 8315825 | | 11/1996 |
| JP | 2000-311681 | | 7/2000 |
| JP | 2004-185881 | | 2/2004 |
| WO | WO 2004100291 | * | 11/2004 |

OTHER PUBLICATIONS

Machine Translation and Abstract in English of JP 08283701.*
Kim et al., "The Insertion Mechanism of Lithium into Mg$_2$Si Anode Material for Li-Ion Batteries," Journal of the Electrochemical Society. 146 (12) 4401-4405 (1999).
Mao et al., "Mechanically Alloyed Sn-Fe(-C) Powders as Anode Materials for Li-Ion Batteries," Jounral of The Electrochemical Society. 146(2) 414-422 (1999).
Mossbauer effect studies of sputter-deposited tin-cobalt and tin-cobalt-carbon alloys, written by A.D.W. Todd, R.a. Dunlap and J.R. Dahn, published by the Journal of Alloys and Compounds 443 (2007) 114-120.
Combinatorial Study of SN1-xCox (0<x<0.6) and [Sn0.55Co0.45]1-yCy (0<y<0.5) Alloy Negative Electrode Materials for Li-Ion Batteries written by J. R. Dahn, R. E. Mar, and Alyaa Abouzeid, published by the Journal of the Electromechanical Society, 153 (2) A361-A365 (2006).
Tin-Transition Metal-Carbon Systems for Lithium-Ion Battery Negative Electrodes, written by A.D.W. Todd, R. E. Mar and J. R. Dahn, published by the Journal of the Electromechanical Society, 154 (6) A597-A604 (2007).
In Situ AFM Measurements of the Expansion and Contraction of Amorphous Sn-Co-C Films Reacting with Lithium, written by R. B. Lewis, A. Timmons, R. E. Mar, and J. R. Dahn, published by the Journal of the Electromechanical Society, 154 (6) A213-A216 (2007).
Dahn, J.R., R.E. Mar, and Alyaa Abouzeid, "Combinatorial Study of Sn1-xCox(0<x<0.6) and [Sn0.55CO0.45]1-yCy (0<x<0.5) Alloy Negative Electrode Materials for Li-Ion Batteries" Journal fo the Electrochemical Society, 153(2): A361-A365 (2006).
Lewis, R.B., A. Timmons, R.E. Mar, and J.R. Dahn, "In Situ AFM Measurements of the Expansion and Contraction of Amorphous Sn-Co-C Films Reacting with Lithium", Journal of the Electrochemical Society, 154(3): A213-A216 (2007).
Todd, A.D.W., R.A. Dunlap, and J.R. Dahn, "Mossbauer effect studies of sputter-deposited tin-cobalt and tin-cobalt-carbon alloys" Journal of Alloys and Compounds, 443: 114-120 (2007).
Tod, A.D.W., R.E. Mar, and J.R. Dahn, "Tin-Transition Metal-Carbon system for Lithium-Ion Battery Negative Electrodes" Journal of Electrochemical Society, 154(6):A597-A604 (2007).

* cited by examiner

Primary Examiner — Barbara Gilliam
Assistant Examiner — Claire L Roe
(74) Attorney, Agent, or Firm — K&L Gates LLP

(57) ABSTRACT

A battery with a high capacity and superior cycle characteristics and an anode active material used in the battery are provided. An anode includes an anode active material capable of reacting with lithium. The anode active material includes tin, cobalt and carbon as elements, and the carbon content is within a range from 9.9 wt % to 29.7 wt % inclusive, and the ratio of cobalt to the total of tin and cobalt is within a range from 30 wt % to 70 wt % inclusive. Moreover, the size of a crystalline phase of an intermetallic compound of cobalt and tin measured by small-angle X-ray scattering is 10 nm or less. Thereby, while a high capacity is maintained, cycle characteristics can be improved.

22 Claims, 27 Drawing Sheets

PROCESSING TIME

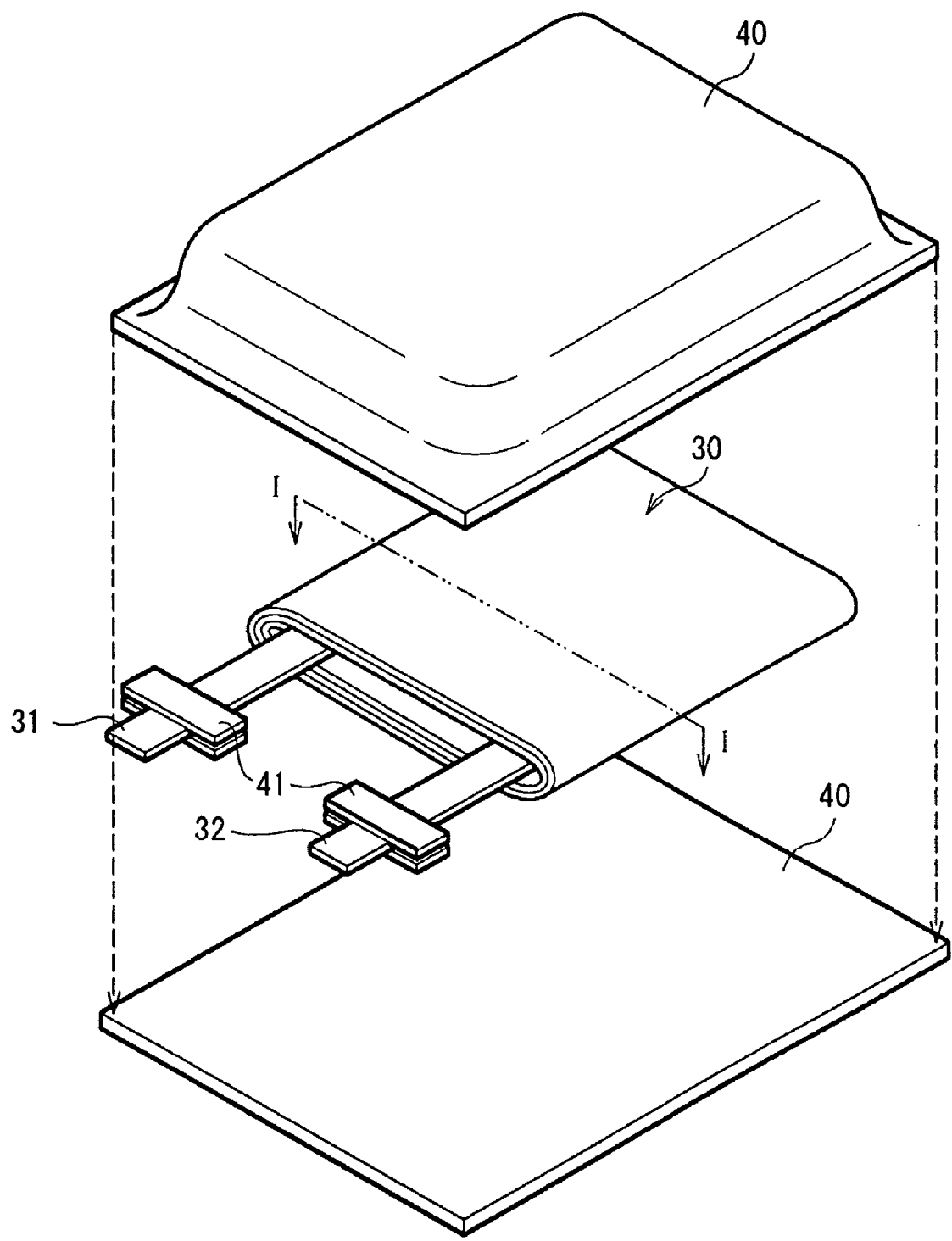
F I G. 5

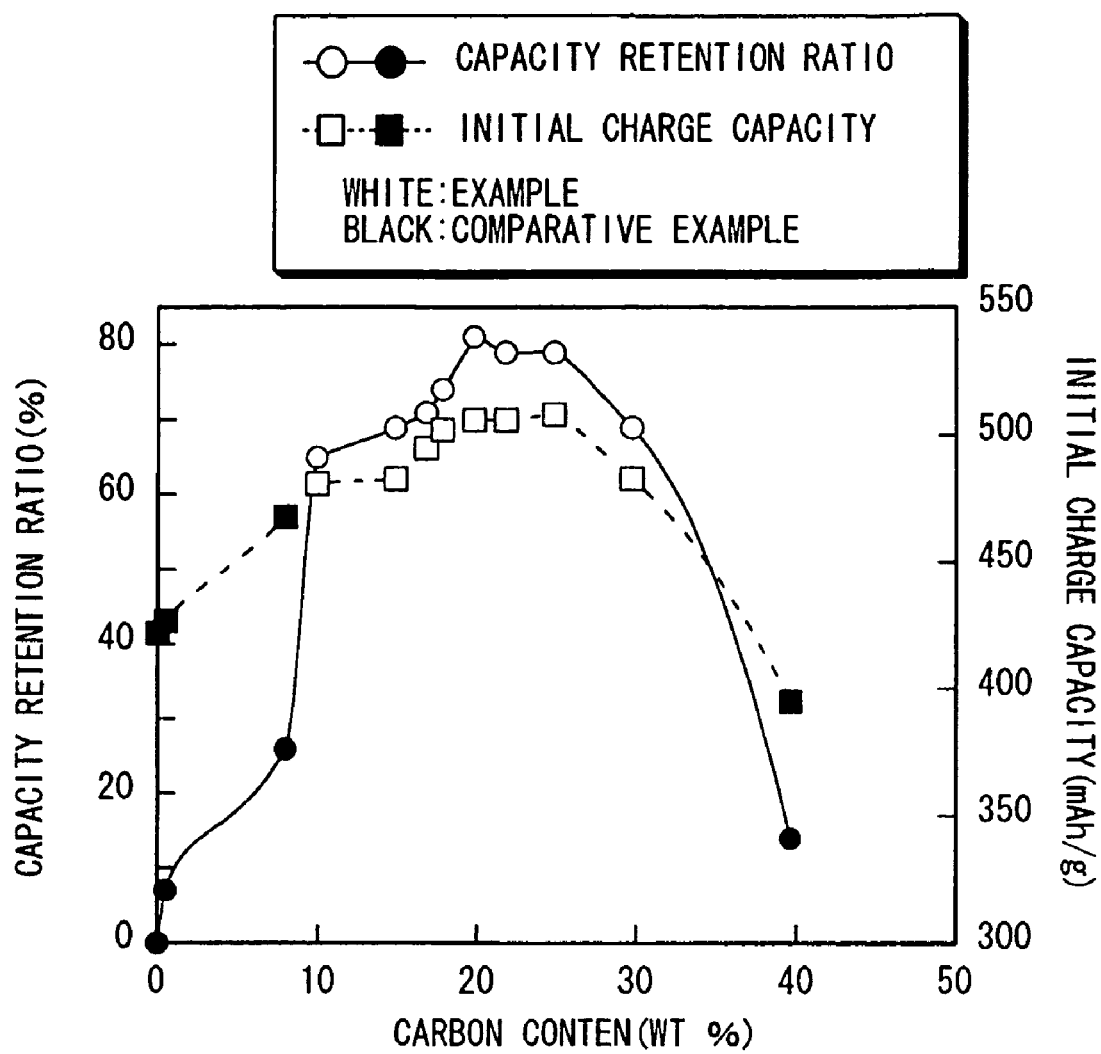
F I G. 20

ANODE ACTIVE MATERIAL AND BATTERY USING THE SAME

CROSS REFERENCES TO RELATED APPLICATIONS

The present invention claims priority to Japanese Patent Application JP 2004-324441 filed in the Japanese Patent Office on Nov. 8, 2004, the entire contents of which being incorporated herein by reference.

BACKGROUND

The present invention relates to an anode active material including tin (Sn), cobalt (Co) and carbon (C) as elements, and a battery using the anode active material.

In recent years, a large number of portable electronic devices such as camcorders, cellular phones and laptop computers have been emerged, and an attempt to reduce the size and the weight of them have been made. Research and development aimed at improving the energy densities of batteries used as portable power sources of the electronic devices, specifically secondary batteries as a key device have been actively promoted. Among the batteries, a nonaqueous electrolyte secondary battery (for example, a lithium-ion secondary battery) can obtain a high energy density, compared to a lead-acid battery and a nickel cadmium battery which are aqueous electrolyte secondary batteries in related arts, so the improvement of the battery has been studied in all quarters.

As an anode active material used in the lithium-ion secondary battery, a carbon material having a relatively high capacity and superior cycle characteristics such as non-graphitizable carbon or graphite is broadly used. However, in consideration of a recent demand for a higher capacity, a further increase in the capacity of the carbon material presents a challenge.

In such a background, a technique of achieving a higher capacity of a carbon material through selecting a material to be carbonized and forming conditions has been developed (for example, refer to Japanese Unexamined Patent Application Publication No. H8-315825). However, when such a carbon material is used, an anode has a discharge potential vs. lithium (Li) of 0.8 V to 1.0 V, and when a battery includes the carbon material, the discharge voltage of the battery is reduced, so a significant improvement in the energy density of the battery can be hardly expected. Moreover, there is a disadvantage that the hysteresis in the shape of a charge-discharge curve is large, thereby energy efficiency in each charge-discharge cycle is low.

On the other hand, as an anode with a higher capacity than the carbon material, an alloy material which is formed through electrochemically alloying some kind of metal with lithium and has a property of being reversibly produced and decomposed has been researched. For example, an anode with a high capacity using a Li—Al alloy or a Sn alloy has been developed, and an anode with a high capacity including a Si alloy has been developed (for example, refer to U.S. Pat. No. 4,950,566).

However, the Li—Al alloy, the Sn alloy or the Si alloy has a big disadvantage that the cycle characteristics are extremely poor, because the alloy expands or shrinks according to charge and discharge, so every time a charge-discharge cycle is repeated, the anode is pulverized.

Therefore, as a technique for improving the cycle characteristics, a technique of alloying tin or silicon (Si) for preventing the expansion of tin or silicon has been considered, and, for example, alloying iron and tin has been proposed (for example, refer to "Journal of The Electrochemical Society", 1999, No. 146, p. 414). Moreover, $Mg_2Si$ or the like has been proposed (for example, refer to "Journal of The Electrochemical Society", 1999, No. 146, p. 4401).

However, even if these techniques are used, an effect of improving the cycle characteristics are not sufficient, so the fact is that advantages of an anode with a high capacity which includes an alloy material are not fully used.

SUMMARY

In view of the foregoing, it is desirable to provide a battery with a high capacity and superior cycle characteristics and an anode active material used in the battery.

According to an embodiment of the present invention, there is provided an anode active material including tin, cobalt and carbon as elements, wherein the carbon content is within a range from 9.9 wt % to 29.7 wt % inclusive, and the ratio of cobalt to the total of tin and cobalt is within a range from 30 wt % to 70 wt % inclusive, and the size of a crystalline phase of an intermetallic compound of cobalt and tin measured by small-angle X-ray scattering is 10 nm or less.

According to an embodiment of the present invention, there is provided a battery including a cathode, an anode and an electrolyte wherein the anode includes an anode active material which includes tin, cobalt and carbon as elements, and the carbon content in the anode active material is within a range from 9.9 wt % to 29.7 wt % inclusive, and the ratio of cobalt to the total of tin and cobalt is within a range from 30 wt % to 70 wt % inclusive, and the size of a crystalline phase of an intermetallic compound of cobalt and tin measured by small-angle X-ray scattering is 10 nm or less.

In the anode active material according to the embodiment of the invention, tin is included as an element, so a high capacity can be obtained. Moreover, cobalt is included as an element, and the ratio of cobalt to the total of tin and cobalt is within a range from 30 wt % to 70 wt % inclusive, so while a high capacity is maintained, cycle characteristics can be improved. Further, as an element, carbon is included, and the carbon content is within a range from 9.9 wt % to 29.7 wt % inclusive, so the cycle characteristics can be further improved. In addition, the size of the crystalline phase of an intermetallic compound of cobalt and tin measured by small-angle X-ray scattering is 10 nm or less, so the cycle characteristics can be further improved. Therefore, in the battery according to the embodiment of the invention which uses the anode active material, a high capacity and superior cycle characteristics can be obtained.

Moreover, when the anode active material includes silicon as an element, a higher capacity can be obtained.

Further, when the anode active material includes at least one kind selected from the group consisting of indium (In), niobium (Nb), germanium (Ge), titanium (Ti), molybdenum (Mo), aluminum (Al), phosphorus (P), gallium (Ga) and bismuth(Bi) as an element, and the content of them is 14.9 wt % or less, the cycle characteristics can be further improved, and in particular, when the content is 2.4 wt % or more, a high effect can be obtained.

Additional features and advantages are described herein, and will be apparent from, the following Detailed Description and the figures.

BRIEF DESCRIPTION OF THE FIGURES

FIG. 5 is an exploded perspective view of another secondary battery according to the embodiment of the invention.

FIG. 20 is another plot showing a relationship between the carbon content in an anode active material, a capacity retention ratio and an initial charge capacity.

DETAILED DESCRIPTION

Figure 1:
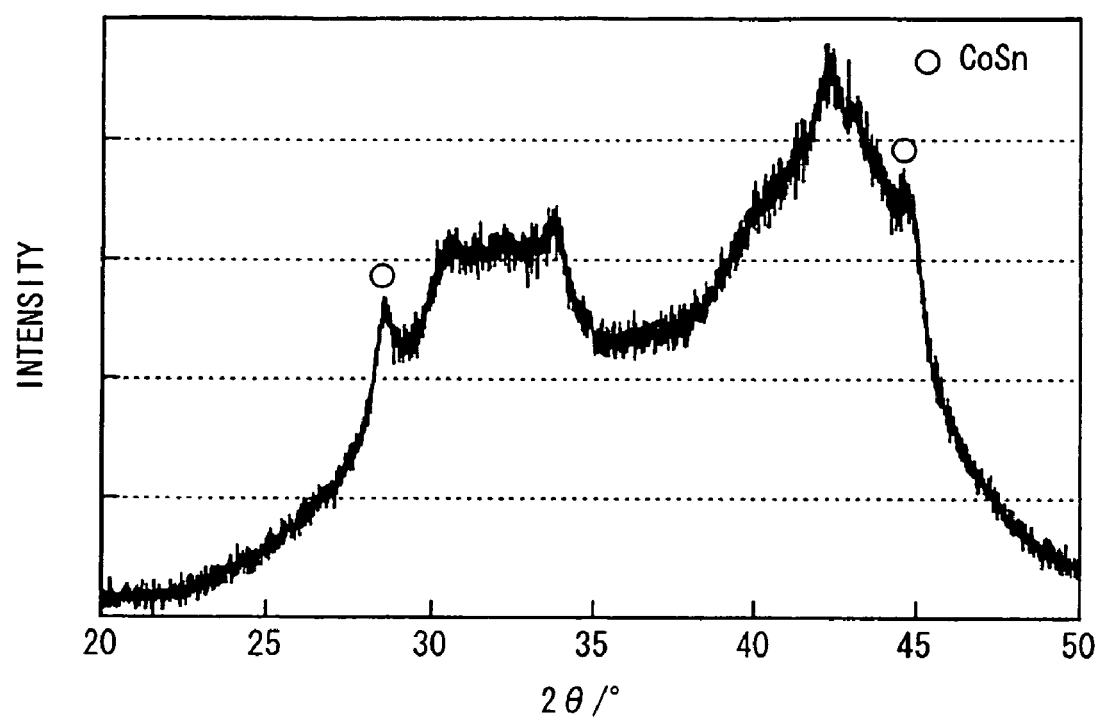
FIG. 1 is an example of an X-ray diffraction chart of an anode active material according to an embodiment of the invention.
Figure 2A:
FIGS. 2A through 2D are examples of SEM photos of the anode active material according to the embodiment of the invention.
Figure 2B:
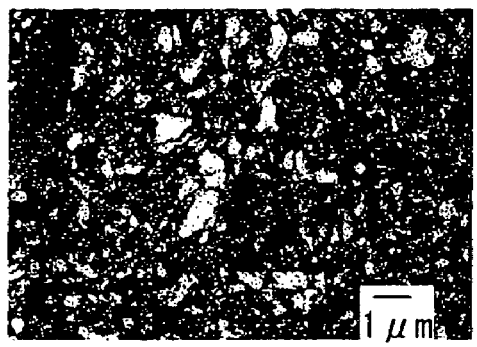
Figure 2C:
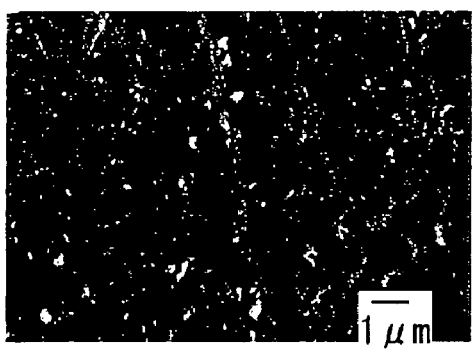
Figure 2D:
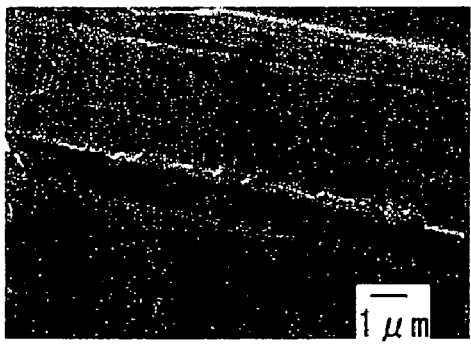

A preferred embodiment will be described in detail below referring to the accompanying drawings.

An anode active material according to an embodiment of the invention can react with lithium or the like, and includes tin and cobalt as elements. It is because the amount of reaction of tin with lithium per unit weight is high, so a high capacity can be obtained. Moreover, it is because when only the simple substance of tin is included, it is difficult to obtain sufficient cycle characteristics; however, when cobalt is also included, cycle characteristics can be improved.

The cobalt content is preferably within a range from 30 wt % to 70 wt % inclusive in a ratio of cobalt to the total of tin and cobalt, and more preferably within a range from 30 wt % to 60 wt % inclusive. When the ratio is lower than the range, the cobalt content declines, thereby it is difficult to obtain sufficient cycle characteristics. On the other hand, when the ratio is higher than the range, the tin content declines, thereby it is difficult to obtain a higher capacity than that of an anode material in a related art, for example, a carbon material.

The anode active material includes carbon as an element in addition to tin and cobalt, because when carbon is included, the cycle characteristics can be further improved. The carbon content is preferably within a range from 9.9 wt % to 29.7 wt % inclusive, more preferably within a range from 14.9 wt % to 29.7 wt % inclusive, and more preferably within a range from 16.8 wt % to 24.8 wt % inclusive, because a higher effect can be obtained within the range.

In some cases, the anode active material preferably includes silicon as an element in addition to the above elements, because the amount of reaction of silicon with lithium per unit weight is high, and the capacity can be further improved. The silicon content is preferably within a range from 0.5 wt % to 7.9 wt % inclusive, because when the content is lower than the range, an effect of improving the capacity is not sufficient, and when the content is higher than the range, the anode active material is pulverized according to charge and discharge, thereby the cycle characteristics decline.

In some cases, the anode active material preferably further includes at least one kind selected from the group consisting of indium, niobium, germanium, titanium, molybdenum, aluminum, phosphorus, gallium and bismuth as an element, because the cycle characteristics can be further improved. The content of the elements is preferably within a range of 14.9 wt % or less, more preferably within a range from 2.4 wt % to 14.9 wt % inclusive, and more preferably within a range from 4.0 wt % to 12.9 wt % inclusive, because when the content is lower than the range, it is difficult to obtain a sufficient effect, and when the content is higher than the range, the tin content declines, thereby it is difficult to obtain a sufficient capacity, and the cycle characteristics decline. These elements may be included together with silicon.

Moreover, the anode active material has a low crystalline phase or an amorphous phase. The phase is a reactive phase which can react with lithium or the like, and by the reactive phase, superior cycle characteristics can be obtained. The half-width of a diffraction peak of the phase obtained by X-ray diffraction is preferably 1.0° or more at a diffraction angle of $2\theta$ in the case where a CuKα ray is used as a specific X ray and the sweep rate is 1°/min. It is because lithium or the like can be inserted or extracted more smoothly, and the reactivity with an electrolyte can be further reduced.

Whether the diffraction peak obtained by X-ray diffraction corresponds to a reactive phase capable of reacting with lithium or the like or not can be easily determined through comparing between X-ray diffraction charts before and after an electrochemical reaction with lithium or the like. For example, when the position of the diffraction peak before the electrochemical reaction with lithium or the like is different from the position of the diffraction peak after the electrochemical reaction, the diffraction peak corresponds to a reactive phase capable of reacting with lithium or the like. In the anode active material, the diffraction peak of a low crystalline reactive phase or an amorphous reactive phase can be detected within a range of, for example, $2\theta=20°$ to $50°$. The low crystalline reactive phase or the amorphous reactive phase includes, for example, each of the above-described elements, and it is considered that the reactive phase is changed to be low crystalline or amorphous mainly by carbon.

The anode active material may have a phase including the simple substance or a part of each element in addition to the low crystalline phase or the amorphous phase.

Among these phases, the average size of a crystalline phase of an intermetallic compound of tin and cobalt, for example, a crystalline phase of CoSn measured by small-angle X-ray scattering is preferably 10 nm or less, because the cycle characteristics can be further improved.

FIG. 1 shows an example of an X-ray diffraction chart of the anode active material. The average size of the crystalline phase of the intermetallic compound of tin and cobalt can be measured by small-angle X-ray scattering on the basis of, for example, a peak of CoSn.

Moreover, the average size of a crystallite of CoSn calculated by the X-ray diffraction analysis is preferably 10 nm or less, for example, in the case where a CuKα ray is used as a specific X ray, because the cycle characteristics can be further improved.

In the anode active material, at least a part of carbon which is an element is preferably bonded to a metal element or a metalloid element which is another element. It is considered that a decline in the cycle characteristics results from cohesion or crystallization of tin or the like, and when carbon is bonded to another element, such cohesion or crystallization can be prevented.

As a measuring method for checking the bonding state of an element, for example, X-ray photoelectron spectroscopy (XPS) is used. The XPS is a method which determines the composition of the element and the bonding state of the element in an area a few nm away from a surface of a test sample through applying a soft X ray (in a commercially available apparatus, an Al—Kα ray or a Mg—Kα ray is used) to the surface of the test sample to measure the kinetic energy of a photoelectron emitted from the surface of the test sample.

The binding energy of an inner orbital electron of an element is changed in relation to a charge density on the element in a first order approximation. For example, when the charge density of a carbon element is reduced due to an interaction with an element near the carbon element, outer electrons such as 2p electrons are reduced, so 1s electrons of the carbon element are strongly bound by a shell. In other words, when the charge density of the element is reduced, the binding energy increases. In the XPS, when the binding energy increases, the peak is shifted to a higher energy region.

In the XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. Moreover, in the case of surface contamination carbon, the peak is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the anode active material is observed in a region lower than 284.5 eV, at least a part of carbon included in the anode active material is bonded to the metal element or the metalloid element which is another element.

In the XPS measurement on the anode active material, in the case where the surface of the anode active material is covered with surface contamination carbon, it is preferable to lightly sputter the surface with an argon ion gun attached to an XPS apparatus. Moreover, in the case where the anode active material to be measured is placed in an anode of a battery as will be described later, after the battery is disassembled to take out the anode, the anode may be cleaned with a volatile solvent such as dimethyl carbonate so that a low volatile solvent and an electrolyte salt on the surface of the anode can be removed. Such sampling is preferably performed in an inert atmosphere.

Moreover, in the XPS measurement, for example, the peak of C1s is used to correct the energy axis of a spectrum. In general, surface contamination carbon exists on a material surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the anode active material, so the peak of the surface contamination carbon and the peak of the carbon in the anode active material are separated through analyzing the waveform through the use of, for example, commercially available software. In the analysis of the waveform, the position of a main peak existing on a lowest binding energy side is used as an energy reference (284.8 eV).

The anode active material can be formed, for example, through mixing the materials of all elements to form a mixture, melting the mixture in an electric furnace, a high-frequency induction furnace, an arc furnace or the like, and then solidifying the mixture, or through various atomization methods such as gas atomization or water atomization, various roll methods, or methods using a mechanochemical reaction such as a mechanical alloying method or a mechanical milling method. The anode active material is preferably formed through the method using a mechanochemical reaction among them, because the anode active material can have a low crystalline structure or an amorphous structure. In this method, for example, a planetary ball mill can be used.

Moreover, when the anode active material is formed, for example, the average size of the crystalline phase can be changed through changing process conditions as necessary. FIG. 2A through 2D show examples of SEM photos showing sectional views of the anode active material. The anode active material is manufactured by a method using a mechanochemical reaction, and the size of the crystalline phase is gradually decreased in order of 2A, 2B, 2C and 2D with the lapse of processing time.

As the materials of the anode active material, a mixture of the simple substances of elements may be used; however, an alloy of a part of the elements except for carbon is preferably used. It is because when carbon is added to such an alloy to synthesize the anode active material through a mechanical alloying method, the anode active material can have a low crystalline structure or an amorphous structure, and a reaction time can be reduced. The form of the material may be powder or a lump.

As carbon used as a material, one kind or two or more kinds of carbon materials such as non-graphitizable carbon, graphitizable carbon, graphite, kinds of pyrolytic carbon, kinds of coke, kinds of glass-like carbon, a fired high molecular weight organic compound body, activated carbon, and carbon black can be used. Among them, kinds of coke include pitch coke, needle coke, petroleum coke and so on, and the sintered high molecular weight organic compound body is a high molecular weight compound such as a phenolic resin, a furan resin or the like which is carbonized through firing at an adequate temperature. The carbon materials may have a fiber form, a spherical form, a particle form or a scale form.

For example, the anode active material is used in a secondary battery as will be described below.

(First Battery)

Figure 3:
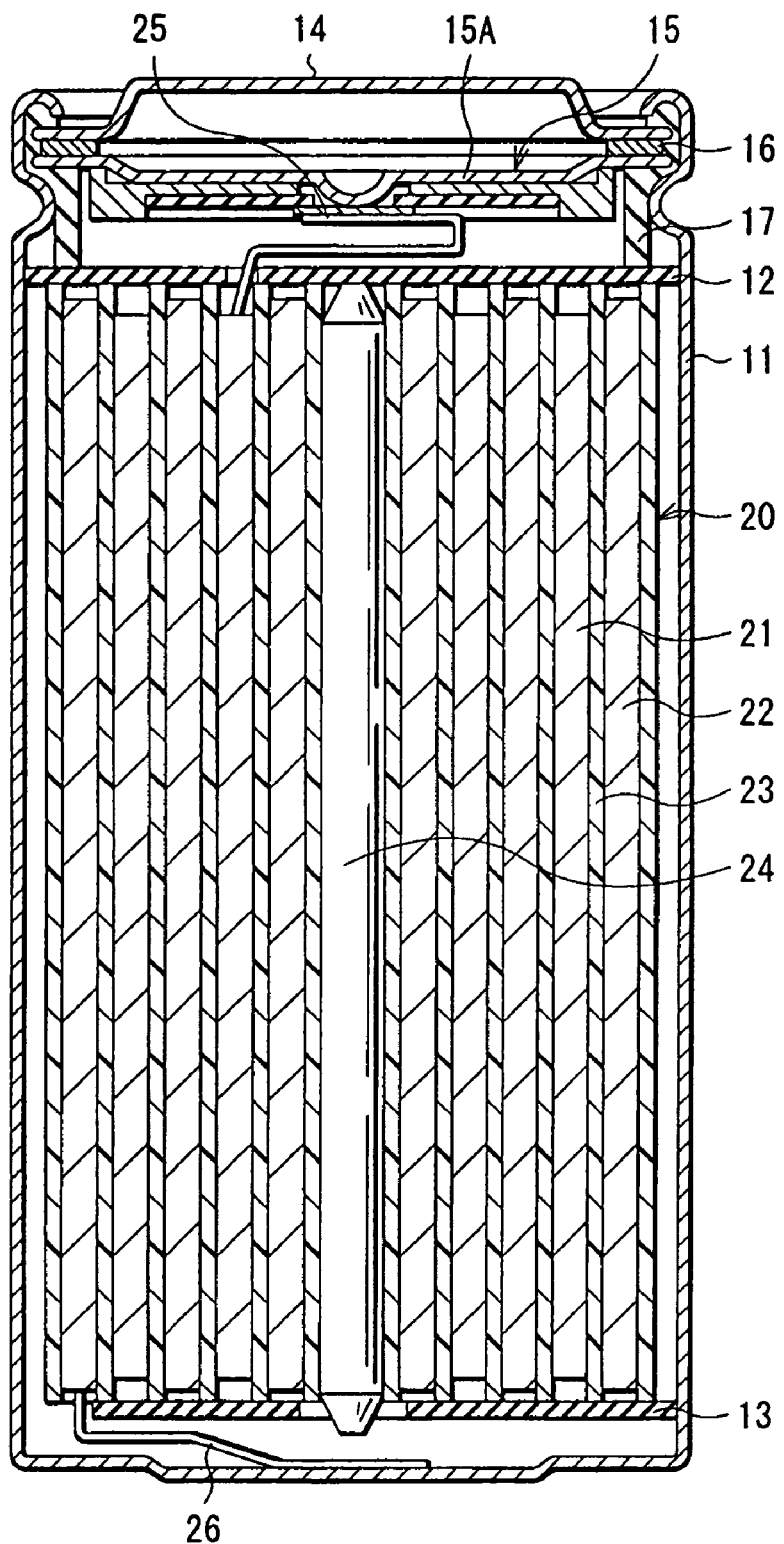
FIG. 3 is a sectional view of a secondary battery according to an embodiment of the invention.

FIG. 3 shows a sectional view of a first secondary battery. The secondary battery is a so-called cylindrical type, and comprises a spirally wound electrode body 20 including a strip-shaped cathode 21 and a strip-shaped anode 22 which are laminated and spirally wound with a separator 23 in between in a substantially hollow cylindrical-shaped battery can 11. The battery can 11 is made of, for example, nickel-plated iron. An end portion of the battery can 11 is closed, and the other end portion thereof is opened. An electrolyte solution which is a liquid electrolyte is injected into the battery can 11 to impregnate the separator 23 with the electrolyte solution. Moreover, a pair of insulating plates 12 and 13 are disposed so that the spirally wound electrode body 20 is sandwiched therebetween in a direction perpendicular to a peripheral winding surface.

In the opened end portion of the battery can 11, a battery cover 14 and, a safety valve mechanism 15 and a positive temperature coefficient device (PTC device) 16 disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to higher than a certain extent due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance, thereby resulting in preventing abnormal heat generation by a large current. The gasket 17 is made of, for example, an insulating material, and its surface is coated with asphalt.

For example, the spirally wound electrode body 20 is wound around a center pin 24. A cathode lead 25 made of aluminum or the like is connected to the cathode 21 of the spirally wound electrode body 20, and an anode lead 26 made of nickel (Ni) or the like is connected to the anode 22. The cathode lead 25 is welded to the safety valve mechanism 15 so as to be electrically connected to the battery cover 14, and the anode lead 26 is welded and electrically connected to the battery can 11.

Figure 4:
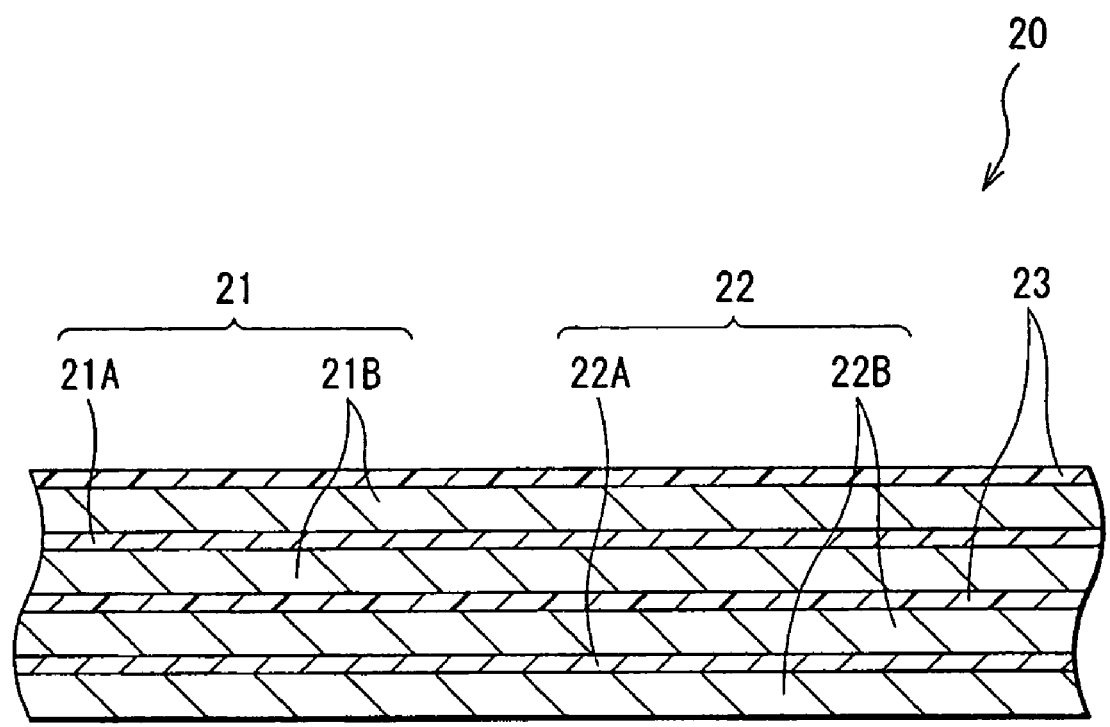
FIG. 4 is an enlarged sectional view of a part of a spirally wound electrode body in the secondary battery shown in FIG. 3.

FIG. 4 shows an enlarged view of a part of the spirally wound electrode body 20 shown in FIG. 4. The cathode 21 has, for example, a structure in which a cathode active material layer 21B is disposed on either side or both sides of a cathode current collector 21A having a pair of surfaces facing each other. The cathode current collector 21A is made of, for example, metal foil such as aluminum foil. The cathode active material layer 21B includes, for example, one kind or two or more kinds of cathode active materials capable of inserting and extracting lithium, and if necessary, an electrical conductor such as a carbon material and a binder such as polyvinylidene fluoride.

As the cathode active material capable of inserting and extracting lithium, for example, a metal sulfide or a metal oxide including no lithium such as titanium sulfide ($TiS_2$), molybdenum sulfide ($MOS_2$), niobium selenide ($NbSe_2$) or vanadium oxide ($V_2O_5$) is used. Moreover, a lithium complex oxide including $Li_xMO_2$ (where M indicates one or more kinds of transition metals, and the value of x depends upon a charge-discharge state of the battery, and is generally within a range of $0.05 \leq x \leq 1.10$) as a main component is used. As a transition metal M of the lithium complex oxide, cobalt, nickel or manganese (Mn) is preferable. Specific examples of such a lithium complex oxide include $LiCoO_2$, $LiNiO_2$, $Li_xNi_yCo_{1-y}O_2$ (where the values of x and y depend upon a charge-discharge state of the battery, and are generally within a range of $0<x<1$ and $0<y<1.0$, respectively), a lithium-manganese complex oxide having a spinel structure and the like.

The anode 22 has, for example, a structure in which and an anode active material layer 22B which is disposed on either side or both sides of an anode current collector 22A having a pair of surfaces facing each other as in the case of the cathode 21. The anode current collector 22A is made of, for example, metal foil such as copper foil.

The anode active material layer 22B includes, for example, the anode active material according to the embodiment, and if necessary, a binder such as polyvinylidene fluoride. When the anode active material according to the embodiment is included in the secondary battery, the secondary battery can obtain a high capacity, and the cycle characteristics of the secondary battery can be improved. The anode active material layer 22B may include another anode active material or another material such as an electrical conductor in addition to the anode active material according to the embodiment. As another anode active material, for example, a carbon material capable of inserting and extracting lithium is cited. The carbon material is preferable, because charge-discharge cycle characteristics can be improved, and the carbon material also functions as an electrical conductor. As the carbon material, for example, the same material used when the anode active material is formed is cited.

The ratio of the carbon material to the anode active material according to the embodiment is preferably within a range from 1 wt % to 95 wt % inclusive. It is because when the ratio of the carbon material is lower than the range, the conductivity of the anode 22 declines, and when the ratio of the carbon material is higher than the range, a battery capacity declines.

The separator 23 isolates between the cathode 21 and the anode 22 so as to pass lithium ions through while preventing a short circuit of a current due to contact between the cathode 21 and the anode 22. The separator 23 is made of, for example, a porous film of a synthetic resin such as polytetrafluoroethylene, polypropylene or polyethylene, or a porous film of ceramic, and the separator 23 may have a structure in which two or more kinds of the porous films are laminated.

The electrolyte solution with which the separator 23 is impregnated includes a solvent and an electrolyte salt dissolved in the solvent. As the solvent, propylene carbonate, ethylene carbonate, diethyl carbonate, dimethyl carbonate, 1,2-dimethoxyethane, 1,2-diethoxyethane, y-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetate, butyrate, propionate or the like is cited. As the solvent, one kind or a mixture of two or more kinds selected from them may be used.

The solvent more preferably includes a derivative of a cyclic carbonate including a halogen atom. It is because the decomposition reaction of the solvent in the anode 22 can be prevented, and the cycle characteristics can be improved. Specific examples of the derivative of the cyclic carbonate include 4-fluoro-1,3-dioxolane-2-one shown in Chemical Formula 1, 4-difluoro-1,3-dioxolane-2-one shown in Chemical Formula 2, 4,5-difluoro-1,3-dioxolane-2-one shown in Chemical Formula 3, 4-difluoro-5-fluoro-1,3-dioxolane-2-one shown in Chemical Formula 4, 4-chloro-1,3-dioxolane-2-one shown in Chemical Formula 5, 4,5-dichloro-1,3-dioxolane-2-one shown in Chemical Formula 6, 4-bromo-1,3-dioxolane-2-one shown in Chemical Formula 7, 4-iodo-1,3-dioxolane-2-one shown in Chemical Formula 8, 4-fluoromethyl-1,3-dioxolane-2-one shown in Chemical Formula 9, 4-trifluoromethyl-1,3-dioxolane-2-one shown in Chemical Formula 10 and the like, and among them, 4-fluoro-1,3-dioxolane-2-one is preferable, because a higher effect can be obtained.

[Chemical Formula 1]

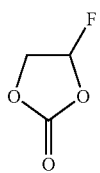

[Chemical Formula 2]

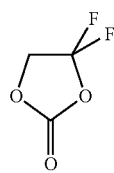

[Chemical Formula 3]

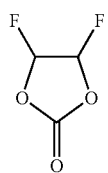

-continued

[Chemical Formula 4]

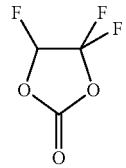

[Chemical Formula 5]

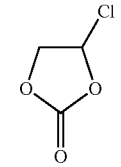

[Chemical Formula 6]

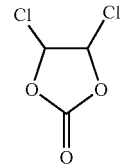

[Chemical Formula 7]

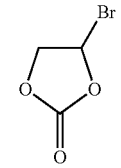

[Chemical Formula 8]

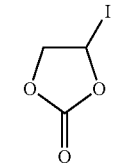

[Chemical Formula 9]

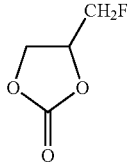

[Chemcial Formula 10]

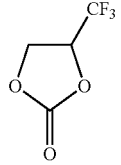

The solvent may include only the derivative of the carbonate; however, solvent, a mixture of the derivative of the carbonate and a low-boiling solvent of the boiling point is 150° C. or less under atmospheric pressure ($1.01325 \times 10^5$ Pa) is preferably used. It is because the ion conductivity can be improved. The content of the derivative of the carbonate in the whole solvent is preferably within a range from 0.1 wt % to 80 wt % inclusive. When the content is lower than the range, an effect of preventing the decomposition reaction of the solvent in the anode 22 is not sufficient, and when the content is higher than the range, the viscosity increases and the ion conductivity declines.

As the electrolyte salt, for example, a lithium salt is used, and one kind or a mixture of two or more kinds of lithium salts can be used. Examples of the lithium salts include $LiClO_4$, $LiAsF_6$, $LiPF_6$, $LiBF_4$, $LiB(C_6H_5)_4$, $CH_3SO_3Li$, $CF_3SO_3Li$, LiCl, LiBr and the like. As the electrolyte salt, the lithium salt is preferably used; however, the electrolyte salt is not specifically limited to the lithium salt. It is because when lithium ions are supplied from the cathode 21 or the like, sufficient lithium ions contributing to charge and discharge can be obtained.

The secondary battery can be formed through the following steps, for example.

At first, for example, the cathode active material and if necessary, the electrical conductor and the binder are mixed to prepare a cathode mixture, and then the cathode mixture is dispersed in a mixed solvent such as N-methyl-2-pyrrolidone to form cathode mixture slurry. Next, the cathode active material layer 21B is formed through applying the cathode mixture slurry to the cathode current collector 21A, and drying and compressing the cathode mixture slurry so as to form the cathode 21. Next, the cathode lead 25 is welded to the cathode 21.

Moreover, for example, the anode active material according to the embodiment and if necessary, another anode active material and the binder are mixed to prepare a anode mixture, and then the anode mixture is dispersed in a mixed solvent such as N-methyl-2-pyrrolidone to form anode mixture slurry. Next, the anode active material layer 22B is formed through applying the cathode mixture slurry to the anode current collector 22A, and drying and compressing the cathode mixture slurry so as to form the anode 22. Next, the anode lead 26 is welded to the anode 22.

After that, for example, a laminate including the cathode 21 and the anode 22 with the separator 23 in between is spirally wound, and an end portion of the cathode lead 25 is welded to the safety valve mechanism 15, and an end portion of the anode lead 26 is welded to the battery can 11. Then, the spirally wound laminate including the cathode 21 and the anode 22 is sandwiched between a pair of insulating plates 12 and 13, and then the spirally wound laminate is contained in the battery can 11. Then, the electrolyte solution is injected into the battery can 11. After that, the battery cover 14, the safety valve mechanism 15 and the PTC device 16 are fixed in an opened end portion of the battery can 11 through caulking by the gasket 17. Thereby, the secondary battery shown in FIG. 3 is completed.

When the secondary battery is charged, lithium ions are extracted from the cathode 21, and are inserted into the anode 22 through the electrolyte. When the secondary battery is discharged, the lithium ions are extracted from the anode 22 and are inserted into the cathode 21 through the electrolyte. In this case, the anode 22 includes the anode active material including tin, cobalt and carbon at the above-described ratio, and the size of the crystalline phase of the intermetallic compound of cobalt and tin measured by small-angle X-ray scattering is 10 nm or less, so while a high capacity is maintained, the cycle characteristics can be improved.

Thus, in the anode active material according to the embodiment, as an element of the anode active material, tin is included, so a high capacity can be obtained. Moreover, as an element of the anode active material, cobalt is included, and the ratio of cobalt to the total of tin and cobalt is within a range from 30 wt % to 70 wt % inclusive, so while a high capacity is maintained, the cycle characteristics can be improved. Further, as an element of the anode active material, carbon is included, and the carbon content is within a range from 9.9 wt % to 29.7 wt % inclusive, so the cycle characteristics can be further improved. In addition, the size of the crystalline phase of the intermetallic compound of cobalt and tin measured by small-angle X-ray scattering is 10 nm or less, so the cycle characteristics can be further improved. Therefore, in the battery according to the embodiment, the anode active material is used, so a high capacity and superior cycle characteristics can be obtained.

Moreover, when silicon is included in the anode active material as an element, a higher capacity can be obtained.

Further, when at least one kind selected from the group consisting of indium, niobium, germanium, titanium, molybdenum, aluminum, phosphorus, gallium and bismuth is included in the anode active material as an element, and the content of them is within a range of 14.9 wt % or less, the cycle characteristics can be further improved, and more specifically, when the content is within a range of 2.4 wt % or more, a higher effect can be obtained.

(Second Battery)

FIG. 5 shows the structure of a second secondary battery. In the secondary battery, a spirally wound electrode body 30 to which a cathode lead 31 and an anode lead 32 are attached is contained in film-shaped package members 40, and the size, the weight and the profile of the secondary battery can be reduced.

The cathode lead 31 and the anode lead 32 are drawn from the interior of the package members 40 to outside, for example, in the same direction. The cathode lead 31 and the anode lead 32 are made of, for example, a metal material such as aluminum, copper, nickel or stainless, and have a thin plate form or a mesh form.

The package members 40 are made of, for example, a rectangular aluminum laminate film including a nylon film, aluminum foil and a polyethylene film laminated in this order. The package members 40 are disposed such that the polyethylene films of the package members 40 face the spirally wound electrode body 30, and edge portions of the package members 40 are adhered to each other by fusion bonding or an adhesive. An adhesive film 41 for preventing the entry of outside air is inserted between the package members 40, the cathode lead 31 and the anode lead 32. The adhesive film 41 is made of, for example, a material having adhesion to the cathode leads 31 and the anode lead 32, for example, a polyolefin resin such as polyethylene, polypropylene, modified polyethylene or modified polypropylene.

The package members 40 may be made of a laminate film with any other structure, a high molecular weight film such as polypropylene or a metal film instead of the above-described aluminum laminate film.

Figure 6:
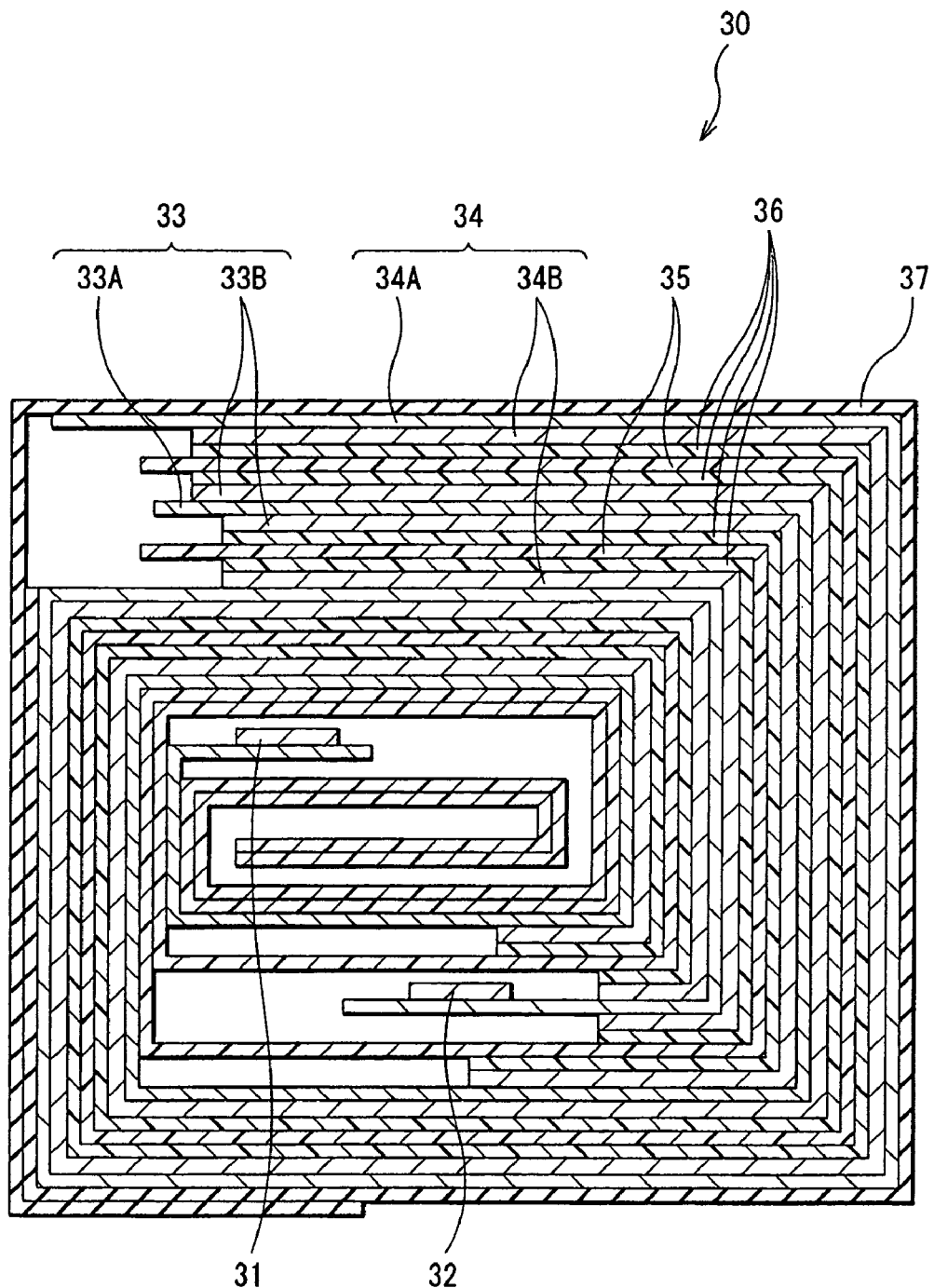
FIG. 6 is a sectional view of a spirally wound electrode body taken along a line I-I of FIG. 5.

FIG. 6 shows a sectional view of the spirally wound electrode body 30 taken along a line I-I of FIG. 5. The spirally wound electrode body 30 is a spirally wound laminate including a cathode 33 and an anode 34 with a separator 35 and an electrolyte layer 36 in between, and an outermost portion of the spirally wound electrode body 30 is protected with a protective tape 37.

The cathode 33 has a structure in which a cathode active material layer 33B is disposed on one side or both sides of a cathode current collector 33A. The anode 34 has a structure in which an anode active material layer 34B is disposed on one side or both sides of an anode current collector 34A, and the anode 34 is disposed such that the anode active material layer 34B faces the cathode active material layer 33B. The structures of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23, respectively.

The electrolyte layer 36 includes an electrolyte solution and a high molecular weight compound as a holding body holding the electrolyte solution, and is a so-called gel electrolyte. The gel electrolyte is preferable, because the gel electrolyte can obtain high ion conductivity, and can prevent leakage of the battery. The structure of the electrolyte solution (that is, a solvent and an electrolyte salt) is the same as that in the cylindrical type secondary battery shown in FIG. 3. Examples of the high molecular weight compound include a fluorine-based high molecular weight compound such as polyvinylidene fluoride, or a copolymer of vinylidene fluoride and hexafluoropropylene, an ether-based high molecular weight compound such as polyethylene oxide or a cross-link including polyethylene oxide, polyacrylonitrile, and the like. More specifically, in terms of stability of oxidation-reduction, the flurorine-based high molecular weight compound is preferable.

For example, the secondary battery can be formed through the following steps.

At first, a precursor solution including the solvent, the electrolyte salt, the high molecular weight compound and a mixed solvent is applied to the cathode 33 and the anode 34, and the mixed solvent is volatilized to form the electrolyte layer 36. After that, the cathode lead 31 is attached to an end portion of the cathode current collector 33A through welding, and the anode lead 32 is attached to an end portion of the anode current collector 34A through welding. Next, after the cathode 33 on which the electrolyte layer 36 is formed and the anode 34 on which the electrolyte layer 36 is formed are laminated with the separator 35 in between to form a laminate, the laminate is spirally wound in a longitudinal direction, and the protective tape 37 is adhered to an outermost portion of the laminate so as to form the spirally wound electrode body 30. Finally, for example, the spirally wound electrode body 30 is sandwiched between the package members 40, and edge portions of the package members 40 are adhered to each other through thermal fusion bonding or the like to seal the spirally wound electrode body 30 in the package members 40. At this time, the adhesive film 41 is inserted between the cathode lead 31, the anode lead 32 and the package members 40. Thereby, the secondary battery shown in FIGS. 5 and 6 is completed.

Moreover, the secondary battery may be formed through the following steps. At first, as described above, the cathode 33 and the anode 34 are formed, and after the cathode lead 31 and the anode lead 32 are attached to the cathode 33 and the anode 34, the cathode 33 and the anode 34 are laminated with the separator 35 in between to form a laminate, and the laminate is spirally wound, and the protective tape 37 is adhered to an outermost portion of the laminate so as to form a spirally wound body as a precursor body of the spirally wound electrode body 30. Next, the spirally wound body is sandwiched between the package members 40, and the edge portions except for one side are adhered through thermal fusion bonding to form a bag shape. Then, the spirally wound body is contained in the package members 40. Next, a composite for an electrolyte including the solvent, the electrolyte salt, monomers as the materials of the high molecular weight compound and a polymerization initiator, and if necessary, another material such as a polymerization inhibitor is prepared, and the composite is injected into the interior of the package members 40.

After the composite for an electrolyte is injected, an opening of the package members 40 is sealed through thermal fusion bonding in a vacuum atmosphere. Next, the monomers is polymerized through applying heat to form a high molecular weight compound, thereby the gel electrolyte layer 36 is formed, and the secondary battery shown in FIG. 5 is assembled.

The secondary battery can function as in the case of the first secondary battery, and can have the same effects as those of the first secondary battery.

(Third Battery)

Figure 7:
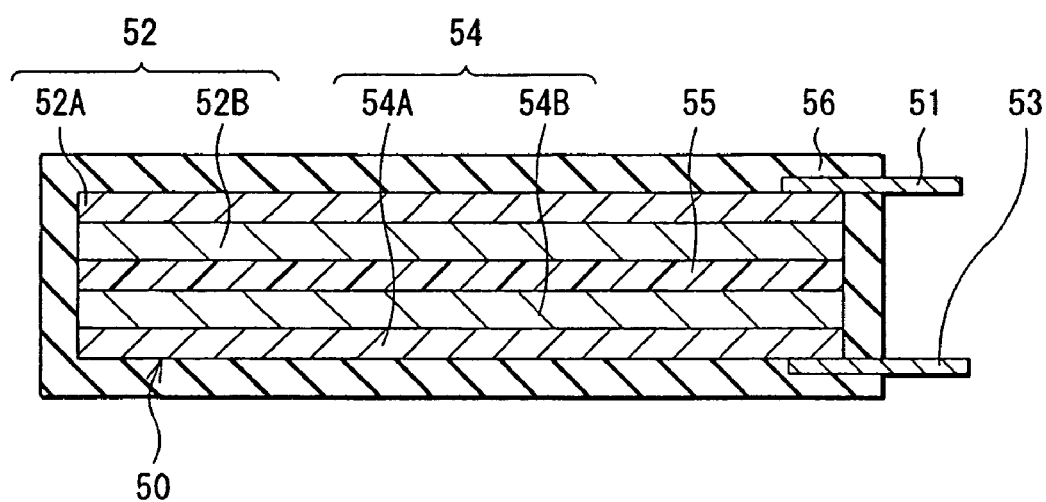
FIG. 7 is a sectional view of another secondary battery according to the embodiment of the invention.

FIG. 7 shows a sectional view of a third secondary battery. In the secondary battery, a plate-shaped electrode body 50 including a cathode 52 to which an cathode lead 51 is attached and an anode 54 to which an anode lead 53 is attached such that the cathode 52 and the anode 54 face each other with an electrolyte layer 55 in between is contained in a film-shaped package member 56. The structure of the package member 56 is the same as that of the above-described package member 40.

The cathode 52 has a structure in which a cathode active material layer 52B is disposed on a cathode current collector 52A. The anode 54 has a structure in which an anode active material 54B is disposed on an anode current collector 54A, and the anode 54 is disposed such that the anode active material layer 54B faces the cathode active material layer 52B. The structures of the cathode current collector 52A, the cathode active material layer 52B, the anode current collector 54A and the anode active material layer 54B are the same as those of the cathode current collector 21A, the cathode active material layer 21B, the anode current collector 22A and anode active material layer 22B, respectively.

The electrolyte layer 55 is made of, for example, a solid electrolyte. As the solid electrolyte, for example, as long as the solid electrolyte is a material with lithium ion conductivity, either an inorganic solid electrolyte or a solid high molecular weight electrolyte can be used. As the inorganic solid electrolyte, an electrolyte including lithium nitride, lithium iodide or the like is cited. The solid high molecular weight electrolyte is mainly made of an electrolyte salt and a high molecular weight compound in which the electrolyte salt is dissolved. As the high molecular weight compound of the solid high molecular weight electrolyte, for example, an ether-based high molecular weight compound such as polyethylene oxide or a cross-link including polyethylene oxide, an ester-based high molecular weight compound such as polymethacrylate or an acrylate-based high molecular weight compound, or a mixture or a copolymer thereof can be used.

The solid high molecular weight electrolyte can be formed, for example, through mixing the high molecular weight compound, the electrolyte salt and a mixed solvent, and then volatilizing the mixed solvent. Moreover, after the electrolyte salt, monomers as materials of the high molecular weight compound and the polymerization initiator, and if necessary, another material such as the polymerization inhibitor are dissolved in the mixed solvent, and the mixed solvent is volatilized, the monomers are polymerized through applying heat to form the high molecular weight compound, thereby the solid high molecular weight electrolyte can be formed.

The inorganic electrolyte can be formed, for example, through a vapor phase method such as a sputtering method, a vacuum deposition method, a laser ablation method, an ion plating method or a CVD (Chemical Vapor Deposition) method, or a liquid phase method such as a sol-gel method on the surface of the cathode 52 or the anode 54.

The secondary battery can function as in the case of the first or the second secondary battery, and can obtain the same effects as those of the first or the second secondary battery.

EXAMPLES

Specific examples of the invention will be described in detail below.

Examples 1-1 Through 1-8

At first, anode active materials were prepared. As the materials of the anode active material, cobalt powder, tin powder and carbon powder were prepared, and the cobalt powder and the tin powder were alloyed to form cobalt-tin alloy powder, and then the carbon powder was added to the alloy powder, and they were dry mixed, thereby a mixture was formed. At that time, as the ratio of the materials, as shown in Table 1, the ratio of cobalt to the total of tin and cobalt (hereinafter referred to as Co/(Sn+Co) ratio) was fixed to 37 wt %, and the ratio of carbon was changed within a range from 10 wt % to 30 wt % inclusive. Next, 20 g of the mixture was put into a reaction vessel of a planetary ball mill of Ito Seisakusho together with approximately 400 g of steel balls with a diameter of 9 mm. Next, an argon atmosphere was introduced into the reaction vessel, and the cycle of a 10-minute operation at 250 rpm and a 10-minute interval was repeated until the total operation time reached 30 hours. After that, the reaction vessel was cooled down to a room temperature, and synthesized anode active material powder was taken out from the reaction vessel, and the anode active material powder was shifted through a sieve having 280 meshes to remove coarse grains of the anode active material powder.

The compositions of the obtained anode active materials were analyzed. The carbon content was measured by a carbon/sulfur analyzer, and the contents of cobalt and tin were measured by ICP (Inductively Coupled Plasma) emission spectrometry. The analytical values are shown in Table 1. The material ratios and the analytical values shown in Table 1 are rounded off to the first decimal place. The material ratios and the analytical values in the following examples are shown in the same manner. Moreover, the size of the crystalline phase of CoSn in each of the obtained anode active materials was measured by small-angle X-ray scattering. The results are shown in Table 1 and FIG. 8. Further, when X-ray diffraction was performed on each of the obtained anode active materials, a peak P1 was obtained as shown in FIG. 9. When the peak P1 was analyzed, a peak P2 of surface contamination carbon and a peak P3 of C1s in the anode active material on a lower energy side than the peak P2 were obtained. In each of Examples 1-1 through 1-8, the peak P3 was obtained in a region lower than 284.5 eV. In other words, it was confirmed that carbon in each of the anode active materials was bonded to another element.

Figure 10:
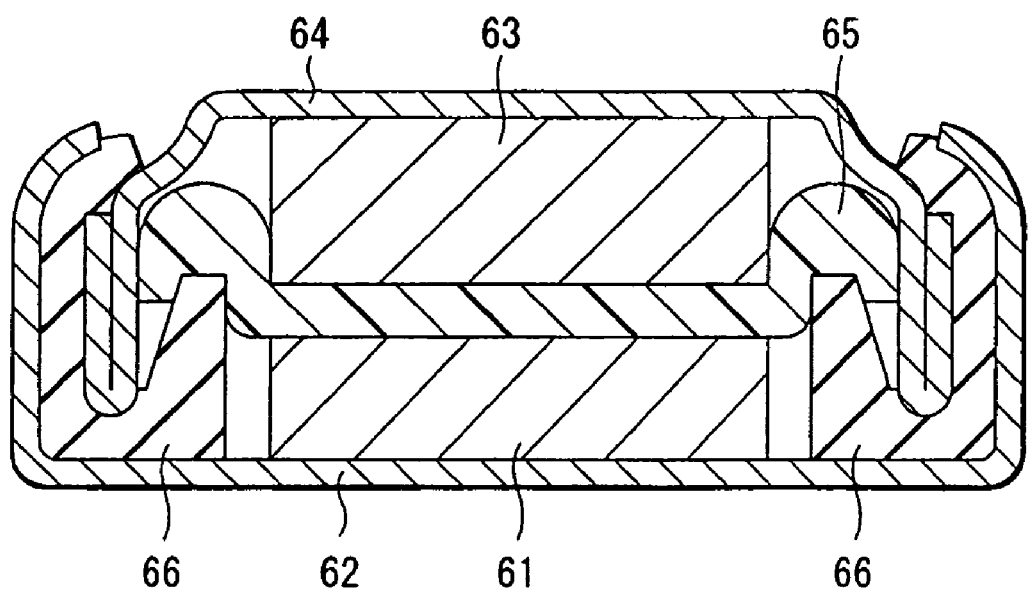
FIG. 10 is a sectional view of a coin type battery formed in an example.

Next, the anode active material powder of each of Examples 1-1 through 1-8 was used to form a coin type secondary battery shown in FIG. 10, and the initial charge capacity of the secondary battery was determined. In the coin type battery, a test electrode 61 using the anode active material of each example was contained in a package member 62, and a counter electrode 63 was attached to a package member 64. The test electrode 61 and the counter electrode 63 were laminated with a separator 65 impregnated with an electrolyte solution in between, and then they were caulked by a gasket 66, thereby the coin type battery was formed.

The test electrode 61 was formed through the following steps. At first, 70 parts by weight of the obtained anode active material powder, 20 parts by weight of graphite which was an electrical conductor and another anode active material, 1 part by weight of acetylene black as an electrical conductor and 4 parts by weight of polyvinylidene fluoride as a binder were mixed to form a mixture. After the mixture was dispersed in an appropriate mixed solvent to form slurry, the slurry was applied to a current collector of copper foil, and was dried. Then, the current collector was stamped into a pellet with a diameter of 15.2 mm.

TABLE 1

| | MATERIAL RATIO (WT %) | | | ANALYTICAL VALUE (WT %) | | | INITIAL CHARGE CAPACITY (mAh/g) | CAPACITY RETENTION RATIO (%) | CRYSTALLINE PHASE (nm) |
|---|---|---|---|---|---|---|---|---|---|
| | Co | Sn | C | Co | Sn | C | | | |
| EXAMPLE 1-1 | 33.3 | 56.7 | 10.0 | 33.0 | 56.1 | 9.9 | 500 | 63 | 9.6 |
| EXAMPLE 1-2 | 31.5 | 53.5 | 15.0 | 31.1 | 53.0 | 14.9 | 504 | 68 | 9.3 |
| EXAMPLE 1-3 | 30.7 | 52.3 | 17.0 | 30.4 | 51.8 | 16.8 | 512 | 70 | 8.9 |
| EXAMPLE 1-4 | 30.3 | 51.7 | 18.0 | 30.1 | 51.3 | 17.8 | 519 | 73 | 8.6 |
| EXAMPLE 1-5 | 29.6 | 50.4 | 20.0 | 29.3 | 49.9 | 19.8 | 524 | 79 | 7.8 |
| EXAMPLE 1-6 | 28.9 | 49.1 | 22.0 | 28.6 | 48.7 | 21.8 | 525 | 79 | 7.6 |
| EXAMPLE 1-7 | 27.8 | 47.2 | 25.0 | 27.5 | 46.8 | 24.8 | 527 | 78 | 7.5 |
| EXAMPLE 1-8 | 25.9 | 44.1 | 30.0 | 25.6 | 43.7 | 29.7 | 501 | 67 | 9.8 |
| COMPARATIVE EXAMPLE 1-1 | 37.0 | 63.0 | 0 | 36.6 | 62.4 | 0 | 441 | 0 | 21.2 |
| COMPARATIVE EXAMPLE 1-2 | 36.8 | 62.7 | 0.5 | 36.4 | 62.1 | 0.5 | 448 | 2 | 19.5 |
| COMPARATIVE EXAMPLE 1-3 | 34.0 | 58.0 | 8.0 | 33.7 | 57.4 | 7.9 | 484 | 21 | 12.7 |
| COMPARATIVE EXAMPLE 1-4 | 22.2 | 37.8 | 40.0 | 22.0 | 37.4 | 39.6 | 413 | 7 | 14.4 |

$$\frac{Co}{Sn+Co} = 37 \text{ wt \%}$$

As the counter electrode 63, a metal lithium plate stamped into a disk shape with a diameter of 15.5 mm was used. As the electrolyte solution, a mixed solvent including ethylene carbonate, propylene carbonate and dimethyl carbonate in which $LiPF_6$ as an electrolyte salt was dissolved was used.

As the initial charge capacity, a charge capacity per unit weight which was the weight of the test electrode 61 exclusive of the weight of the current collector of copper foil and the weight of the binder was determined through charging the secondary battery at a constant current of 1 mA until the battery voltage reached 0.2 mV, and then charging the secondary battery at a constant voltage of 0.2 mV until a current reached 10 μA. In this case, charge means an insertion reaction of lithium into the anode active material. The results are shown in Table 1 and FIG. 11.

Moreover, a cylindrical type secondary battery shown in FIG. 3 was formed. At first, a cathode active material made of nickel oxide, ketjen black as an electrical conductor and polyvinylidene fluoride as a binder were mixed at a weight ratio of nickel oxide:ketjen black:polyvinylidene fluoride=94:3:3 to form a mixture. After the mixture was dispersed in a mixed solvent such as N-methyl-2-pyrrolidone to form cathode mixture slurry, the cathode mixture slurry was uniformly applied to both sides of the cathode current collector 21A made of strip-shaped aluminum foil, and was dried. Then, the cathode active material layer 21B was formed through compression molding by a roller press so as to form the cathode 21. After that, the cathode lead 25 made of aluminum was attached to an end of the cathode current collector 21A.

Moreover, slurry including the anode active material which was formed as described above was uniformly applied to both sides of the anode current collector 22A made of strip-shaped copper foil, and was dried. Then, the anode active material layer 22B was formed through compression molding by a roller press so as to form the anode 22. Next, the anode lead 26 made of nickel was attached to an end of the anode current collector 22A.

After the cathode 21 and the anode 22 were formed, the separator 23 was prepared, and the anode 22, the separator 23, the cathode 21 and the separator 23 were laminated in this order to form a laminate, and the laminate was spirally wound several times to form the spirally wound electrode body 20.

After the spirally wound electrode body 20 was formed, the spirally wound electrode body 20 was sandwiched between a pair of insulating plates 12 and 13, and the anode lead 26 was welded to the battery can 11, and the cathode lead 25 was welded to the safety valve mechanism 15. Then, the spirally wound electrode body 20 was contained in the battery can 11 made of nickel-plated iron. After that, the above-described electrolyte solution was injected into the battery can 11 by a decomposition method.

After the electrolyte solution was injected into the battery can 11, the battery cover 14 was caulked to the battery can 11 by the gasket 17 of which the surface was coated with asphalt, thereby the cylindrical type secondary battery shown in FIG. 3 was obtained.

The cycle characteristics of the obtained secondary battery were measured. The results are shown in Table 1 and FIG. 11. At that time, the cycle characteristics were measured through the following steps.

At first, after the secondary battery was charged at a constant current of 0.5 A until the battery voltage reached 4.2 V, the secondary battery was charged at a constant voltage of 4.2 V until the current reached 10 mA. Then, the secondary battery was discharged at a constant current of 0.25 A until the battery voltage reached 2.6 V. Thereby, the first cycle of charge and discharge was performed.

As the second or later cycles, after the secondary battery was charged at a constant current of 1.4 A until the battery voltage reached 4.2 V, the secondary battery was charged at a constant voltage of 4.2 V until the current reached 10 mA, and then the secondary battery was discharged at a constant current of 1.0 A until the battery voltage reached 2.6 V. As the cycle characteristics, the capacity retention ratio in the 300th cycle to the discharge capacity in the second cycle (discharge capacity in the 300th cycle/discharge capacity in the second cycle)×100(%) was determined.

Figure 12:
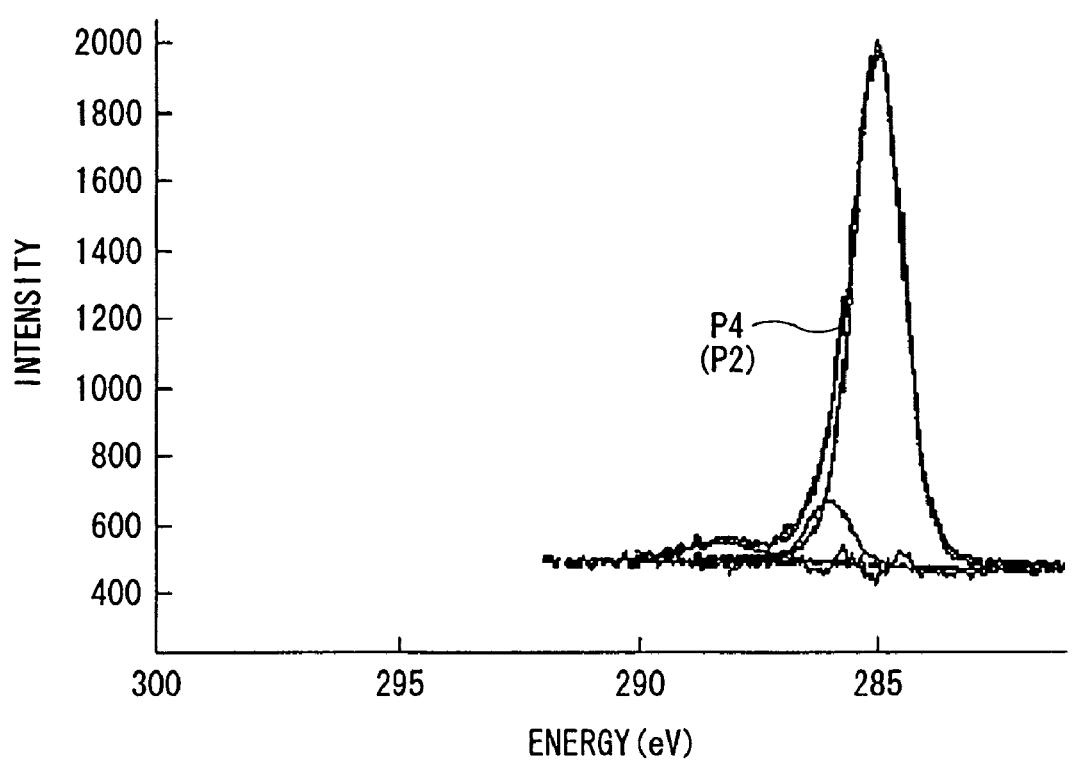
FIG. 12 is a plot showing an example of peaks of an anode active material formed in a comparative example which are obtained by X-ray photoelectron spectroscopy.

As Comparative Example 1-1 relative to Examples 1-1 through 1-8, an anode active material was synthesized, and a secondary battery was formed as in the case of Examples 1-1 through 1-8, except that as a material, carbon powder was not used. Moreover, as Comparative Examples 1-2 through 1-4, anode active materials were synthesized, and secondary batteries were formed as in the case of Examples 1-1 through 1-8, except that the material ratio of the carbon powder was changed as shown in Table 1. As in the case of Examples 1-1 through 1-8, the analysis of the composition and the measurement of the size of the crystalline phase of CoSn were performed on the anode active materials of Comparative Examples 1-1 through 1-4. The results are shown in Table 1. Further, when the XPS measurement was performed on the anode active materials of Comparative Examples 1-1 through 1-4, in the anode active materials of Comparative Examples 1-3 and 1-4, the peak P1 shown in FIG. 9 was obtained. When the peak P1 was analyzed, as in the case of Examples 1-1 through 1-8, the peak P2 of surface contamination carbon and the peak P3 of C1s in the anode active material were obtained, and in each of Comparative Examples 1-3 and 1-4, the peak P3 was obtained in a region lower than 284.5 eV. In other words, it was confirmed that at least a part of carbon included in the anode active material was bonded to another element. On the other hand, in Comparative Example 1-1, as shown in FIG. 12, a peak P4 was obtained, and when the peak P4 was analyzed, only the peak P2 of surface contamination carbon was obtained. In Comparative Example 1-2, the amount of carbon used as a material was small, so only the peak P2 was obtained by the analysis, and the peak P3 was hardly detected.

Moreover, the charge capacities and the cycle characteristics of the secondary batteries of Comparative Examples 1-1 through 1-4 were measured in the same manner. The results are also shown in Table 1 and FIG. 11.

Figure 8:
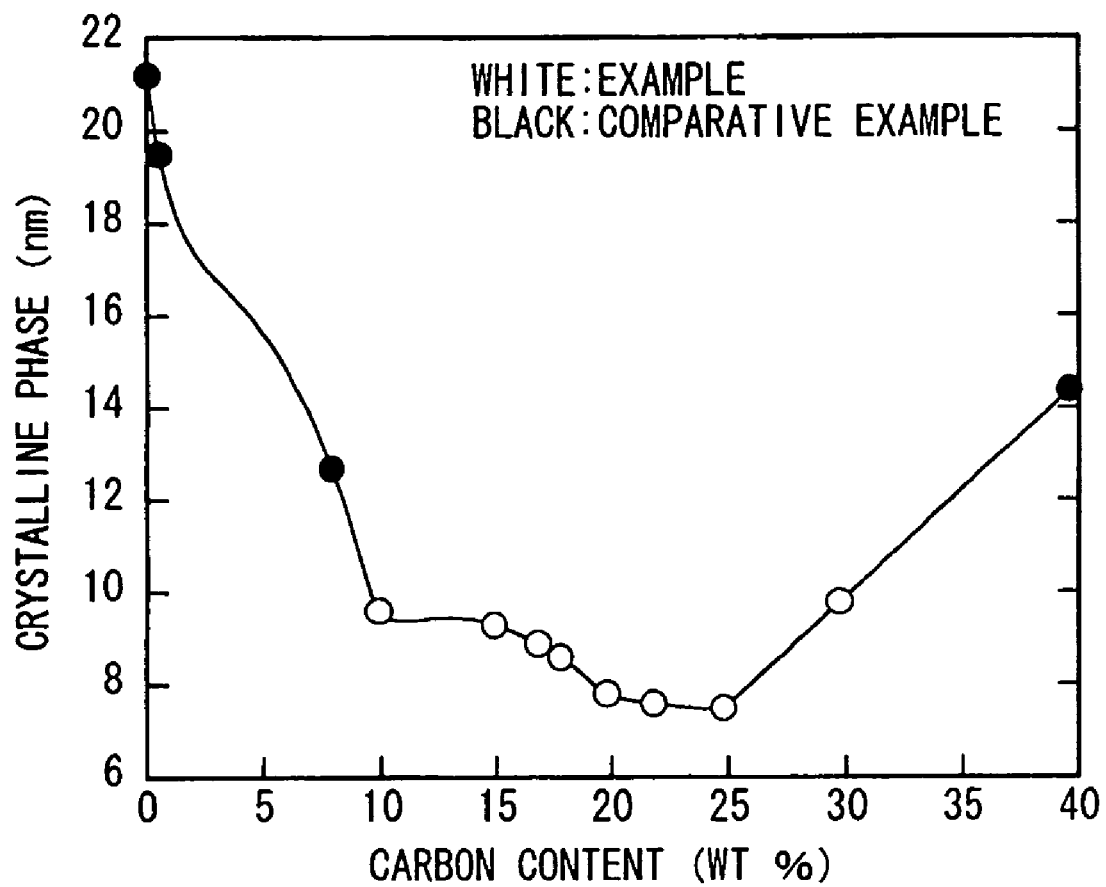
FIG. 8 is a plot showing a relationship between the carbon content and the size of a crystalline phase of CoSn in anode active materials formed in examples.
Figure 9:
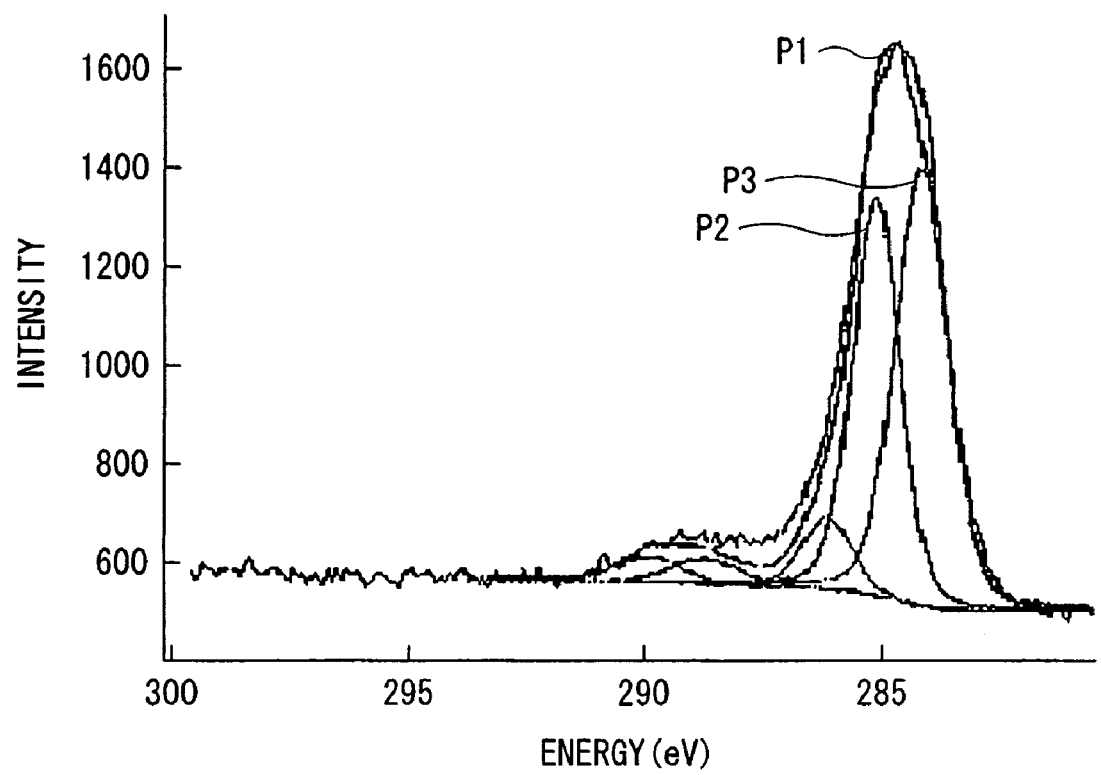
FIG. 9 is a plot showing an example of peaks of an anode active material formed in an example which are obtained by X-ray photoelectron spectroscopy.
Figure 11:
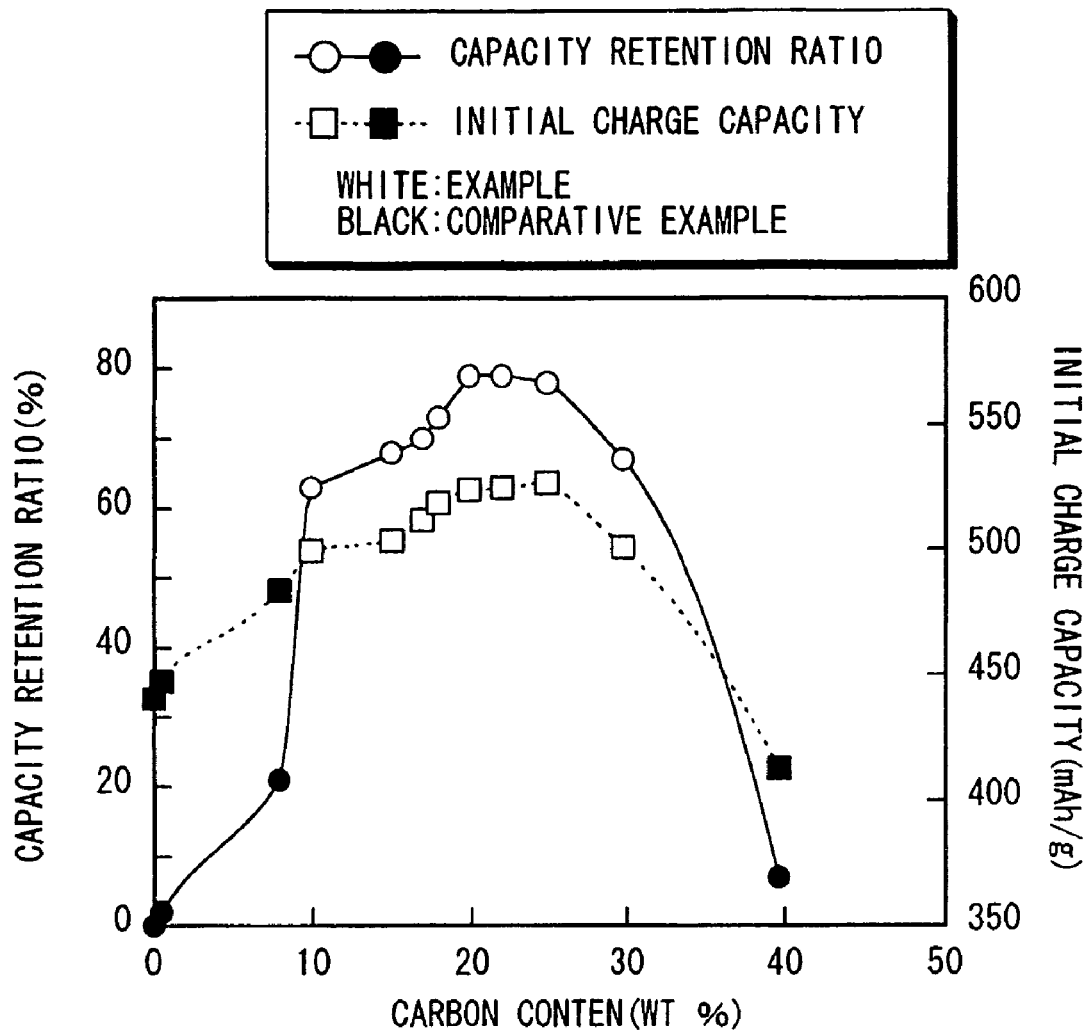
FIG. 11 is a plot showing a relationship between the carbon content in an anode active material, a capacity retention ratio and an initial charge capacity.

It is evident from Table 1 and FIGS. 8 and 11 that as the carbon content in the anode active material increased, the size of the crystalline phase of CoSn was reduced to a minimum value, then increased. Moreover, in Examples 1-1 through 1-8 in which the carbon content in the anode active material was within a range from 9.9 wt % to 29.7 wt %, and the size of the crystalline phase of CoSn was 10 nm or less, the capacity retention ratio could be remarkably improved, compared to Comparative Examples 1-1 through 1-4 in which the carbon content was out of the range, and the size of the crystalline phase of CoSn was larger than 10 nm. Further, the initial charge capacity could be improved.

Moreover, when the carbon content in the anode active material was within a range from 14.9 wt % to 29.7 wt % inclusive, more specifically within a range from 16.8 wt % to 24.8 wt % inclusive, a higher value could be obtained.

In other words, it was found out that when the carbon content was within a range from 9.9 wt % to 29.7 wt % inclusive, and the size of the crystalline phase of CoSn was 10 nm or less, the capacity and the cycle characteristics could be improved. Further, it was found out that the carbon content was more preferably within a range from 14.9 wt % to 29.7 wt % inclusive, and more preferably within a range from 16.8 wt % to 24.8 wt %.

Examples 2-1 Through 2-6

Secondary batteries were formed as in the case of Examples 1-1 through 1-8, except that the material ratios of cobalt, tin and carbon were changed as shown in Table 2. More specifically, the material ratio of carbon was fixed to 10 wt %, and the Co/(Sn+Co) ratio was changed within a range from 30 wt % to 70 wt % inclusive.

TABLE 2

| | MATERIAL RATIO (WT%) | | | ANALYTICAL VALUE (WT%) | | | Co / Sn+Co | INITIAL CHARGE CAPACITY (mAh/g) | CAPACITY RETENTION RATIO (%) | CRYSTALLINE PHASE (nm) |
|---|---|---|---|---|---|---|---|---|---|---|
| | Co | Sn | C | Co | Sn | C | | | | |
| EXAMPLE 2-1 | 27.0 | 63.0 | 10.0 | 26.7 | 62.4 | 9.9 | 30 | 537 | 45 | 9.3 |
| EXAMPLE 2-2 | 33.3 | 56.7 | 10.0 | 33.0 | 56.1 | 9.9 | 37 | 498 | 61 | 9.6 |
| EXAMPLE 2-3 | 40.5 | 49.5 | 10.0 | 40.1 | 49.0 | 9.9 | 45 | 461 | 65 | 9.4 |
| EXAMPLE 2-4 | 45.0 | 45.0 | 10.0 | 44.6 | 44.6 | 9.9 | 50 | 433 | 70 | 9.0 |
| EXAMPLE 2-5 | 54.0 | 36.0 | 10.0 | 53.5 | 35.6 | 9.9 | 60 | 419 | 72 | 9.1 |
| EXAMPLE 2-6 | 63.0 | 27.0 | 10.0 | 62.4 | 26.7 | 9.9 | 70 | 411 | 74 | 8.8 |
| COMPARATIVE EXAMPLE 2-1 | 68.0 | 22.0 | 10.0 | 67.5 | 21.8 | 9.9 | 76 | 344 | 76 | 8.9 |
| COMPARATIVE EXAMPLE 2-2 | 25.2 | 64.8 | 10.0 | 24.9 | 64.2 | 9.9 | 28 | 546 | 7 | 9.5 |

Moreover, as Comparative Examples 2-1 and 2-2 relative to Examples 2-1 through 2-6, anode active materials and secondary batteries were formed as in the case of Examples 2-1 through 2-6, except that the Co/(Sn+Co) ratio was 76 wt % or 28 wt %.

The analysis of the composition and the measurement of the size of the crystalline phase of CoSn was performed on the anode active materials of Examples 2-1 through 2-6 and Comparative Examples 2-1 and 2-2. The results are shown in Table 2. Moreover, when the XPS measurement was performed, and the obtained peaks were analyzed, as in the case of Examples 1-1 through 1-8, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was bonded to another element. Further, the initial charge capacities and the cycle characteristics of the secondary batteries were measured as in the case of Examples 1-1 through 1-8. The results are shown in Table 2 and FIG. 13.

Figure 13:
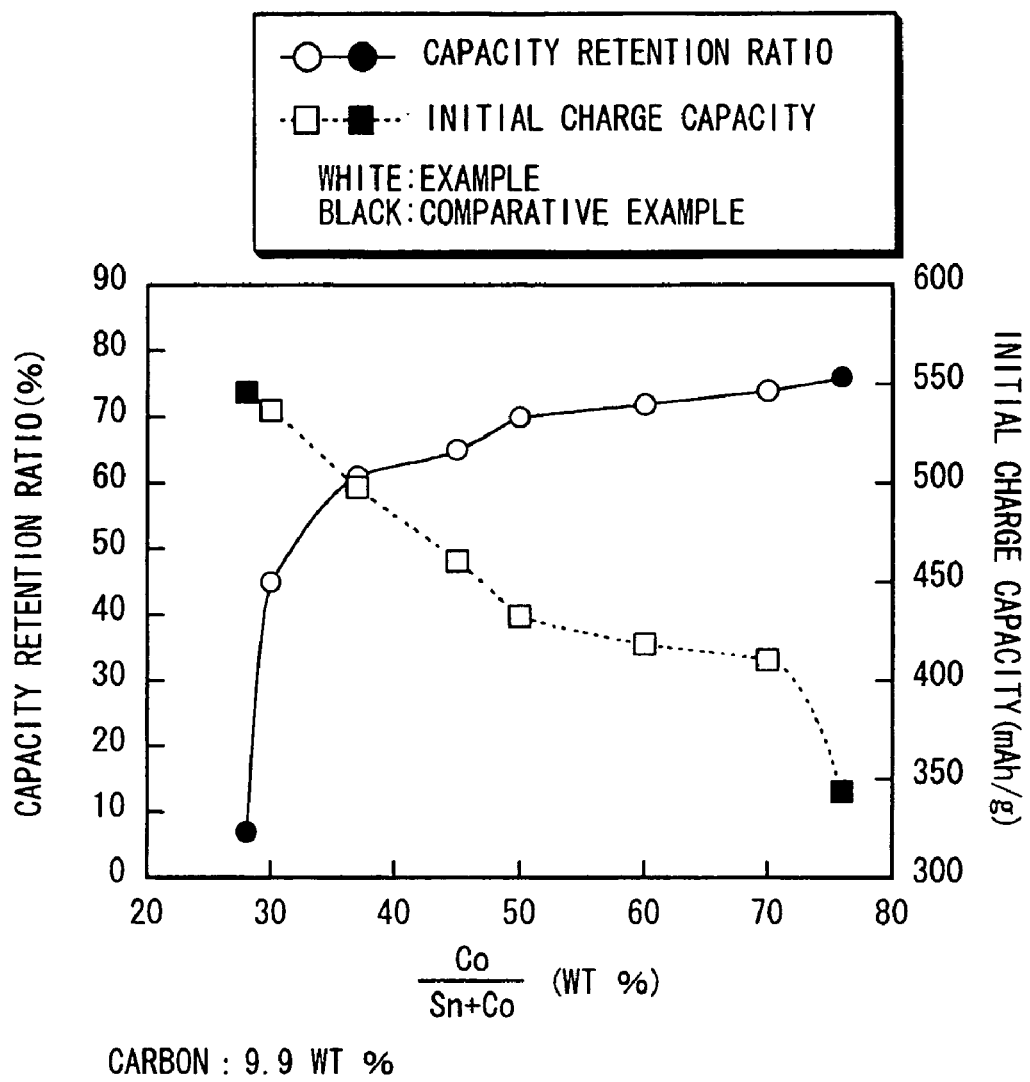
FIG. 13 is another plot showing a relationship between the ratio of cobalt to the total of tin and cobalt in an anode active material, a capacity retention ratio and an initial charge capacity.

It is evident from Table 2 and FIG. 13 that in Examples 2-1 through 2-6 in which the size of the crystalline phase of CoSn was 10 nm or less, and the Co/(Sn+Co) ratio was within a range from 30 wt % to 70 wt %, the capacity retention ratio could be remarkably increased, compared to Comparative Example 2-2 in which the Co/(Sn+Co) ratio was less than 30 wt %, and the initial charge capacity could be remarkably increased, compared to Comparative Example 2-1 in which the Co/(Sn+Co) ratio was higher than 70 wt %. In particular, when the Co/(Sn+Co) ratio was 60 wt % or less, a high initial charge capacity could be obtained.

In other words, it was found out that when the size of the crystalline phase of CoSn was 10 nm or less, and the Co/(Sn+Co) ratio was within a range from 30 wt % to 70 wt % inclusive, the capacity and the cycle characteristics could be improved. Moreover, it was found out that the Co/(Sn+Co) ratio was more preferably 60 wt % or less.

Examples 3-1 Through 3-6

Secondary batteries were formed as in the case of Examples 1-1 through 1-8, except that anode active materials in which the material ratios of cobalt, tin and carbon were changed as shown in Table 3 were synthesized. More specifically, the material ratio of carbon was fixed to 20 wt %, and the Co/(Sn+Co) ratio was changed within a range from 30 wt % to 70 wt % inclusive. Moreover, when the anode active materials were synthesized, the operation time and the number of revolutions were changed.

TABLE 3

| | MATERIAL RATIO (WT%) | | | ANALYTICAL VALUE (WT%) | | | Co / Sn+Co | INITIAL CHARGE CAPACITY (mAh/g) | CAPACITY RETENTION RATIO (%) | CRYSTALLINE PHASE (nm) |
|---|---|---|---|---|---|---|---|---|---|---|
| | Co | Sn | C | Co | Sn | C | | | | |
| EXAMPLE 3-1 | 24.0 | 56.0 | 20.0 | 23.8 | 55.4 | 19.8 | 30 | 560 | 53 | 9.2 |
| EXAMPLE 3-2 | 29.6 | 50.4 | 20.0 | 29.3 | 49.9 | 19.8 | 37 | 521 | 75 | 9.2 |
| EXAMPLE 3-3 | 36.0 | 44.0 | 20.0 | 35.6 | 43.6 | 19.8 | 45 | 482 | 79 | 9.4 |
| EXAMPLE 3-4 | 40.0 | 40.0 | 20.0 | 39.6 | 39.6 | 19.8 | 50 | 454 | 85 | 9.5 |
| EXAMPLE 3-5 | 48.0 | 32.0 | 20.0 | 47.5 | 31.7 | 19.8 | 60 | 439 | 89 | 9.8 |
| EXAMPLE 3-6 | 56.0 | 24.0 | 20.0 | 55.4 | 23.8 | 19.8 | 70 | 428 | 90 | 9.0 |
| COMPARATIVE EXAMPLE 3-1 | 58.0 | 22.0 | 20.0 | 57.4 | 21.8 | 19.8 | 72.5 | 365 | 92 | 9.0 |
| COMPARATIVE EXAMPLE 3-2 | 22.4 | 57.6 | 20.0 | 22.2 | 57.0 | 19.8 | 28 | 573 | 12 | 9.4 |

As Comparative Examples 3-1 and 3-2 relative to Examples 3-1 through 3-6, anode active materials and secondary batteries were formed as in the case of Example 3-1 through 3-6, except that the Co/(Sn+Co) ratio was 72.5 wt % or 28 wt %.

The analysis of the composition and the measurement of the size of the crystalline phase of CoSn were performed on the anode active materials of Examples 3-1 through 3-6 and Comparative Examples 3-1 and 3-2 as in the case of Examples 1-1 through 1-8. The results are shown in Table 3. Moreover, when the XPS measurement was performed, and the obtained peaks were analyzed, as in the case of Examples 1-1 through 1-8, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was bonded to another element. Further, the initial charge capacities and the cycle characteristics of the secondary batteries were measured as in the case of Examples 1-1 through 1-8. The results are shown in Table 3 and FIG. 14.

Figure 14:
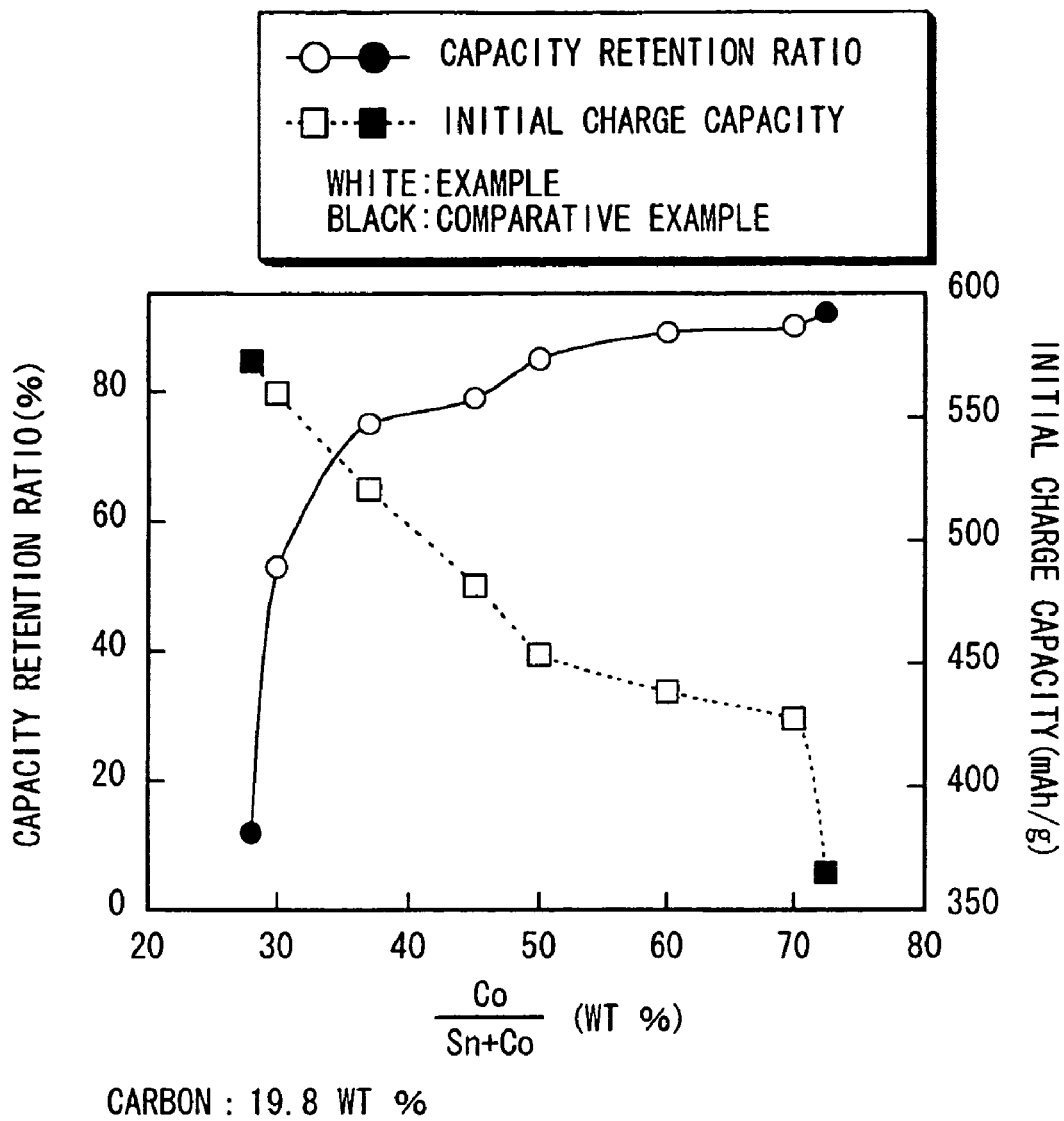
FIG. 14 is another plot showing a relationship between the ratio of cobalt to the total of tin and cobalt in an anode active material, a capacity retention ratio and an initial charge capacity.

It is evident from Table 3 and FIG. 14 that the same results as those of Examples 2-1 through 2-6 were obtained. In other words, it was found out that when the size of the crystalline phase of CoSn was 10 nm or less, and the Co/(Sn+Co) ratio was within a range from 30 wt % to 70 wt % inclusive, even in the case where the carbon content was 19.8 wt %, the capacity and the cycle characteristics could be improved.

Examples 4-1 Through 4-6

Secondary batteries were formed as in the case of Examples 1-1 through 1-8, except that anode active materials in which the material ratios of cobalt, tin and carbon were changed as shown in Table 4 were synthesized. More specifically, the material ratio of carbon was fixed to 30 wt %, and the Co/(Sn+Co) ratio was changed within a range from 30 wt % to 66 wt % inclusive.

1-1 through 1-8, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was bonded to another element. Further, the initial charge capacities and the cycle characteristics of the secondary batteries were measured as in the case of Examples 1-1 through 1-8. The results are shown in Table 4 and FIG. 15.

Figure 15:
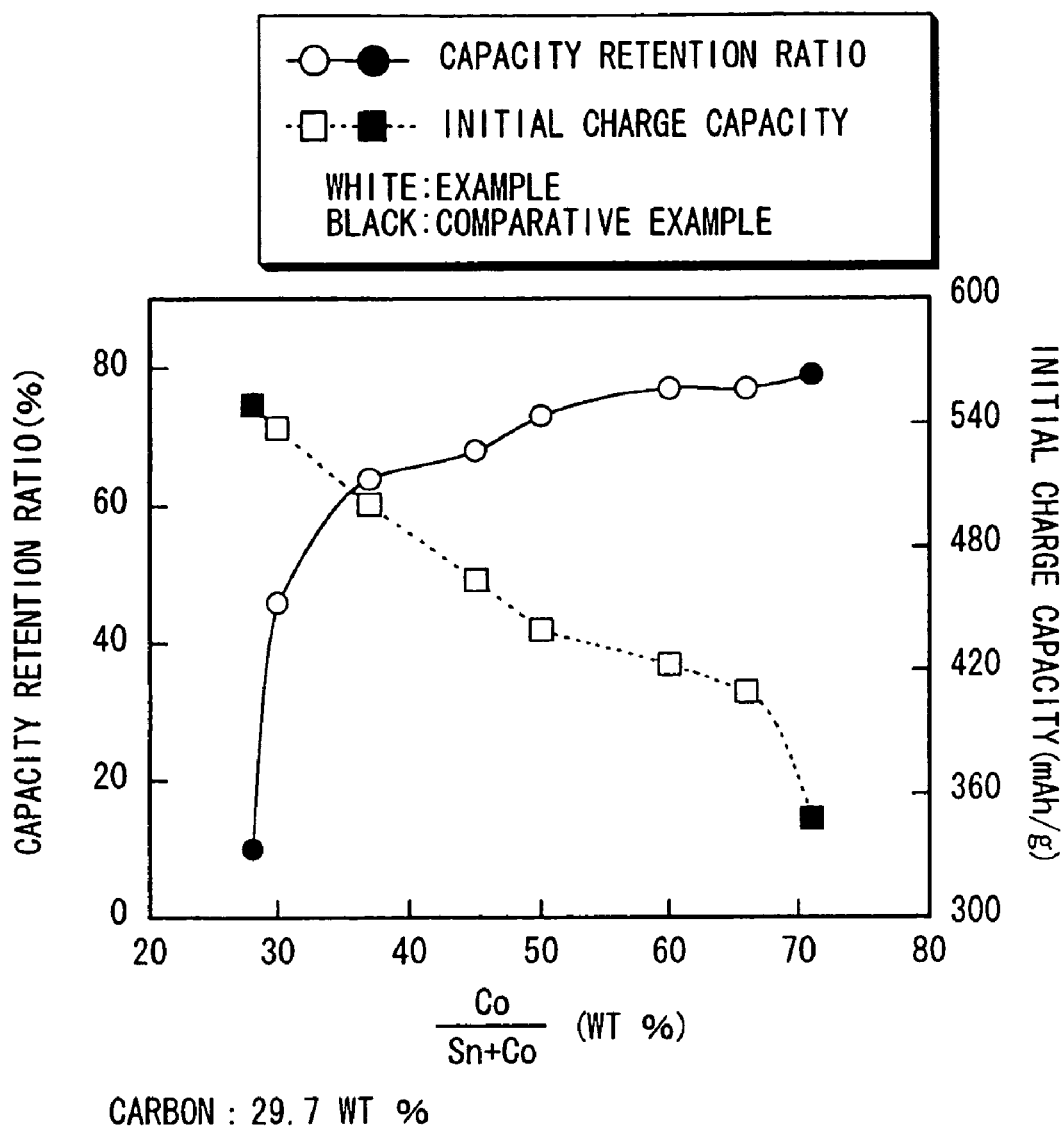
FIG. 15 is another plot showing a relationship between the ratio of cobalt to the total of tin and cobalt in an anode active material, a capacity retention ratio and an initial charge capacity.

It is evident from Table 4 and FIG. 15 that the same results as those of Examples 2-1 through 2-6 were obtained. In other words, it was found out that when the size of the crystalline phase of CoSn was 10 nm or less, and the Co/(Sn+Co) ratio was within a range from 30 wt % to 70 wt % inclusive, even in the case where the carbon content was 29.7 wt %, the capacity and the cycle characteristics could be improved.

TABLE 4

|  | MATERIAL RATIO (WT%) | | | ANALYTICAL VALUE (WT%) | | | $\frac{Co}{Sn+Co}$ | INITIAL CHARGE CAPACITY (mAh/g) | CAPACITY RETENTION RATIO (%) | CRYSTALLINE PHASE (nm) |
|---|---|---|---|---|---|---|---|---|---|---|
|  | Co | Sn | C | Co | Sn | C | | | | |
| EXAMPLE 4-1 | 21.0 | 49.0 | 30.0 | 20.8 | 48.5 | 29.7 | 30 | 538 | 46 | 9.6 |
| EXAMPLE 4-2 | 25.9 | 44.1 | 30.0 | 25.6 | 43.7 | 29.7 | 37 | 501 | 64 | 9.5 |
| EXAMPLE 4-3 | 31.5 | 38.5 | 30.0 | 31.2 | 38.1 | 29.7 | 45 | 464 | 68 | 9.5 |
| EXAMPLE 4-4 | 35.0 | 35.0 | 30.0 | 34.7 | 34.7 | 29.7 | 50 | 440 | 73 | 9.3 |
| EXAMPLE 4-5 | 42.0 | 28.0 | 30.0 | 41.6 | 27.7 | 29.7 | 60 | 423 | 77 | 9.4 |
| EXAMPLE 4-6 | 46.2 | 23.8 | 30.0 | 45.7 | 23.5 | 29.7 | 66 | 410 | 77 | 9.1 |
| COMPARATIVE EXAMPLE 4-1 | 49.7 | 20.3 | 30.0 | 49.5 | 20.2 | 29.7 | 71 | 348 | 79 | 9.2 |
| COMPARATIVE EXAMPLE 4-2 | 19.6 | 50.4 | 30.0 | 19.4 | 49.9 | 29.7 | 28 | 549 | 10 | 9.5 |

Moreover, as Comparative Examples 4-1 and 4-2 relative to Examples 4-1 through 4-6, anode active materials and secondary batteries were formed as in the case of Examples 4-1 through 4-6, except that the Co/(Sn+Co) ratio was 71 wt % or 28 wt %.

The analysis of the composition and the measurement of the size of the crystalline phase of CoSn were performed on the anode active materials of Examples 4-1 through 4-6 and Comparative Examples 4-1 and 4-2 as in the case of Examples 1-1 through 1-8. The results are shown in Table 4. Moreover, when the XPS measurement was performed, and the obtained peaks were analyzed, as in the case of Examples Examples 5-1 Through 5-5, 6-1 Through 6-5, 7-1 Through 7-5

Anode active materials and secondary batteries were formed as in the case of Examples 1-1 through 1-8, except that the size of the crystalline phase of CoSn was changed within a range of 10 nm or less through changing the operation time and the number of revolutions at the time of synthesizing the anode active materials. At that time, as shown in Tables 5 through 7, the material ratio of carbon was 10 wt %, 20 wt % or 30 wt %, and the Co/(Sn+Co) ratio was fixed to 36 wt %.

TABLE 5

|  | MATERIAL RATIO (WT %) | | | ANALYTICAL VALUE (WT %) | | | INITIAL CHARGE CAPACITY (mAh/g) | CAPACITY RETENTION RATIO (%) | CRYSTALLINE PHASE (nm) |
|---|---|---|---|---|---|---|---|---|---|
|  | Co | Sn | C | Co | Sn | C | | | |
| EXAMPLE 5-1 | 32.4 | 57.6 | 10.0 | 32.2 | 57.2 | 9.9 | 502 | 60 | 9.8 |
| EXAMPLE 5-2 | 32.4 | 57.6 | 10.0 | 32.2 | 57.2 | 9.9 | 508 | 62 | 8.1 |
| EXAMPLE 5-3 | 32.4 | 57.6 | 10.0 | 32.2 | 57.2 | 9.9 | 517 | 63 | 6.5 |
| EXAMPLE 5-4 | 32.4 | 57.6 | 10.0 | 32.2 | 57.2 | 9.9 | 541 | 65 | 4.2 |
| EXAMPLE 5-5 | 32.4 | 57.6 | 10.0 | 32.2 | 57.2 | 9.9 | 567 | 67 | 1.5 |
| COMPARATIVE EXAMPLE 5-1 | 32.4 | 57.6 | 10.0 | 32.2 | 57.2 | 9.9 | 436 | 40 | 12.2 |
| COMPARATIVE EXAMPLE 5-2 | 32.4 | 57.6 | 10.0 | 32.2 | 57.2 | 9.9 | 398 | 27 | 16.4 |

$$\frac{Co}{Sn+Co} = 36 \text{ wt \%}$$

TABLE 6

| | MATERIAL RATIO (WT %) | | | ANALYTICAL VALUE (WT %) | | | INITIAL CHARGE CAPACITY (mAh/g) | CAPACITY RETENTION RATIO (%) | CRYSTALLINE PHASE (nm) |
|---|---|---|---|---|---|---|---|---|---|
| | Co | Sn | C | Co | Sn | C | | | |
| EXAMPLE 6-1 | 28.8 | 51.2 | 20.0 | 28.6 | 50.8 | 19.8 | 527 | 76 | 9.9 |
| EXAMPLE 6-2 | 28.8 | 51.2 | 20.0 | 28.6 | 50.8 | 19.8 | 533 | 78 | 8.0 |
| EXAMPLE 6-3 | 28.8 | 51.2 | 20.0 | 28.6 | 50.8 | 19.8 | 538 | 79 | 6.6 |
| EXAMPLE 6-4 | 28.8 | 51.2 | 20.0 | 28.6 | 50.8 | 19.8 | 568 | 80 | 3.8 |
| EXAMPLE 6-5 | 28.8 | 51.2 | 20.0 | 28.6 | 50.8 | 19.8 | 600 | 82 | 1.4 |
| COMPARATIVE EXAMPLE 6-1 | 28.8 | 51.2 | 20.0 | 28.6 | 50.8 | 19.8 | 461 | 51 | 12.0 |
| COMPARATIVE EXAMPLE 6-2 | 28.8 | 51.2 | 20.0 | 28.6 | 50.8 | 19.8 | 423 | 39 | 16.5 |

$\frac{Co}{Sn+Co} = 36$ wt %

TABLE 7

| | MATERIAL RATIO (WT %) | | | ANALYTICAL VALUE (WT %) | | | INITIAL CHARGE CAPACITY (mAh/g) | CAPACITY RETENTION RATIO (%) | CRYSTALLINE PHASE (nm) |
|---|---|---|---|---|---|---|---|---|---|
| | Co | Sn | C | Co | Sn | C | | | |
| EXAMPLE 7-1 | 25.2 | 44.8 | 30.0 | 25.0 | 44.4 | 29.7 | 504 | 66 | 10.0 |
| EXAMPLE 7-2 | 25.2 | 44.8 | 30.0 | 25.0 | 44.4 | 29.7 | 512 | 67 | 7.7 |
| EXAMPLE 7-3 | 25.2 | 44.8 | 30.0 | 25.0 | 44.4 | 29.7 | 519 | 69 | 6.8 |
| EXAMPLE 7-4 | 25.2 | 44.8 | 30.0 | 25.0 | 44.4 | 29.7 | 542 | 70 | 4.0 |
| EXAMPLE 7-5 | 25.2 | 44.8 | 30.0 | 25.0 | 44.4 | 29.7 | 569 | 73 | 1.4 |
| COMPARATIVE EXAMPLE 7-1 | 25.2 | 44.8 | 30.0 | 25.0 | 44.4 | 29.7 | 438 | 40 | 12.3 |
| COMPARATIVE EXAMPLE 7-2 | 25.2 | 44.8 | 30.0 | 25.0 | 44.4 | 29.7 | 400 | 29 | 16.8 |

$\frac{Co}{Sn+Co} = 36$ wt %

As Comparative Examples 5-1, 5-2, 6-1, 6-2, 7-1 and 7-2 relative to Examples 5-1 through 5-5, 6-1 through 6-5 and 7-1 through 7-5, anode active materials and secondary batteries were formed as in the case of Examples 5-1 through 5-5, 6-1 through 6-5 and 7-1 through 7-5, except that the operation time and the number of revolutions at the time of synthesizing the anode active materials were changed, thereby the size of the crystalline phase of CoSn had larger than 10 nm in size.

The analysis of the composition and the measurement of the size of the crystalline phase of CoSn were performed on the anode active materials of Examples 5-1 through 5-5, 6-1 through 6-5 and 7-1 through 7-5 and Comparative Examples 5-1, 5-2, 6-1, 6-2, 7-1 and 7-2 as in the case of Examples 1-1 through 1-8. The results are shown in Tables 5 through 7. Moreover, when the XPS measurement was performed, and the obtained peaks were analyzed, as in the case of Examples 1-1 through 1-8, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was bonded to another element. Further, the initial charge capacities and the cycle characteristics of the secondary batteries were measured as in the case of Examples 1-1 through 1-8. The results are shown in Tables 5 through 7 and FIGS. 16 through 18.

Figure 16:
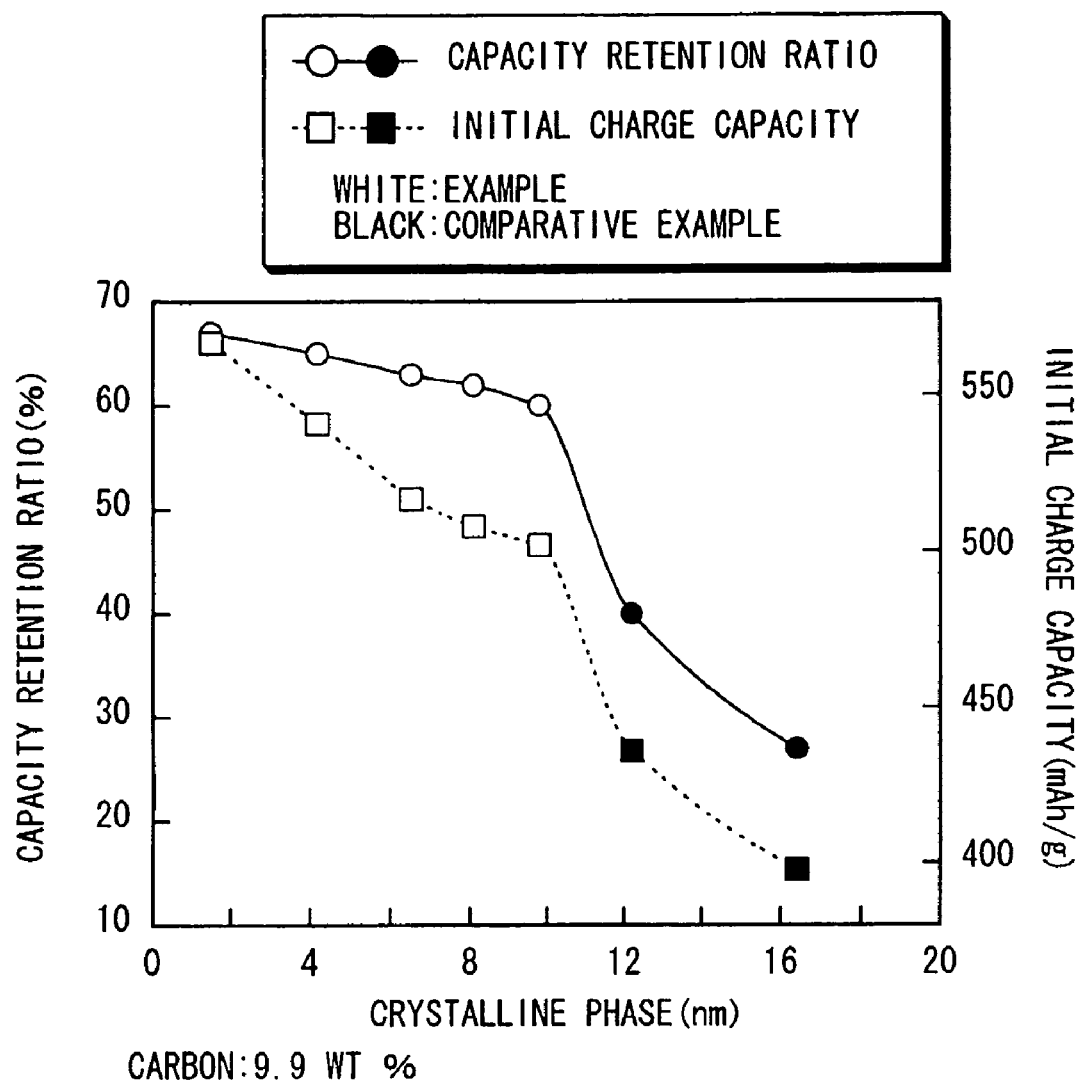
FIG. 16 is a plot showing a relationship between the size of a crystalline phase of CoSn in an anode active material, a capacity retention ratio and an initial charge capacity.
Figure 17:
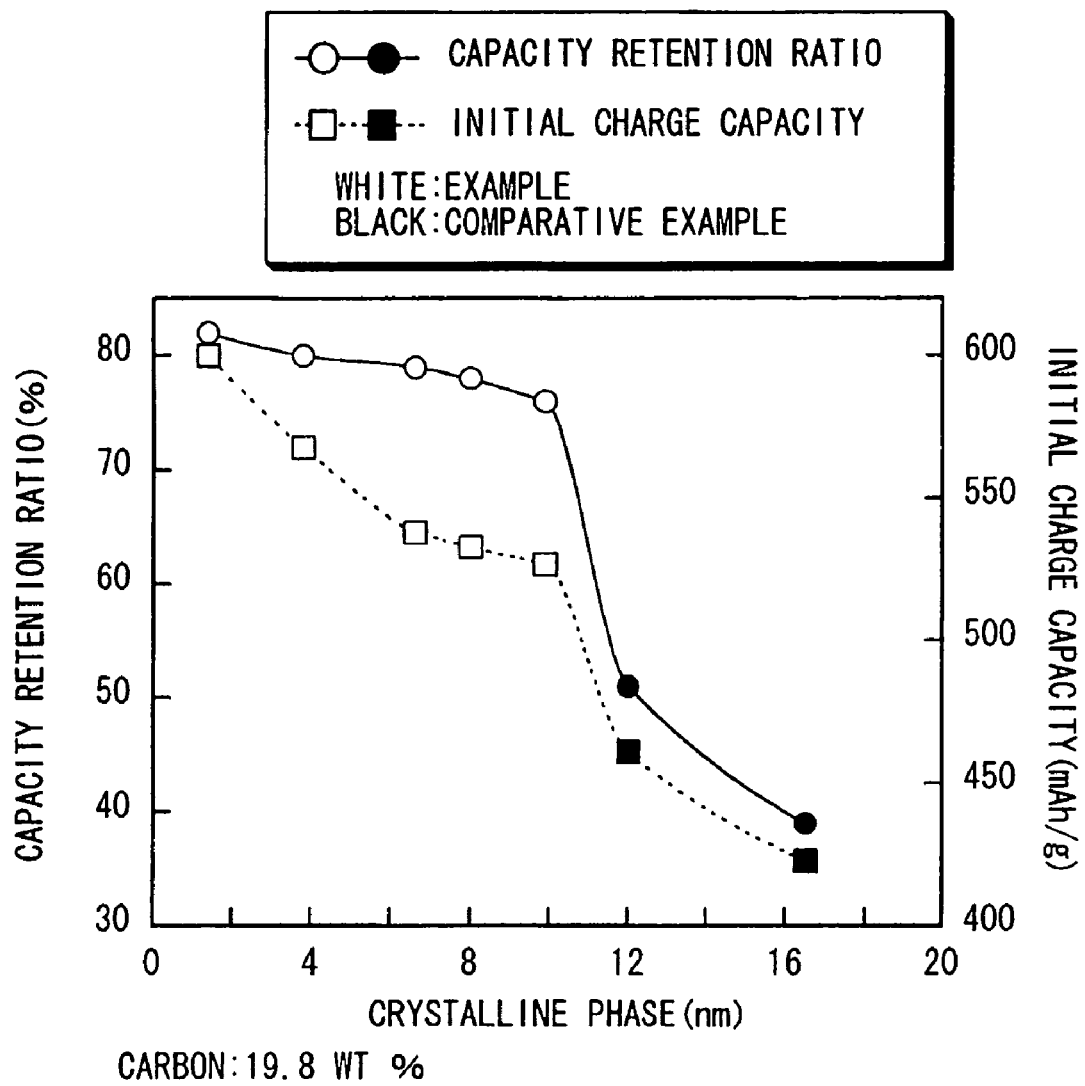
FIG. 17 is another plot showing a relationship between the size of a crystalline phase of CoSn in an anode active material, a capacity retention ratio and an initial charge capacity.
Figure 18:
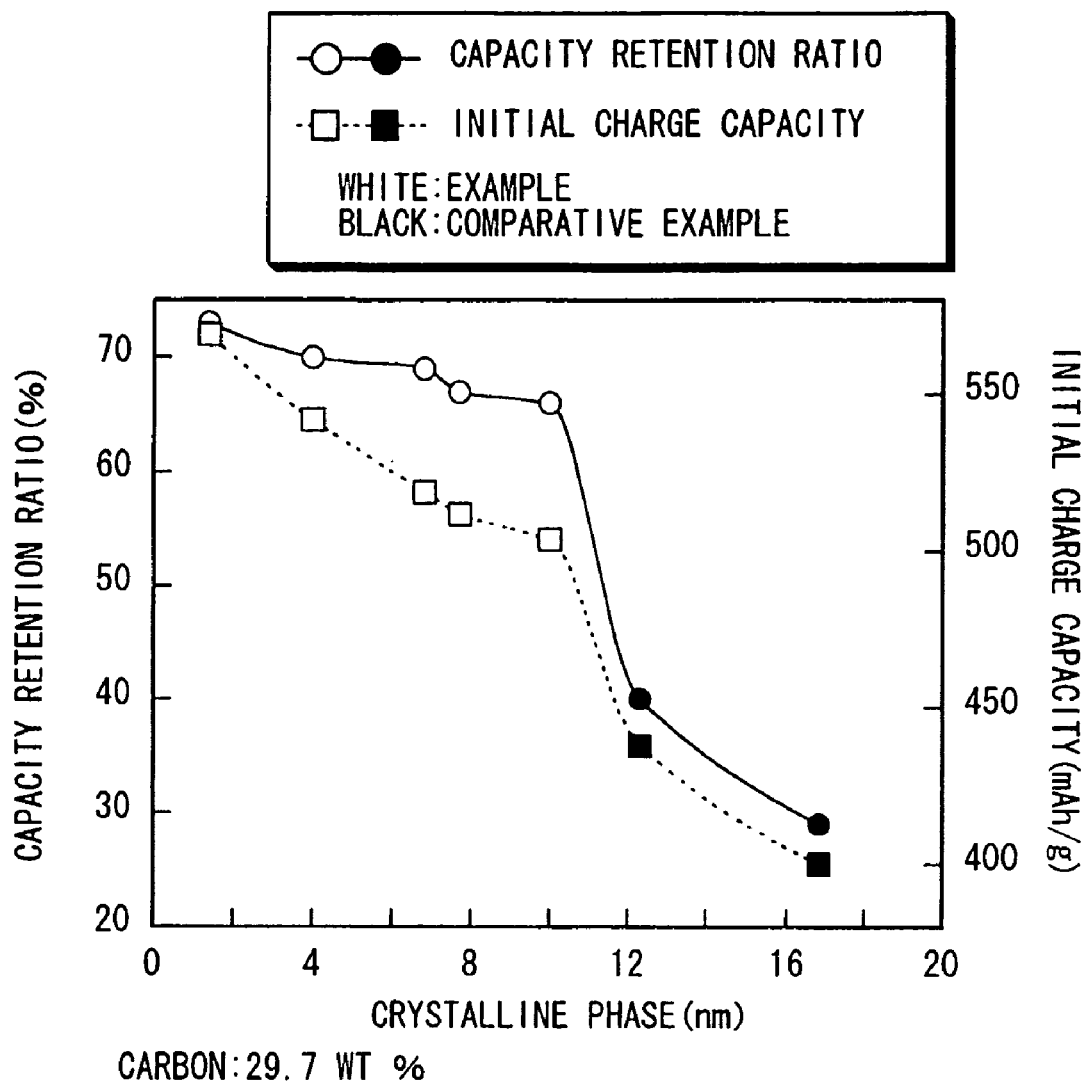
FIG. 18 is another plot showing a relationship between the size of a crystalline phase of CoSn in an anode active material, a capacity retention ratio and an initial charge capacity.

It is evident from Tables 5 through 7 and FIGS. 16 through 18 that in the case where the carbon content was 9.9 wt %, 19.8 wt % or 29.7 wt %, as the size of the crystalline phase of CoSn was reduced, the initial charge capacity and the capacity retention ratio were improved. In other words, it was found out that when the size of the crystalline phase of CoSn was reduced, the capacity and the cycle characteristics could be improved.

Examples 8-1 Through 8-7, 9-1 Through 9-7, 10-1 Through 10-7

Anode active materials and secondary batteries were formed as in the case of Examples 1-1 through 1-8, except that as materials, silicon powder was further used, and the material ratios of cobalt, tin, carbon and silicon were changed as shown in Tables 8 through 10. More specifically, the material ratio of the silicon powder was changed within a range from 0 wt % to 8.0 wt % inclusive, the Co/(Sn+Co) ratio was fixed to 37 wt %, and the material ratio of carbon was fixed to 10 wt %, 20 wt % or 30 wt %. The analysis of the composition and the measurement of the size of the crystalline phase of CoSn were performed on the anode active materials of Examples 8-1 through 8-7, 9-1 through 9-7 and 10-1 through 10-7 as in the case of Examples 1-1 through 1-8. The results are shown in Tables 8 through 10. The silicon content was measured by ICP emission spectrometry. Moreover, when the XPS measurement was performed, and the obtained peaks were analyzed, as in the case of Examples 1-1 through 1-8, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was bonded to another element. Further, the initial charge capacities and the cycle characteristics of the secondary batteries were measured as in the same manner. The results are shown in Tables 8 through 10.

TABLE 8

| | MATERIAL RATIO (WT %) | | | | ANALYTICAL VALUE (WT %) | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|
| | Co | Sn | C | Si | Co | Sn | C | Si | | | |
| EXAMPLE 8-1 | 33.3 | 56.7 | 10.0 | 0 | 33.0 | 56.1 | 9.9 | 0 | 488 | 60 | 9.7 |
| EXAMPLE 8-2 | 33.2 | 56.4 | 10.0 | 0.4 | 32.9 | 56.0 | 9.9 | 0.4 | 492 | 59 | 9.4 |
| EXAMPLE 8-3 | 33.1 | 56.4 | 10.0 | 0.5 | 32.8 | 55.8 | 9.9 | 0.5 | 512 | 58 | 9.4 |
| EXAMPLE 8-4 | 32.9 | 56.1 | 10.0 | 1.0 | 32.6 | 55.6 | 9.9 | 1.0 | 529 | 54 | 9.6 |
| EXAMPLE 8-5 | 32.2 | 54.8 | 10.0 | 3.0 | 31.9 | 54.3 | 9.9 | 3.0 | 541 | 50 | 9.3 |
| EXAMPLE 8-6 | 31.5 | 53.5 | 10.0 | 5.0 | 31.1 | 53.0 | 9.9 | 4.9 | 566 | 45 | 9.5 |
| EXAMPLE 8-7 | 30.3 | 51.7 | 10.0 | 8.0 | 30.1 | 51.2 | 9.9 | 7.9 | 598 | 39 | 9.4 |

$$\frac{Co}{Sn+Co} = 37 \text{ wt \%}$$

TABLE 9

| | MATERIAL RATIO (WT %) | | | | ANALYTICAL VALUE (WT %) | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|
| | Co | Sn | C | Si | Co | Sn | C | Si | | | |
| EXAMPLE 9-1 | 29.6 | 50.4 | 20.0 | 0 | 29.3 | 49.9 | 19.8 | 0 | 517 | 73 | 9.8 |
| EXAMPLE 9-2 | 29.5 | 50.1 | 20.0 | 0.4 | 29.1 | 49.5 | 19.8 | 0.4 | 520 | 72 | 9.6 |
| EXAMPLE 9-3 | 29.4 | 50.1 | 20.0 | 0.5 | 29.1 | 49.6 | 19.8 | 0.5 | 534 | 71 | 9.5 |
| EXAMPLE 9-4 | 29.2 | 49.8 | 20.0 | 1.0 | 28.9 | 49.3 | 19.8 | 1.0 | 555 | 67 | 9.6 |
| EXAMPLE 9-5 | 28.5 | 48.5 | 20.0 | 3.0 | 28.2 | 48.0 | 19.8 | 3.0 | 570 | 60 | 9.4 |
| EXAMPLE 9-6 | 27.7 | 47.3 | 20.0 | 5.0 | 27.6 | 46.9 | 19.8 | 4.9 | 591 | 53 | 9.8 |
| EXAMPLE 9-7 | 26.6 | 45.4 | 20.0 | 8.0 | 26.4 | 44.9 | 19.8 | 7.9 | 625 | 46 | 9.7 |

$$\frac{Co}{Sn+Co} = 37 \text{ wt \%}$$

TABLE 10

| | MATERIAL RATIO (WT %) | | | | ANALYTICAL VALUE (WT %) | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|
| | Co | Sn | C | Si | Co | Sn | C | Si | | | |
| EXAMPLE 10-1 | 25.9 | 44.1 | 30.0 | 0 | 25.6 | 43.7 | 29.7 | 0 | 490 | 66 | 9.7 |
| EXAMPLE 10-2 | 25.8 | 43.8 | 30.0 | 0.4 | 25.6 | 43.5 | 29.7 | 0.4 | 495 | 64 | 9.5 |
| EXAMPLE 10-3 | 25.7 | 43.8 | 30.0 | 0.5 | 25.5 | 43.4 | 29.7 | 0.5 | 513 | 63 | 9.4 |
| EXAMPLE 10-4 | 25.5 | 43.5 | 30.0 | 1.0 | 25.3 | 43.1 | 29.7 | 1.0 | 531 | 58 | 9.5 |
| EXAMPLE 10-5 | 24.8 | 42.2 | 30.0 | 3.0 | 24.6 | 41.9 | 29.7 | 3.0 | 545 | 52 | 9.8 |
| EXAMPLE 10-6 | 24.1 | 40.9 | 30.0 | 5.0 | 23.9 | 40.6 | 29.7 | 4.9 | 565 | 46 | 9.6 |
| EXAMPLE 10-7 | 22.9 | 39.1 | 30.0 | 8.0 | 22.8 | 38.8 | 29.7 | 7.9 | 599 | 41 | 9.7 |

$$\frac{Co}{Sn+Co} = 37 \text{ wt \%}$$

It is evident from Tables 8 through 10 that in Examples 8-2 through 8-7, 9-2 through 9-7 and 10-2 through 10-7 in which silicon was included, the initial charge capacity could be improved, compared to Examples 8-1, 9-1 and 10-1 in which no silicon was included. However, there was a tendency that the capacity retention ratio declined with an increase in the silicon content.

In other words, it was found out that when the size of the crystalline phase of CoSn was 10 nm or less, and silicon was included in the anode active material, the capacity could be improved, and the silicon content was preferably within a range from 0.5 wt % to 7.9 wt % inclusive.

Examples 11-1 Through 11-9

Anode active materials were synthesized, and secondary batteries were formed as in the case of Examples 1-1 through 1-8, except that cobalt powder, tin powder, carbon powder and titanium powder were prepared as materials, and the material ratios of them were changed as shown in Table 11. More specifically, the material ratio of titanium was changed within a range from 0 wt % to 16.0 wt % inclusive, and the Co/(Sn+Co) ratio was fixed to 39 wt %, and the material ratio of carbon was fixed to 20 wt %. Moreover, the anode active materials were synthesized through alloying the cobalt powder and the tin powder or the cobalt powder, the tin powder and the titanium powder to form cobalt-tin alloy powder or cobalt-tin-titanium alloy powder, and then mixing carbon powder to the alloy powder. The analysis of the composition and the measurement of the size of the crystalline phase of CoSn were performed on the anode active materials of Examples 11-1 through 11-9 as in the case of Examples 1-1 through 1-8. The results are shown in Table 11. The titanium content was measured by ICP emission spectrometry. Moreover, when the XPS measurement was performed, and the obtained peaks were analyzed, as in the case of Examples 1-1 through 1-8, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was bonded to another element. Further, the initial charge capacities and the cycle characteristics of the secondary batteries were measured in the same manner. The results are shown in Table 11 and FIG. 19.

could be improved, compared to Example 11-1 in which no titanium was included and Example 11-9 in which the titanium content was larger than 14.9 wt %. Moreover, when the titanium content was 2.4 wt % or more, specifically within a range from 4.0 wt % to 12.9 wt % inclusive, a higher value could be obtained.

In other words, it was found out that when the size of the crystalline phase of CoSn was 10 nm or less, and the anode active material included titanium within a range of 14.9 wt % or less, the cycle characteristics could be improved, and the titanium content was more preferably 2.4 wt % or more, and more preferably within a range from 4.0 wt % to 12.9 wt % inclusive.

Example 12-1 Through 12-12

Anode active materials were synthesized, and secondary batteries were formed as in the case of Examples 1-1 through 1-8, except that cobalt powder, tin powder and carbon powder, and titanium powder, molybdenum powder, niobium powder, aluminum powder, germanium powder, indium powder, phosphorus powder, titanium powder and gallium powder, or bismuth powder were used as materials, and the material ratios of cobalt, tin, carbon, titanium, molybdenum, niobium, aluminum, germanium, indium, phosphorus, gallium and bismuth were changed as shown in Table 12. More specifically, the material ratio of titanium, molybdenum, niobium, aluminum, germanium, indium, phosphorus, titanium and gallium, or bismuth was 0 wt %, 3.8 wt %, 4.0 wt %, 5.0 wt %, 10.0 wt %, 15.0 wt % or 17.0 wt %, and the Co/(Sn+Co) ratio was fixed to 39 wt %, and the material ratio of carbon was fixed to 10 wt %. Moreover, in Example 12-1, the anode active material was formed through alloying the cobalt powder and the tin powder to form cobalt-tin alloy powder, and then mixing the carbon powder with the alloy powder. In Example 12-2, the anode active material was formed through alloying the cobalt powder, the tin powder and the titanium powder to form cobalt-tin-titanium alloy powder, and then mixing the carbon powder with the alloy powder. Moreover, in Examples 12-3 through 12-8, the anode active materials were formed through alloying the cobalt powder and the tin powder to form cobalt-tin alloy powder, and then mixing the carbon powder, and the molybdenum powder, the niobium powder, the aluminum powder, the germanium powder, the indium powder or the phosphorus powder with the alloy

TABLE 11

| | MATERIAL RATIO (WT %) | | | | ANALYTICAL VALUE (WT %) | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|
| | Co | Sn | C | Ti | Co | Sn | C | Ti | | | |
| EXAMPLE 11-1 | 31.2 | 48.8 | 20.0 | 0 | 31.0 | 48.4 | 19.8 | 0 | 500 | 63 | 9.8 |
| EXAMPLE 11-2 | 30.2 | 47.3 | 20.0 | 2.5 | 30.0 | 46.9 | 19.8 | 2.4 | 521 | 80 | 9.7 |
| EXAMPLE 11-3 | 29.5 | 46.5 | 20.0 | 4.0 | 29.3 | 45.9 | 19.8 | 4.0 | 533 | 84 | 9.6 |
| EXAMPLE 11-4 | 28.9 | 45.1 | 20.0 | 6.0 | 28.6 | 44.7 | 19.8 | 6.0 | 541 | 87 | 9.5 |
| EXAMPLE 11-5 | 28.1 | 43.9 | 20.0 | 8.0 | 27.8 | 43.5 | 19.8 | 7.9 | 549 | 88 | 9.3 |
| EXAMPLE 11-6 | 27.3 | 42.7 | 20.0 | 10.0 | 27.1 | 42.4 | 19.8 | 9.9 | 521 | 87 | 9.3 |
| EXAMPLE 11-7 | 26.1 | 40.9 | 20.0 | 13.0 | 25.9 | 40.5 | 19.8 | 12.9 | 486 | 85 | 9.2 |
| EXAMPLE 11-8 | 25.4 | 39.6 | 20.0 | 15.0 | 25.2 | 39.3 | 19.8 | 14.9 | 467 | 82 | 9.1 |
| EXAMPLE 11-9 | 25.0 | 39.0 | 20.0 | 16.0 | 24.8 | 28.7 | 19.8 | 15.8 | 454 | 61 | 8.9 |

$$\frac{Co}{Sn+Co} = 39 \text{ wt \%}$$

Figure 19:
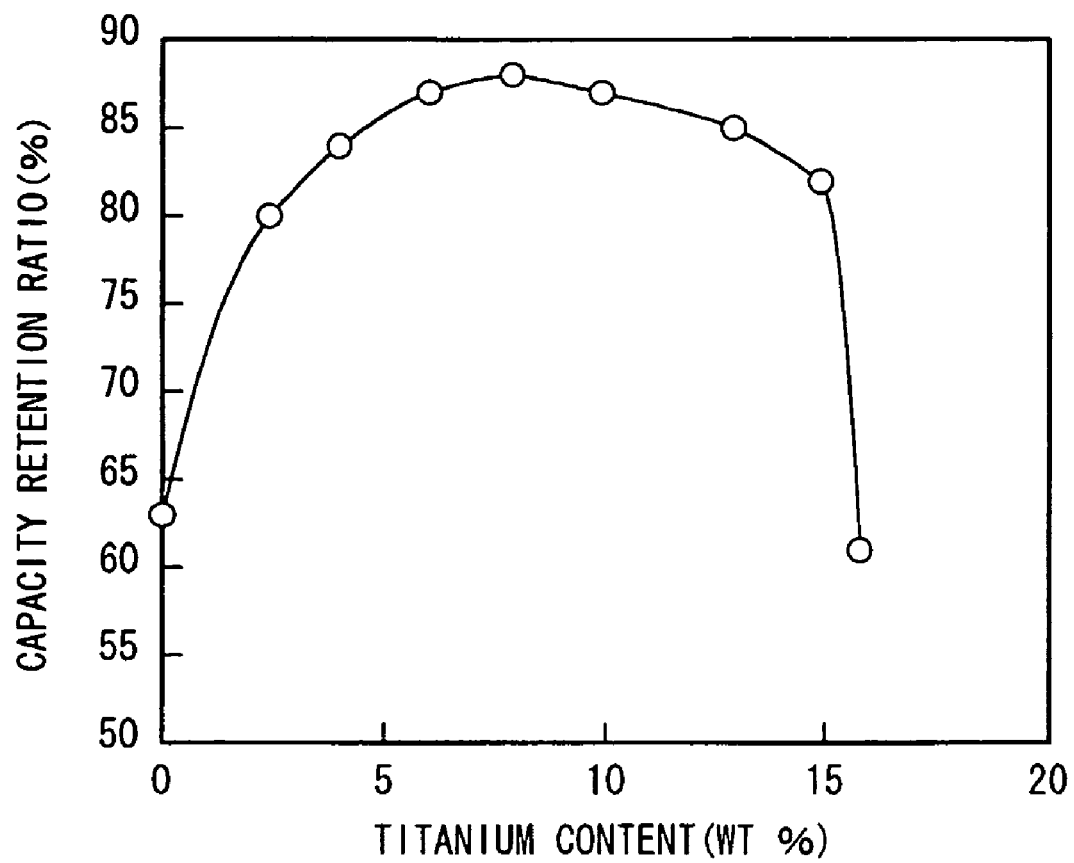
FIG. 19 is a plot showing a relationship between the titanium content in an anode active material and a capacity retention ratio.

It is evident from Table 11 and FIG. 19 that in Examples 11-2 through 11-8 in which titanium was included within a range from 14.9 wt % or less, the capacity retention ratio powder. In Example 12-9, the anode active material was formed through alloying the cobalt powder, the tin powder and the titanium powder to form cobalt-tin-titanium alloy powder, and then mixing the carbon powder and the germanium powder with the alloy powder. Further, in Examples 12-10 through 12-12, the anode active materials were formed through alloying the cobalt powder, the tin powder and the bismuth powder to from cobalt-tin-bismuth alloy, and then mixing the carbon powder with the alloy powder. The analysis of the composition and the measurement of the size of the crystalline phase of CoSn were performed on the anode active materials of Examples 12-1 through 12-12 as in the case of Examples 1-1 through 1-8. The results are shown in Table 13. The contents of molybdenum, niobium, aluminum, germanium, indium, phosphorus, gallium and bismuth were measured by ICP emission spectrometry. Moreover, when the XPS measurement was performed, and the obtained peaks were analyzed, as in the case of Examples 1-1 through 1-8, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was bonded to another element. Further, the initial charge capacities and the cycle characteristics of the secondary batteries were measured in the same manner. The results are shown in Table 13.

TABLE 12

| | MATERIAL RATIO (WT %) | | | | | | | | | | |
|---|---|---|---|---|---|---|---|---|---|---|---|
| | Co | Sn | C | Ti | Mo | Nb | Al | Ge | In | P | Ga | Bi |
| EXAMPLE 12-1 | 35.1 | 54.9 | 10.0 | — | — | — | — | — | — | — | — | — |
| EXAMPLE 12-2 | 33.5 | 52.5 | 10.0 | 4.0 | — | — | — | — | — | — | — | — |
| EXAMPLE 12-3 | 33.6 | 52.6 | 10.0 | — | 3.8 | — | — | — | — | — | — | — |
| EXAMPLE 12-4 | 33.6 | 52.6 | 10.0 | — | — | 3.8 | — | — | — | — | — | — |
| EXAMPLE 12-5 | 33.2 | 51.8 | 10.0 | — | — | — | 5.0 | — | — | — | — | — |
| EXAMPLE 12-6 | 33.2 | 51.8 | 10.0 | — | — | — | — | 5.0 | — | — | — | — |
| EXAMPLE 12-7 | 33.5 | 52.5 | 10.0 | — | — | — | — | — | 4.0 | — | — | — |
| EXAMPLE 12-8 | 33.2 | 51.8 | 10.0 | — | — | — | — | — | — | 5.0 | — | — |
| EXAMPLE 12-9 | 33.2 | 51.8 | 10.0 | 4.0 | — | — | — | — | — | — | 1.0 | — |
| EXAMPLE 12-10 | 31.2 | 48.8 | 10.0 | — | — | — | — | — | — | — | — | 10.0 |
| EXAMPLE 12-11 | 29.3 | 45.7 | 10.0 | — | — | — | — | — | — | — | — | 15.0 |
| EXAMPLE 12-12 | 28.5 | 44.5 | 10.0 | — | — | — | — | — | — | — | — | 17.0 |

$$\frac{Co}{Sn + Co} = 39 \text{ wt \%}$$

TABLE 13

| | ANALYTICAL VALUE (WT %) | | | | | | | | | | | | INITIAL CHARGE CAPACITY | CAPACITY RETENTION RATIO | CRYSTALLINE PHASE |
|---|---|---|---|---|---|---|---|---|---|---|---|---|---|---|---|
| | Co | Sn | C | Ti | Mo | Nb | Al | Ge | In | P | Ga | Bi | (mAh/g) | (%) | (nm) |
| EXAMPLE 22-1 | 34.8 | 54.4 | 9.9 | — | — | — | — | — | — | — | — | — | 489 | 62 | 9.5 |
| EXAMPLE 12-2 | 33.2 | 52.0 | 9.9 | 4.0 | — | — | — | — | — | — | — | — | 523 | 69 | 9.3 |
| EXAMPLE 12-3 | 33.3 | 52.1 | 9.9 | — | 3.8 | — | — | — | — | — | — | — | 516 | 68 | 9.6 |
| EXAMPLE 12-4 | 33.3 | 52.1 | 9.9 | — | — | 3.8 | — | — | — | — | — | — | 521 | 69 | 9.8 |
| EXAMPLE 12-5 | 32.9 | 51.4 | 9.9 | — | — | — | 5.0 | — | — | — | — | — | 526 | 67 | 9.4 |
| EXAMPLE 12-6 | 32.9 | 51.4 | 9.9 | — | — | — | — | 5.0 | — | — | — | — | 511 | 67 | 9.5 |
| EXAMPLE 12-7 | 33.2 | 52.0 | 9.9 | — | — | — | — | — | 4.0 | — | — | — | 531 | 68 | 9.2 |
| EXAMPLE 12-8 | 32.9 | 51.4 | 9.9 | — | — | — | — | — | — | 5.0 | — | — | 555 | 66 | 9.4 |
| EXAMPLE 12-9 | 32.9 | 51.4 | 9.9 | 4.0 | — | — | — | — | — | — | 1.0 | — | 502 | 70 | 9.7 |
| EXAMPLE 12-10 | 30.9 | 48.4 | 9.9 | — | — | — | — | — | — | — | — | 9.9 | 450 | 73 | 9.3 |
| EXAMPLE 12-11 | 29.0 | 45.3 | 9.9 | — | — | — | — | — | — | — | — | 14.9 | 436 | 72 | 9.3 |
| EXAMPLE 12-12 | 28.2 | 44.1 | 9.9 | — | — | — | — | — | — | — | — | 16.8 | 343 | 59 | 9.5 |

$$\frac{Co}{Sn + Co} = 39 \text{ wt \%}$$

As shown in Tables 12 and 13, in Examples 12-2 through 12-11, the cycle characteristics could be improved as in the case of Examples 11-2 through 11-8. In other words, it was found out that when the size of the crystalline phase of CoSn was 10 nm or less, and the anode active material included at least one kind selected from the group consisting of titanium, molybdenum, niobium, aluminum, germanium, indium, phosphorus, gallium and bismuth within a range of 14.9 wt % or less, the cycle characteristics could be further improved.

Examples 13-1 Through 13-10

Anode active materials were synthesized, and secondary batteries were formed as in the case of Examples 1-1 through 1-8, except that cobalt powder, tin powder and carbon powder, and molybdenum powder, niobium powder, aluminum powder, germanium powder, indium powder, phosphorus powder, titanium powder and gallium powder, or bismuth powder were used as materials, and the material ratios of cobalt, tin, carbon, molybdenum, niobium, aluminum, germanium, indium, phosphorus, titanium, gallium and bismuth were changed as shown in Table 14. More specifically, the material ratio of molybdenum, niobium, aluminum, germanium, indium, phosphorus, titanium and gallium, or bismuth was 3.8 wt %, 4.0 wt %, 5.0 wt %, 10.0 wt %, 15.0 wt % or 17.0 wt %, and the Co/(Sn+Co) ratio was fixed to 39 wt %, and the material ratio of carbon was fixed to 20 wt %. Moreover, in Examples 13-1 through 13-6, the anode active materials were synthesized through alloying the cobalt powder and the tin powder to form cobalt-tin alloy powder, and then mixing the carbon powder, and the molybdenum powder, the niobium powder, the aluminum powder, the germanium powder, the indium powder or the phosphorus powder with the alloy powder. In Example 13-7, the anode active material was formed through alloying the cobalt powder, the tin powder and the titanium powder to form cobalt-tin-titanium alloy powder, and then mixing the carbon powder and the germanium powder with the alloy powder. In Examples 13-8 through 13-10, the anode active materials were formed through alloying the cobalt powder, the tin powder and the bismuth powder to form cobalt-tin-bismuth alloy powder, and then mixing the carbon powder with the alloy powder. The analysis of the composition and the measurement of the size of the crystalline phase of CoSn were performed on the anode active materials of Examples 13-1 through 13-10 as in the case of Examples 1-1 through 1-8. The results are shown in Table 15. Moreover, when the XPS measurement was performed, and the obtained peaks were analyzed, as in the case of Examples 1-1 through 1-8, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was bonded to another element. Further, the initial charge capacities and the cycle characteristics of the secondary batteries were measured in the same manner. The results are shown in Table 15.

TABLE 14

| | MATERIAL RATIO (WT %) | | | | | | | | | | | |
|---|---|---|---|---|---|---|---|---|---|---|---|---|
| | Co | Sn | C | Ti | Mo | Nb | Al | Ge | In | P | Ga | Bi |
| EXAMPLE 11-1 | 31.2 | 48.8 | 20.0 | — | — | — | — | — | — | — | — | — |
| EXAMPLE 11-3 | 29.6 | 46.4 | 20.0 | 4.0 | — | — | — | — | — | — | — | — |
| EXAMPLE 13-1 | 29.7 | 46.5 | 20.0 | — | 3.8 | — | — | — | — | — | — | — |
| EXAMPLE 13-2 | 29.7 | 46.5 | 20.0 | — | — | 3.8 | — | — | — | — | — | — |
| EXAMPLE 13-3 | 29.3 | 45.7 | 20.0 | — | — | — | 5.0 | — | — | — | — | — |
| EXAMPLE 13-4 | 29.3 | 45.7 | 20.0 | — | — | — | — | 5.0 | — | — | — | — |
| EXAMPLE 13-5 | 29.6 | 46.4 | 20.0 | — | — | — | — | — | 4.0 | — | — | — |
| EXAMPLE 13-6 | 29.3 | 45.7 | 20.0 | — | — | — | — | — | — | 5.0 | — | — |
| EXAMPLE 13-7 | 29.3 | 45.7 | 20.0 | 4.0 | — | — | — | — | — | — | 1.0 | — |
| EXAMPLE 13-8 | 27.3 | 42.7 | 20.0 | — | — | — | — | — | — | — | — | 10.0 |
| EXAMPLE 13-9 | 25.4 | 39.6 | 20.0 | — | — | — | — | — | — | — | — | 15.0 |
| EXAMPLE 13-10 | 24.6 | 38.4 | 20.0 | — | — | — | — | — | — | — | — | 17.0 |

$$\frac{Co}{Sn+Co} = 39 \text{ wt }\%$$

TABLE 15

| | ANALYTICAL VALUE (WT %) | | | | | | | | | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|---|---|---|---|
| | Co | Sn | C | Ti | Mo | Nb | Al | Ge | In | P | Ga | Bi | | | |
| EXAMPLE 11-1 | 31.0 | 48.4 | 19.8 | — | — | — | — | — | — | — | — | — | 500 | 63 | 9.8 |
| EXAMPLE 11-3 | 29.4 | 46.0 | 19.8 | 4.0 | — | — | — | — | — | — | — | — | 533 | 84 | 9.6 |
| EXAMPLE 13-1 | 29.5 | 46.1 | 19.8 | — | 3.8 | — | — | — | — | — | — | — | 542 | 83 | 9.1 |
| EXAMPLE 13-2 | 29.5 | 46.1 | 19.8 | — | — | 3.8 | — | — | — | — | — | — | 546 | 84 | 9.8 |
| EXAMPLE 13-3 | 29.1 | 45.4 | 19.8 | — | — | — | 5.0 | — | — | — | — | — | 551 | 80 | 9.7 |
| EXAMPLE 13-4 | 29.1 | 45.4 | 19.8 | — | — | — | — | 5.0 | — | — | — | — | 537 | 81 | 9.9 |

TABLE 15-continued

| | ANALYTICAL VALUE (WT %) | | | | | | | | | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|---|---|---|---|
| | Co | Sn | C | Ti | Mo | Nb | Al | Ge | In | P | Ga | Bi | | | |
| EXAMPLE 13-5 | 29.4 | 46.0 | 19.8 | — | — | — | — | — | 4.0 | — | — | — | 552 | 84 | 9.4 |
| EXAMPLE 13-6 | 29.1 | 45.4 | 19.8 | — | — | — | — | — | — | 5.0 | — | — | 581 | 75 | 9.7 |
| EXAMPLE 13-7 | 29.1 | 45.4 | 19.8 | 4.0 | — | — | — | — | — | — | 1.0 | — | 527 | 87 | 9.5 |
| EXAMPLE 13-8 | 27.1 | 42.4 | 19.8 | — | — | — | — | — | — | — | — | 9.9 | 474 | 90 | 9.6 |
| EXAMPLE 13-9 | 25.2 | 39.3 | 19.8 | — | — | — | — | — | — | — | — | 14.9 | 456 | 89 | 9.7 |
| EXAMPLE 13-10 | 24.4 | 38.1 | 19.8 | — | — | — | — | — | — | — | — | 16.8 | 364 | 61 | 9.7 |

$\frac{Co}{Sn + Co} = 39$ wt %

As shown in Tables 14 and 15, in Examples 13-1 through 13-9, the cycle characteristics could be improved as in the case of Examples 11-2 through 11-8. In other words, it was found out that when the size of the crystalline phase of CoSn was 10 nm or less, and the anode active material included at least one kind selected from the group consisting of titanium, molybdenum, niobium, aluminum, germanium, indium, phosphorus, gallium and bismuth within a range of 14.9 wt % or less, even in the case where the carbon content was 19.8 wt %, the cycle characteristics could be further improved.

Examples 14-1 Through 14-12

Anode active materials were synthesized, and secondary batteries were formed as in the case of Examples 1-1 through 1-8, except that cobalt powder, tin powder and carbon powder, and titanium powder, molybdenum powder, niobium powder, aluminum powder, germanium powder, indium powder, phosphorus powder, titanium powder and gallium powder, or bismuth powder were used as materials, and the material ratios of cobalt, tin, carbon, titanium, molybdenum, niobium, aluminum, germanium, indium, phosphorus, gallium and bismuth were changed as shown in Table 16. More specifically, the material ratio of titanium, molybdenum, niobium, aluminum, germanium, indium, phosphorus, titanium and gallium, or bismuth was 0 wt %, 3.8 wt %, 4.0 wt %, 5.0 wt %, 10.0 wt %, 15.0 wt % or 17.0 wt %, and the Co/(Sn+Co) ratio was fixed to 39 wt %, and the material ratio of carbon was fixed to 30 wt %. In Example 14-1, the anode active material was formed through alloying the cobalt powder and the tin powder to form cobalt-tin alloy powder, and then mixing the carbon powder with the alloy powder. In Example 14-2, the anode active material was formed through alloying the cobalt powder, the tin powder and the titanium powder to form cobalt-tin-titanium alloy powder, and then mixing the carbon powder with the alloy powder. In Examples 14-3 through 14-8, the anode active materials were formed through alloying the cobalt powder and the tin powder to form cobalt-tin alloy powder, and then mixing the carbon powder, and the molybdenum powder, the niobium powder, the aluminum powder, the germanium powder, the indium powder or the phosphorus powder with the alloy powder. In Example 14-9, the anode active material was formed through alloying the cobalt powder, the tin powder and titanium powder to form cobalt-tin-titanium alloy powder, and then mixing the carbon powder and the germanium powder with the alloy powder. In Examples 14-10 through 14-12, the anode active materials were formed through alloying the cobalt powder, the tin powder and the bismuth powder to form cobalt-tin-bismuth alloy powder, and then mixing the carbon powder with the alloy powder. The analysis of the composition and the measurement of the size of the crystalline phase of CoSn were performed on the anode active materials of Examples 14-1 through 14-12 as in the case of Examples 1-1 through 1-8. The results are shown in Table 17. Moreover, when the XPS measurement was performed, and the obtained peaks were analyzed, as in the case of Examples 1-1 through 1-8, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was bonded to another element. Further, the initial charge capacities and the cycle characteristics of the secondary batteries were measured in the same manner. The results are shown in Table 17.

TABLE 16

| | MATERIAL RATIO (WT %) | | | | | | | | | | | |
|---|---|---|---|---|---|---|---|---|---|---|---|---|
| | Co | Sn | C | Ti | Mo | Nb | Al | Ge | In | P | Ga | Bi |
| EXAMPLE 14-1 | 27.3 | 42.7 | 30.0 | — | — | — | — | — | — | — | — | — |
| EXAMPLE 14-2 | 25.7 | 40.3 | 30.0 | 4.0 | — | — | — | — | — | — | — | — |
| EXAMPLE 14-3 | 25.8 | 40.4 | 30.0 | — | 3.8 | — | — | — | — | — | — | — |
| EXAMPLE 14-4 | 25.8 | 40.4 | 30.0 | — | — | 3.8 | — | — | — | — | — | — |
| EXAMPLE 14-5 | 25.4 | 39.6 | 30.0 | — | — | — | 5.0 | — | — | — | — | — |
| EXAMPLE 14-6 | 25.4 | 39.6 | 30.0 | — | — | — | — | 5.0 | — | — | — | — |
| EXAMPLE 14-7 | 25.7 | 40.3 | 30.0 | — | — | — | — | — | 4.0 | — | — | — |
| EXAMPLE 14-8 | 25.4 | 39.6 | 30.0 | — | — | — | — | — | — | 5.0 | — | — |

TABLE 16-continued

| | MATERIAL RATIO (WT %) | | | | | | | | | | | |
|---|---|---|---|---|---|---|---|---|---|---|---|---|
| | Co | Sn | C | Ti | Mo | Nb | Al | Ge | In | P | Ga | Bi |
| EXAMPLE 14-9 | 25.4 | 39.6 | 30.0 | 4.0 | — | — | — | — | — | — | 1.0 | — |
| EXAMPLE 14-10 | 23.4 | 36.6 | 30.0 | — | — | — | — | — | — | — | — | 10.0 |
| EXAMPLE 14-11 | 21.5 | 33.5 | 30.0 | — | — | — | — | — | — | — | — | 15.0 |
| EXAMPLE 14-12 | 20.7 | 32.3 | 30.0 | — | — | — | — | — | — | — | — | 17.0 |

$\frac{Co}{Sn+Co} = 39$ wt %

TABLE 34

| | ANALYTICAL VALUE (WT %) | | | | | | | | | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|---|---|---|---|
| | Co | Sn | C | Ti | Mo | Nb | Al | Ge | In | P | Ga | Bi | | | |
| EXAMPLE 14-1 | 27.1 | 42.3 | 29.7 | — | — | — | — | — | — | — | — | — | 492 | 65 | 9.5 |
| EXAMPLE 14-2 | 25.5 | 39.9 | 29.7 | 4.0 | — | — | — | — | — | — | — | — | 525 | 72 | 9.3 |
| EXAMPLE 14-3 | 25.6 | 40.0 | 29.7 | — | 3.8 | — | — | — | — | — | — | — | 516 | 72 | 9.2 |
| EXAMPLE 14-4 | 25.6 | 40.0 | 29.7 | — | — | 3.8 | — | — | — | — | — | — | 521 | 72 | 9.7 |
| EXAMPLE 14-5 | 25.2 | 39.3 | 29.7 | — | — | — | 5.0 | — | — | — | — | — | 527 | 67 | 9.5 |
| EXAMPLE 14-6 | 25.2 | 39.3 | 29.7 | — | — | — | — | 5.0 | — | — | — | — | 509 | 69 | 9.8 |
| EXAMPLE 14-7 | 25.5 | 39.9 | 29.7 | — | — | — | — | — | 4.0 | — | — | — | 522 | 71 | 9.8 |
| EXAMPLE 14-8 | 25.2 | 39.3 | 29.7 | — | — | — | — | — | — | 5.0 | — | — | 552 | 68 | 9.6 |
| EXAMPLE 14-9 | 25.2 | 39.3 | 29.7 | 4.0 | — | — | — | — | — | — | 1.0 | — | 504 | 75 | 9.3 |
| EXAMPLE 14-10 | 23.2 | 36.3 | 29.7 | — | — | — | — | — | — | — | — | 9.9 | 451 | 77 | 9.4 |
| EXAMPLE 14-11 | 21.3 | 33.2 | 29.7 | — | — | — | — | — | — | — | — | 14.9 | 438 | 76 | 9.9 |
| EXAMPLE 14-12 | 20.5 | 32.0 | 29.7 | — | — | — | — | — | — | — | — | 16.8 | 348 | 62 | 9.3 |

$\frac{Co}{Sn+Co} = 39$ wt %

As shown in Tables 16 and 17, in Examples 14-2 through 14-11, the cycle characteristics could be improved as in the case of Examples 11-2 through 11-8. In other words, it was found out that when the size of the crystalline phase of CoSn was 10 nm or less, and the anode active material included at least one kind selected from the group consisting of titanium, molybdenum, niobium, aluminum, germanium, indium, phosphorus, gallium and bismuth within a range of 14.9 wt % or less, even in the case where the carbon content was 29.7 wt %, the cycle characteristics could be further improved.

Examples 15-1 Through 15-8

Coin type secondary batteries were formed as in the case of Examples 1-1 through 1-8, except that instead of the liquid electrolyte solution, an electrolyte layer made of a gel electrolyte was formed on the surfaces of the test electrode 61 an the counter electrode 63. In other words, anode active materials synthesized through mixing cobalt, tin and carbon at the same material ratios as those in Examples 1-1 through 1-8 as shown in Table 18 were used for the test electrode 61. Moreover, the electrolyte layer was formed through the following steps. At first, a copolymer of vinylidene fluoride and hexafluoropropylene as a high molecular weight compound, and diethyl carbonate as a mixed solvent were mixed with an electrolyte solution formed through mixing ethylene carbonate and propylene carbonate as solvents and $LiPF_6$ as the electrolyte salt at a weight ratio of ethylene carbonate:propylene carbonate:$LiPF_6$=11.5:11.5:4 so as to have a weight ratio of the electrolyte solution:the high molecular weight compound:the mixed solvent=27:10:60, thereby a precursor solution was formed. The molecular weight of the copolymer of vinylidene fluoride and hexafluoropropylene was 600000. The obtained precursor solution was uniformly applied to the facing surfaces of the test electrode 61 and the counter electrode 63, and they were left for 6 hours at a room temperature to volatilize diethyl carbonate, thereby the gel electrolyte layer was formed.

TABLE 18

| | MATERIAL RATIO (WT %) | | | ANALYTICAL VALUE (WT %) | | | INITIAL CHARGE CAPACITY (mAh/g) | CAPACITY RETENTION RATIO (%) | CRYSTALLINE PHASE (nm) |
|---|---|---|---|---|---|---|---|---|---|
| | Co | Sn | C | Co | Sn | C | | | |
| EXAMPLE 15-1 | 33.3 | 56.7 | 10.0 | 33.0 | 56.1 | 9.9 | 481 | 65 | 9.6 |
| EXAMPLE 15-2 | 31.5 | 53.5 | 15.0 | 31.1 | 53.0 | 14.9 | 483 | 69 | 9.3 |
| EXAMPLE 15-3 | 30.7 | 52.3 | 17.0 | 30.4 | 51.8 | 16.8 | 495 | 71 | 8.9 |
| EXAMPLE 15-4 | 30.3 | 51.7 | 18.0 | 30.1 | 51.3 | 17.8 | 502 | 74 | 8.6 |
| EXAMPLE 15-5 | 29.6 | 50.4 | 20.0 | 29.3 | 49.9 | 19.8 | 506 | 81 | 7.8 |
| EXAMPLE 15-6 | 28.9 | 49.1 | 22.0 | 28.6 | 48.7 | 21.8 | 506 | 79 | 7.6 |
| EXAMPLE 15-7 | 27.8 | 47.2 | 25.0 | 27.5 | 46.8 | 24.8 | 508 | 79 | 7.5 |
| EXAMPLE 15-8 | 25.9 | 44.1 | 30.0 | 25.6 | 43.7 | 29.7 | 483 | 69 | 9.8 |
| COMPARATIVE EXAMPLE 15-1 | 37.0 | 63.0 | 0 | 36.6 | 62.4 | 0 | 422 | 0 | 21.2 |
| COMPARATIVE EXAMPLE 15-2 | 36.8 | 62.7 | 0.5 | 36.4 | 62.1 | 0.5 | 427 | 7 | 19.5 |
| COMPARATIVE EXAMPLE 15-3 | 34.0 | 58.0 | 8.0 | 33.7 | 57.4 | 7.9 | 468 | 26 | 12.7 |
| COMPARATIVE EXAMPLE 15-4 | 22.2 | 37.8 | 40.0 | 22.0 | 37.4 | 39.6 | 395 | 14 | 14.4 |

$\frac{Co}{Sn+Co} = 37$ wt %

The initial charge capacities of the obtained coin type secondary batteries were measured as in the case of Examples 1-1 through 1-8. The results are shown in Table 18 and FIG. 20.

Moreover, secondary batteries shown in FIGS. 5 and 6 were formed. At first, the cathode 33 and the anode 34 were formed as in the case of Examples 1-1 through 1-8, and the cathode lead 31 and the anode lead 32 were attached.

Next, the above-described precursor solution was uniformly applied to the cathode 33 and the anode 34, and they were left for 6 hours at a room temperature to volatilize diethyl carbonate, thereby the gel electrolyte layer 36 was formed.

After that, the cathode 33 and the anode 34 were laminated with the separator 35 in between such that the surfaces of the cathode 33 and the anode 34 on which the electrolyte layer 36 was formed faced each other, thereby a laminate was formed, and the laminate was spirally wound to form the spirally wound electrode body 30.

The obtained spirally wound electrode body 30 was vacuum-sealed in the package members 40 made of a damp-proof aluminum laminate film so as to form the secondary batteries shown in FIGS. 5 and 6.

The cycle characteristics of the secondary batteries were measured as in the case of Examples 1-1 through 1-8. The results are shown in Table 18 and FIG. 20.

As Comparative Examples 15-1 through 15-4 relative to Examples 15-1 through 15-8, secondary batteries were formed as in the case of Examples 15-1 through 15-8, except that anode active materials synthesized through mixing cobalt, tin and carbon at a material ratio shown in Table 18, that is, anode active materials synthesized as in the case of Comparative Examples 1-1 through 1-4 were used.

The initial charge capacities and the cycle characteristics of the obtained secondary batteries of Comparative Examples 15-1 through 15-4 were measured. The results are shown in Table 18 and FIG. 20.

It is evident from Table 18 and FIG. 20 that the same results as those in Examples 1-1 through 1-8 were obtained. In other words, it was found out that even if the gel electrolyte was used, in the case where the size of the crystalline phase of CoSn was 10 nm or less, and the carbon content was within a range from 9.9 wt % to 29.7 wt % inclusive, the capacity and the cycle characteristics could be improved, and the carbon content was more preferably within a range from 14.9 wt % to 29.7 wt % inclusive, and more preferably within a range from 16.8 wt % to 24.8 wt % inclusive.

Examples 16-1 Through 16-6, 17-1 Through 17-6, 18-1 Through 18-6

As Examples 16-1 through 16-6, secondary batteries were formed as in the case of Examples 15-1 through 15-8, except that as shown in Table 19, anode active materials in which the material ratio of carbon was fixed to 10 wt %, and the Co/(Sn+Co) ratio was changed within a range from 30 wt % to 70 wt % inclusive, that is, anode active materials synthesized as in the case of Examples 2-1 through 2-6 were used. Moreover, as Comparative Examples 16-1 through 16-2 relative to Examples 16-1 through 16-6, secondary batteries were formed as in the case of Examples 16-1 through 16-6, except that as shown in Table 19, anode active materials in which the material ratio of carbon was fixed to 10 wt %, and the Co/(Sn+Co) ratio was 76 wt % or 28 wt %, that is, anode active materials synthesized as in the case of Comparative Examples 2-1 and 2-2 were used.

TABLE 19

| | MATERIAL RATIO (WT%) | | | ANALYTICAL VALUE (WT%) | | | $\frac{Co}{Sn+Co}$ | INITIAL CHARGE CAPACITY (mAh/g) | CAPACITY RETENTION RATIO (%) | CRYSTALLINE PHASE (nm) |
|---|---|---|---|---|---|---|---|---|---|---|
| | Co | Sn | C | Co | Sn | C | | | | |
| EXAMPLE 16-1 | 27.0 | 63.0 | 10.0 | 26.7 | 62.4 | 9.9 | 30 | 519 | 49 | 9.3 |
| EXAMPLE 16-2 | 33.3 | 56.7 | 10.0 | 33.0 | 56.1 | 9.9 | 37 | 478 | 62 | 9.6 |
| EXAMPLE 16-3 | 40.5 | 49.5 | 10.0 | 40.1 | 49.0 | 9.9 | 45 | 443 | 65 | 9.4 |

TABLE 19-continued

|  | MATERIAL RATIO (WT%) | | | ANALYTICAL VALUE (WT%) | | | Co/(Sn+Co) | INITIAL CHARGE CAPACITY (mAh/g) | CAPACITY RETENTION RATIO (%) | CRYSTALLINE PHASE (nm) |
|---|---|---|---|---|---|---|---|---|---|---|
|  | Co | Sn | C | Co | Sn | C |  |  |  |  |
| EXAMPLE 16-4 | 45.0 | 45.0 | 10.0 | 44.6 | 44.6 | 9.9 | 50 | 416 | 71 | 9.0 |
| EXAMPLE 16-5 | 54.0 | 36.0 | 10.0 | 53.5 | 35.6 | 9.9 | 60 | 405 | 73 | 9.1 |
| EXAMPLE 16-6 | 63.0 | 27.0 | 10.0 | 62.4 | 26.7 | 9.9 | 70 | 396 | 75 | 8.8 |
| COMPARATIVE EXAMPLE 16-1 | 68.0 | 22.0 | 10.0 | 67.5 | 21.8 | 9.9 | 76 | 325 | 77 | 8.9 |
| COMPARATIVE EXAMPLE 16-2 | 25.2 | 64.8 | 10.0 | 24.9 | 64.2 | 9.9 | 28 | 524 | 11 | 9.5 |

As Examples 17-1 through 17-6, secondary batteries were formed as in the case of Examples 15-1 through 15-8, except that as shown in Table 20, anode active materials in which the material ratio of carbon was fixed to 20 wt %, and the Co/(Sn+Co) ratio was changed within a range from 30 wt % to 70 wt % inclusive were used. At that time, the anode active materials were synthesized with the same operation time and the same number of revolutions as those in Examples 3-1 through 3-6. Moreover, as Comparative Examples 17-1 and 17-2 relative to Examples 17-1 through 17-6, secondary batteries were formed as in the case of Examples 17-1 through 17-6, except that as shown in Table 20, anode active materials in which the material ratio of carbon was fixed to 20 wt %, and the Co/(Sn+Co) ratio was 72.5 wt % or 28 wt %, that is, anode active materials synthesized as in the case of Comparative Examples 3-1 and 3-2 were used.

TABLE 20

|  | MATERIAL RATIO (WT%) | | | ANALYTICAL VALUE (WT%) | | | Co/(Sn+Co) | INITIAL CHARGE CAPACITY (mAh/g) | CAPACITY RETENTION RATIO (%) | CRYSTALLINE PHASE (nm) |
|---|---|---|---|---|---|---|---|---|---|---|
|  | Co | Sn | C | Co | Sn | C |  |  |  |  |
| EXAMPLE 17-1 | 24.0 | 56.0 | 20.0 | 23.8 | 55.4 | 19.8 | 30 | 539 | 57 | 9.2 |
| EXAMPLE 17-2 | 29.6 | 50.4 | 20.0 | 29.3 | 49.9 | 19.8 | 37 | 503 | 76 | 9.2 |
| EXAMPLE 17-3 | 36.0 | 44.0 | 20.0 | 35.6 | 43.6 | 19.8 | 45 | 463 | 80 | 9.4 |
| EXAMPLE 17-4 | 40.0 | 40.0 | 20.0 | 39.6 | 39.6 | 19.8 | 50 | 437 | 86 | 9.5 |
| EXAMPLE 17-5 | 48.0 | 32.0 | 20.0 | 47.5 | 31.7 | 19.8 | 60 | 423 | 90 | 9.8 |
| EXAMPLE 17-6 | 56.0 | 24.0 | 20.0 | 55.4 | 23.8 | 19.8 | 70 | 412 | 90 | 9.0 |
| COMPARATIVE EXAMPLE 17-1 | 58.0 | 22.0 | 20.0 | 57.4 | 21.8 | 19.8 | 72.5 | 346 | 93 | 9.0 |
| COMPARATIVE EXAMPLE 17-2 | 22.4 | 57.6 | 20.0 | 22.2 | 57.0 | 19.8 | 28 | 550 | 17 | 9.4 |

As Examples 18-1 through 18-6, secondary batteries were formed as in the case of Examples 15-1 through 15-8, except that as shown in Table 21, anode active materials in which the material ratio of carbon was fixed to 30 wt %, and the Co/(Sn+Co) ratio was changed within a range from 30 wt % to 66 wt % inclusive, that is, anode active materials synthesized as in the case of Examples 4-1 through 4-6 were used. Moreover, as Comparative Examples 18-1 and 18-2 relative to Examples 18-1 through 18-6, secondary batteries were formed as in the case of Examples 18-1 through 18-6, except that as shown in Table 21, anode active materials in which the material ratio of carbon was fixed to 30 wt %, and the Co/(Sn+Co) ratio was 71 wt % or 28 wt %, that is, anode active materials synthesized as in the case of Comparative Examples 4-1 and 4-2 were used.

TABLE 21

|  | MATERIAL RATIO (WT%) | | | ANALYTICAL VALUE (WT%) | | | Co/(Sn+Co) | INITIAL CHARGE CAPACITY (mAh/g) | CAPACITY RETENTION RATIO (%) | CRYSTALLINE PHASE (nm) |
|---|---|---|---|---|---|---|---|---|---|---|
|  | Co | Sn | C | Co | Sn | C |  |  |  |  |
| EXAMPLE 18-1 | 21.0 | 49.0 | 30.0 | 20.8 | 48.5 | 29.7 | 30 | 515 | 50 | 9.6 |
| EXAMPLE 18-2 | 25.9 | 44.1 | 30.0 | 25.6 | 43.7 | 29.7 | 37 | 484 | 65 | 9.5 |
| EXAMPLE 18-3 | 31.5 | 38.5 | 30.0 | 31.2 | 38.1 | 29.7 | 45 | 445 | 69 | 9.5 |
| EXAMPLE 18-4 | 35.0 | 35.0 | 30.0 | 34.7 | 34.7 | 29.7 | 50 | 423 | 74 | 9.3 |
| EXAMPLE 18-5 | 42.0 | 28.0 | 30.0 | 41.6 | 27.7 | 29.7 | 60 | 406 | 78 | 9.4 |
| EXAMPLE 18-6 | 46.2 | 23.8 | 30.0 | 45.7 | 23.5 | 29.7 | 66 | 394 | 77 | 9.1 |
| COMPARATIVE EXAMPLE 18-1 | 49.7 | 20.3 | 30.0 | 49.5 | 20.2 | 29.7 | 71 | 327 | 79 | 9.2 |
| COMPARATIVE EXAMPLE 18-2 | 19.6 | 50.4 | 30.0 | 19.4 | 49.9 | 29.7 | 28 | 525 | 18 | 9.5 |

The initial capacities and the cycle characteristics of the obtained secondary batteries of Examples 16-1 through 16-6, 17-1 through 17-6 and 18-1 through 18-6 and Comparative Examples 16-1, 16-2, 17-1, 17-2, 18-1 and 18-2 were measured as in the case of Examples 1-1 through 1-8. The results are shown in Tables 19 through 21 and FIGS. 21 through 23.

Figure 21:
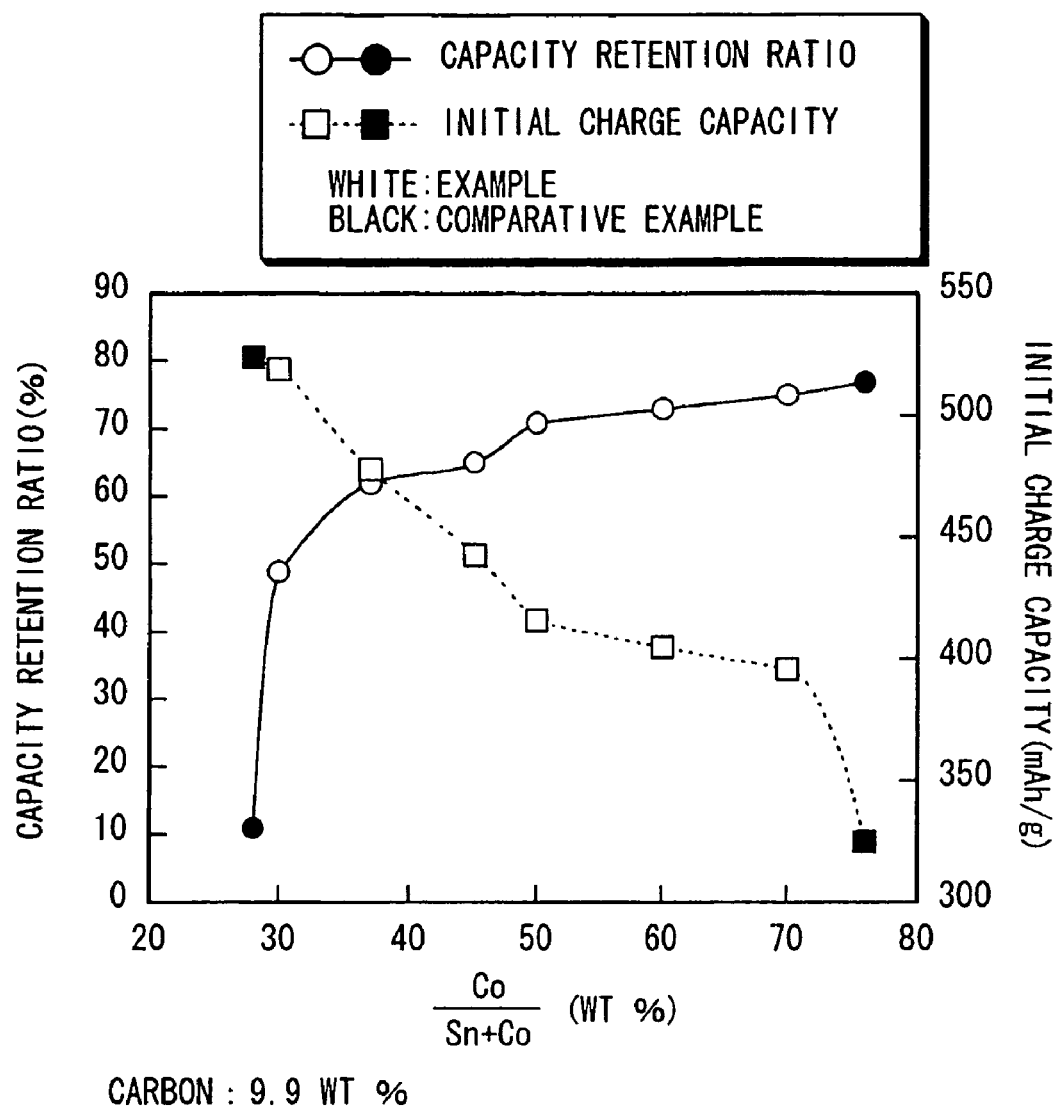
FIG. 21 is another plot showing a relationship between the ratio of cobalt to the total of tin and cobalt in an anode active material, a capacity retention ratio and an initial charge capacity.
Figure 22:
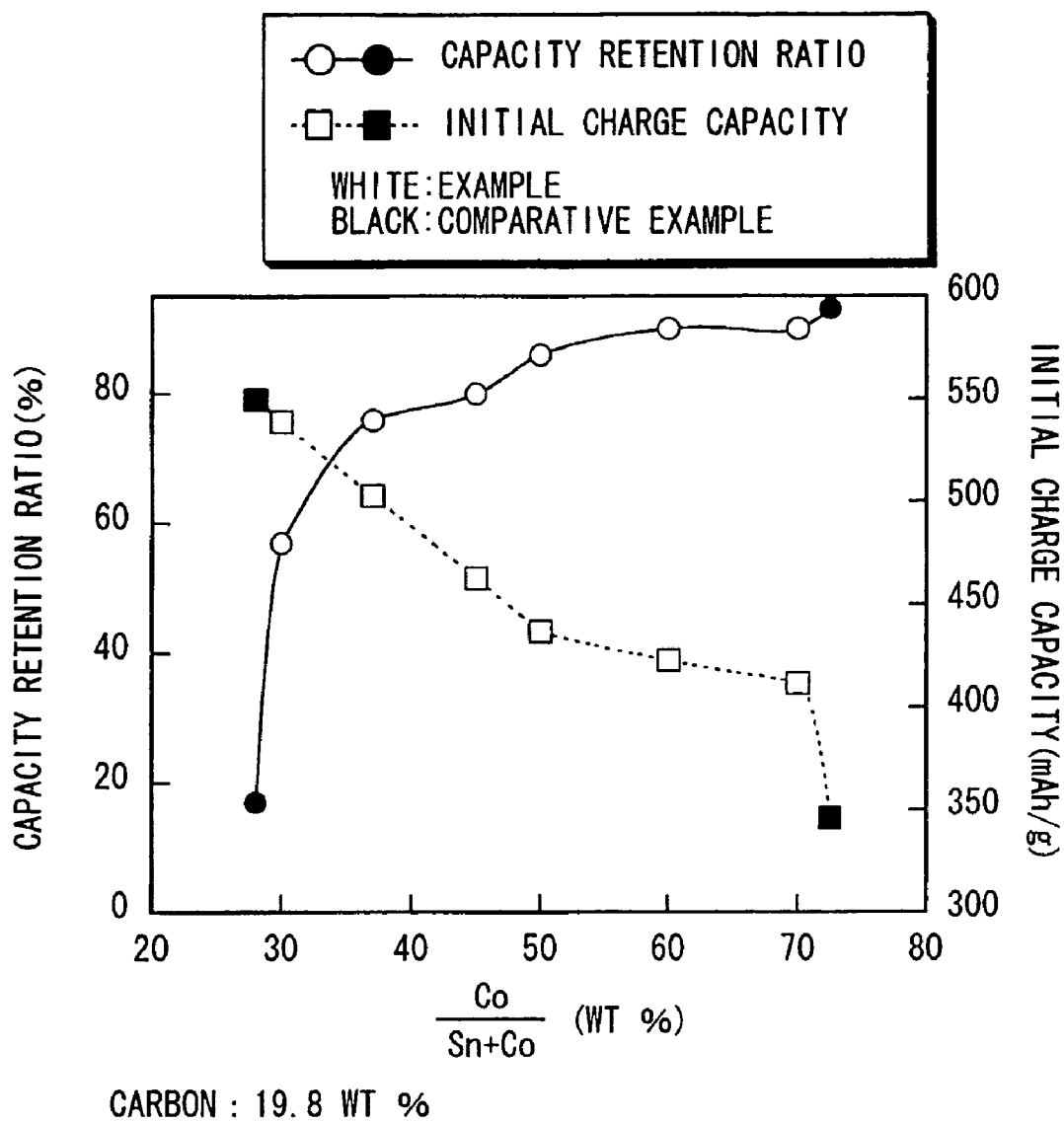
FIG. 22 is another plot showing a relationship between the ratio of cobalt to the total of tin and cobalt in an anode active material, a capacity retention ratio and an initial charge capacity.
Figure 23:
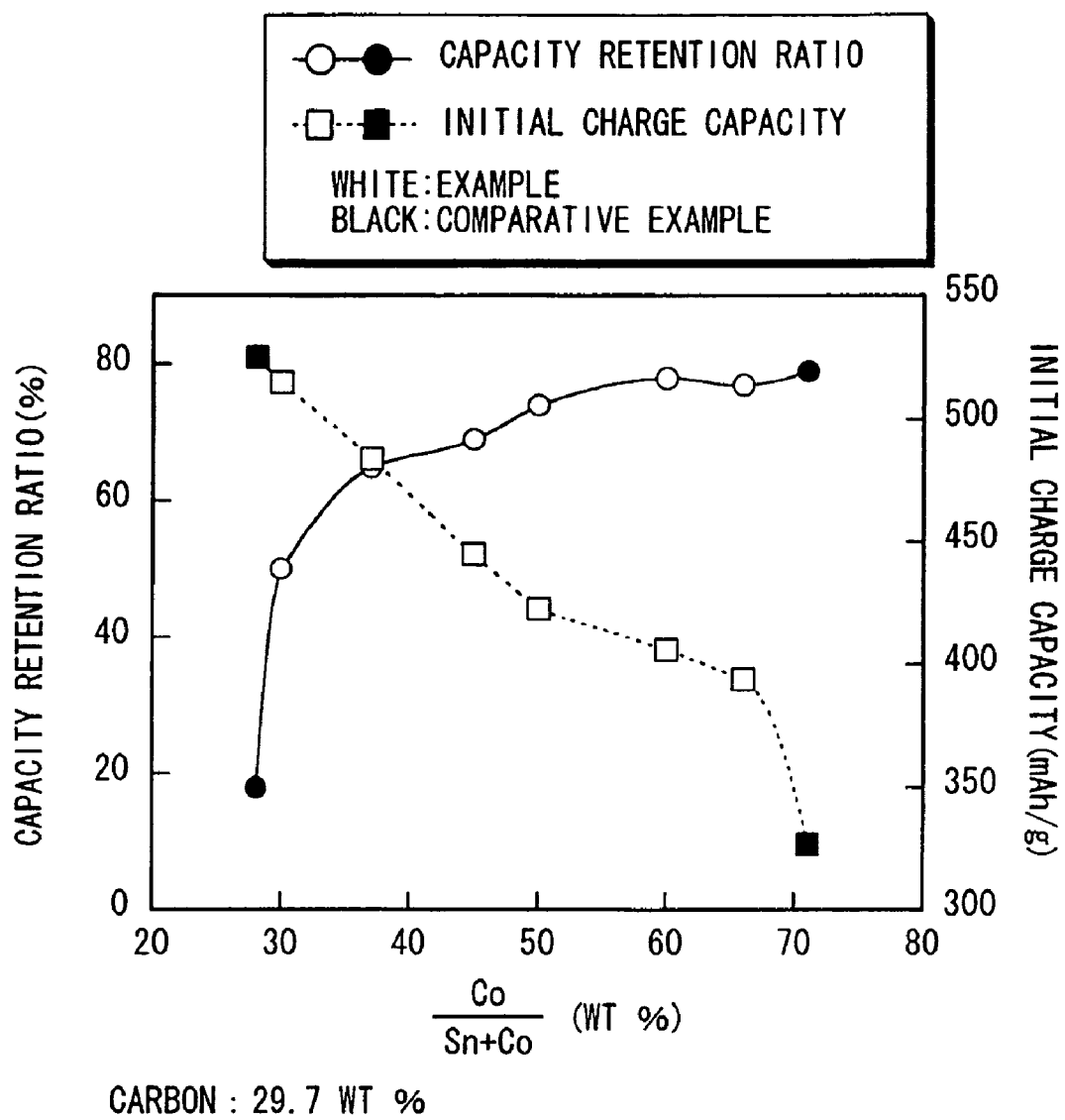
FIG. 23 is another plot showing a relationship between the ratio of cobalt to the total of tin and cobalt in an anode active material, a capacity retention ratio and an initial charge capacity.

It is evident from Tables 19 through 21 and FIGS. 21 through 23 that the same results as those in Examples 2-1 through 2-6, 3-1 through 3-6, and 4-1 through 4-6. In other words, it was found out that when the size of the crystalline phase of CoSn was 10 nm or less, and the Co/(Sn+Co) ratio was within a range from 30 wt % to 70 wt % inclusive, even in the case where the gel electrolyte was used, the capacity and the cycle characteristics could be improved. Moreover, it was found out that the Co/(Sn+Co) ratio was more preferably 60 wt % or less.

Examples 19-1 Through 19-5, 20-1 Through 20-5, 21-1 Through 21-5

Secondary batteries were formed as in the case of Examples 15-1 through 15-8, except that under the conditions that the operation time and the number of revolutions at the time of synthesizing anode active materials were the same as those in Examples 5-1 through 5-5, 6-1 through 6-5 and 7-1 through 7-5, anode active materials in which the size of the crystalline phase of CoSn was changed within a range of 10 nm or less were synthesized. At that time, as shown in Tables 22 through 24, as in the case of Examples 5-1 through 5-5, 6-1 through 6-5 and 7-1 through 7-5, the material ratio of carbon was 10 wt %, 20 wt % or 30 wt %, and the Co/(Sn+Co) ratio was fixed to 36 wt %.

TABLE 22

| | MATERIAL RATIO (WT %) | | | ANALYTICAL VALUE (WT %) | | | INITIAL CHARGE CAPACITY (mAh/g) | CAPACITY RETENTION RATIO (%) | CRYSTALLINE PHASE (nm) |
|---|---|---|---|---|---|---|---|---|---|
| | Co | Sn | C | Co | Sn | C | | | |
| EXAMPLE 19-1 | 32.4 | 57.6 | 10.0 | 32.2 | 57.2 | 9.9 | 484 | 61 | 9.8 |
| EXAMPLE 19-2 | 32.4 | 57.6 | 10.0 | 32.2 | 57.2 | 9.9 | 489 | 63 | 8.1 |
| EXAMPLE 19-3 | 32.4 | 57.6 | 10.0 | 32.2 | 57.2 | 9.9 | 501 | 64 | 6.5 |
| EXAMPLE 19-4 | 32.4 | 57.6 | 10.0 | 32.2 | 57.2 | 9.9 | 521 | 66 | 4.2 |
| EXAMPLE 19-5 | 32.4 | 57.6 | 10.0 | 32.2 | 57.2 | 9.9 | 548 | 67 | 1.5 |
| COMPARATIVE EXAMPLE 19-1 | 32.4 | 57.6 | 10.0 | 32.2 | 57.2 | 9.9 | 418 | 46 | 12.2 |
| COMPARATIVE EXAMPLE 19-2 | 32.4 | 57.6 | 10.0 | 32.2 | 57.2 | 9.9 | 379 | 31 | 16.4 |

$$\frac{Co}{Sn+Co} = 36 \text{ wt \%}$$

TABLE 23

| | MATERIAL RATIO (WT %) | | | ANALYTICAL VALUE (WT %) | | | INITIAL CHARGE CAPACITY (mAh/g) | CAPACITY RETENTION RATIO (%) | CRYSTALLINE PHASE (nm) |
|---|---|---|---|---|---|---|---|---|---|
| | Co | Sn | C | Co | Sn | C | | | |
| EXAMPLE 20-1 | 28.8 | 51.2 | 20.0 | 28.6 | 50.8 | 19.8 | 509 | 77 | 9.9 |
| EXAMPLE 20-2 | 28.8 | 51.2 | 20.0 | 28.6 | 50.8 | 19.8 | 516 | 78 | 8.0 |
| EXAMPLE 20-3 | 28.8 | 51.2 | 20.0 | 28.6 | 50.8 | 19.8 | 517 | 80 | 6.6 |
| EXAMPLE 20-4 | 28.8 | 51.2 | 20.0 | 28.6 | 50.8 | 19.8 | 546 | 81 | 3.8 |
| EXAMPLE 20-5 | 28.8 | 51.2 | 20.0 | 28.6 | 50.8 | 19.8 | 575 | 83 | 1.4 |
| COMPARATIVE EXAMPLE 20-1 | 28.8 | 51.2 | 20.0 | 28.6 | 50.8 | 19.8 | 441 | 53 | 12.0 |
| COMPARATIVE EXAMPLE 20-2 | 28.8 | 51.2 | 20.0 | 28.6 | 50.8 | 19.8 | 406 | 41 | 16.5 |

$$\frac{Co}{Sn+Co} = 36 \text{ wt \%}$$

TABLE 24

| | MATERIAL RATIO (WT %) | | | ANALYTICAL VALUE (WT %) | | | INITIAL CHARGE CAPACITY (mAh/g) | CAPACITY RETENTION RATIO (%) | CRYSTALLINE PHASE (nm) |
|---|---|---|---|---|---|---|---|---|---|
| | Co | Sn | C | Co | Sn | C | | | |
| EXAMPLE 21-1 | 25.2 | 44.8 | 30.0 | 25.0 | 44.4 | 29.7 | 486 | 68 | 10.0 |
| EXAMPLE 21-2 | 25.2 | 44.8 | 30.0 | 25.0 | 44.4 | 29.7 | 495 | 68 | 7.7 |
| EXAMPLE 21-3 | 25.2 | 44.8 | 30.0 | 25.0 | 44.4 | 29.7 | 502 | 70 | 6.8 |
| EXAMPLE 21-4 | 25.2 | 44.8 | 30.0 | 25.0 | 44.4 | 29.7 | 519 | 70 | 4.0 |
| EXAMPLE 21-5 | 25.2 | 44.8 | 30.0 | 25.0 | 44.4 | 29.7 | 550 | 74 | 1.4 |
| COMPARATIVE | 25.2 | 44.8 | 30.0 | 25.0 | 44.4 | 29.7 | 417 | 43 | 12.3 |

TABLE 24-continued

|  | MATERIAL RATIO (WT %) | | | ANALYTICAL VALUE (WT %) | | | INITIAL CHARGE CAPACITY (mAh/g) | CAPACITY RETENTION RATIO (%) | CRYSTALLINE PHASE (nm) |
|---|---|---|---|---|---|---|---|---|---|
|  | Co | Sn | C | Co | Sn | C | | | |
| EXAMPLE 21-1 | | | | | | | | | |
| COMPARATIVE EXAMPLE 21-2 | 25.2 | 44.8 | 30.0 | 25.0 | 44.4 | 29.7 | 381 | 36 | 16.8 |

$\frac{Co}{Sn+Co} = 36$ wt %

As Comparative Examples 19-1, 19-2, 20-1, 20-2, 21-1 and 21-2 relative to Examples 19-1 through 19-5, 20-1 through 20-5 and 21-1 through 21-5, secondary batteries were formed as in the case of Examples 19-1 through 19-5, 20-1 through 20-5 and 21-1 through 21-5, except that the operation time and the number of revolutions at the time of synthesizing anode active materials were the same as those in Comparative Examples 5-1, 5-2, 6-1, 6-2, 7-1 and 7-2, thereby the crystalline phase of CoSn had larger than 10 nm in size, that is, the same anode active materials as those in Comparative Examples 5-1, 5-2, 6-1, 6-2, 7-1 and 7-2 were used.

The initial capacities and the cycle characteristics of the obtained secondary batteries of Examples 19-1 through 19-5, 20-1 through 20-5 and 21-1 through 21-5 and Comparative Examples 19-1, 19-2, 20-1, 20-2, 21-1 and 21-2 were measured as in the case of Examples 1-1 through 1-8. The results are shown in Tables 22 through 24 and FIGS. 24 through 26.

Figure 24:
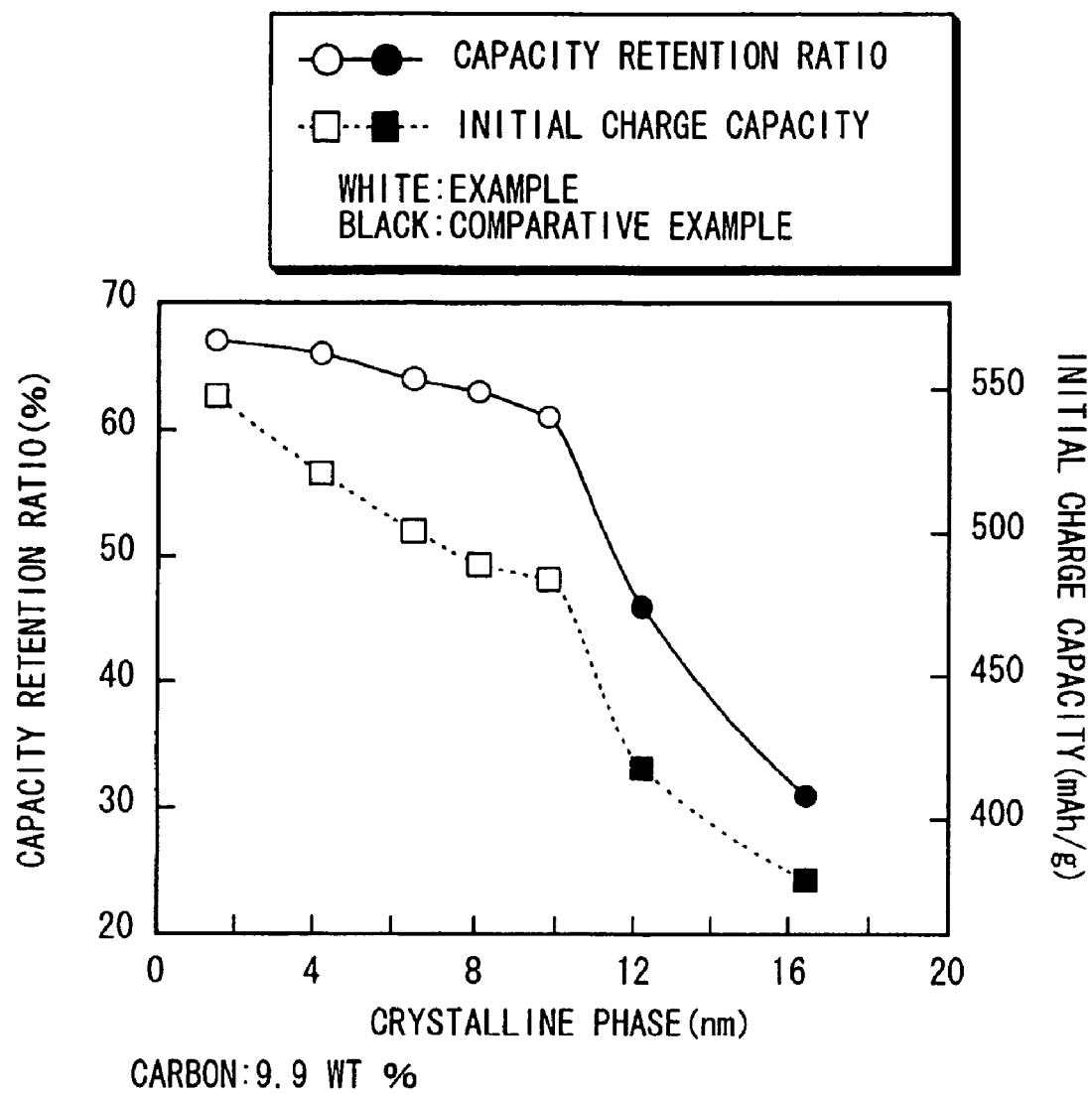
FIG. 24 is another plot showing a relationship between the size of a crystalline phase of CoSn in an anode active material, a capacity retention ratio and an initial charge capacity.
Figure 25:
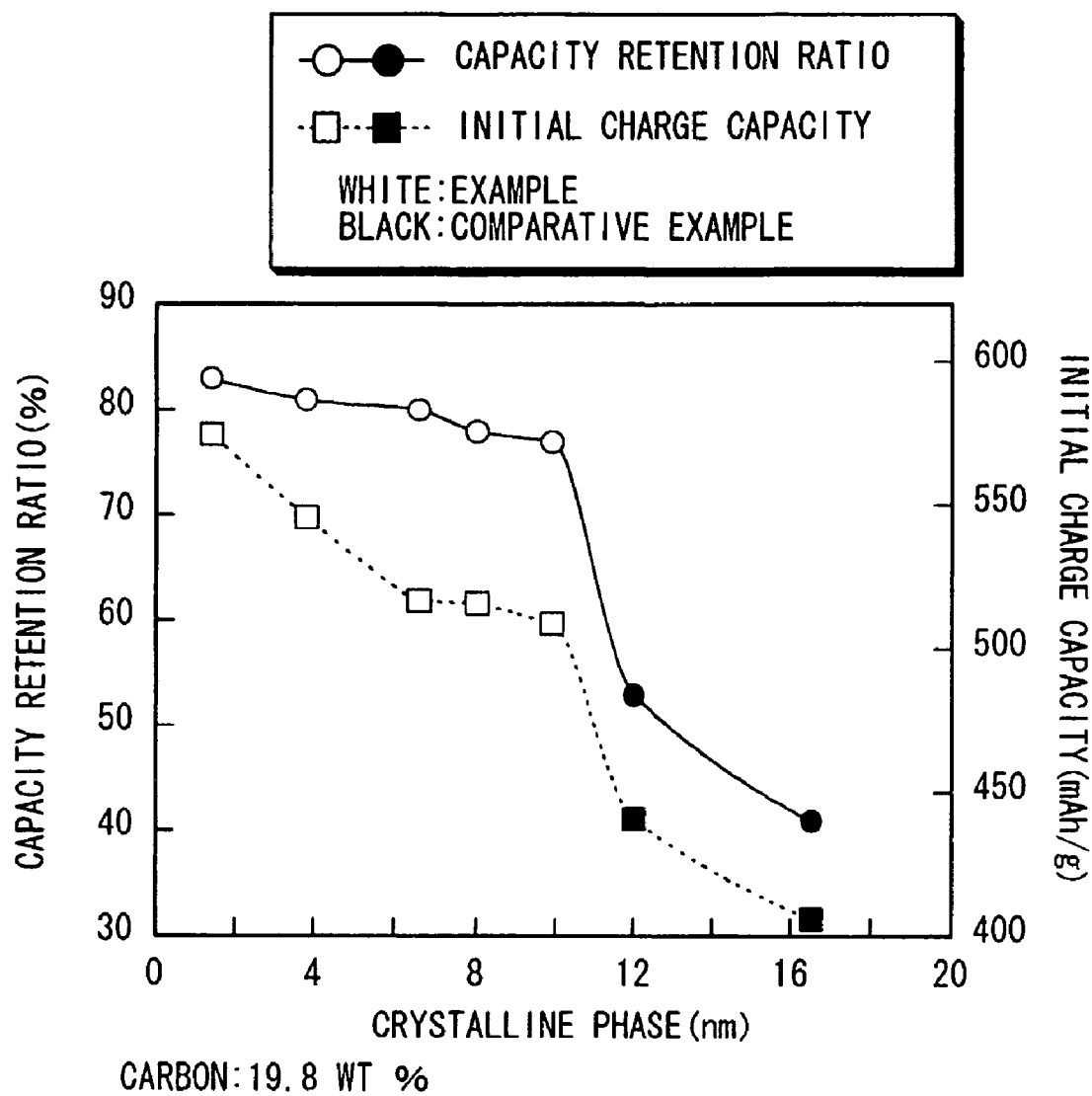
FIG. 25 is another plot showing a relationship between the size of a crystalline phase of CoSn in an anode active material, a capacity retention ratio and an initial charge capacity.
Figure 26:
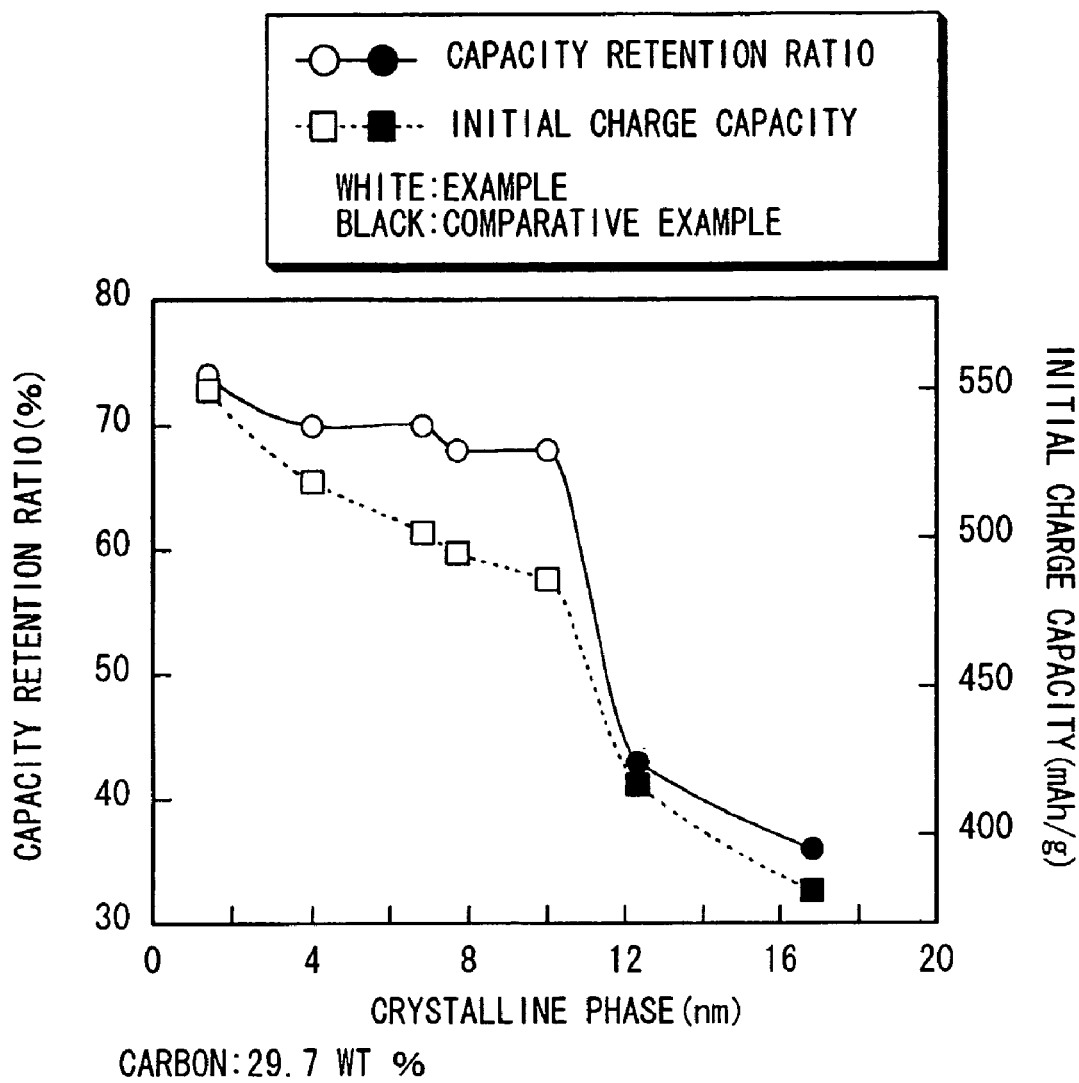
FIG. 26 is another plot showing a relationship between the size of a crystalline phase of CoSn in an anode active material, a capacity retention ratio and an initial charge capacity.

It is obvious from Tables 22 through 24 and FIGS. 24 through 26 that the same results as those in Examples 5-1 through 5-5, 6-1 through 6-5 and 7-1 through 7-5 were obtained. In other words, it was found out that even in the case where the gel electrolyte was used, when the size of the crystalline phase of CoSn was reduced, the capacity and the cycle characteristics could be improved.

Examples 22-1 Through 22-7, 23-1 Through 23-7, 24-1 Through 24-7

As Examples 22-1 through 22-7, secondary batteries were formed as in the case of Examples 15-1 through 15-8, except that as shown in Table 25, anode active materials in which as the material ratios of cobalt, tin, carbon and silicon, the material ratio of silicon was changed within a range from 0 wt % to 8.0 wt % inclusive, and the Co/(Sn+Co) ratio was fixed to 37 wt %, and the material ratio of carbon was fixed to 10 wt % were synthesized, that is, anode active materials were synthesized as in the case of Examples 8-1 through 8-7.

TABLE 25

|  | MATERIAL RATIO (WT %) | | | | ANALYTICAL VALUE (WT %) | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|
|  | Co | Sn | C | Si | Co | Sn | C | Si | | | |
| EXAMPLE 22-1 | 33.3 | 56.7 | 10.0 | 0 | 33.0 | 56.1 | 9.9 | 0 | 467 | 61 | 9.7 |
| EXAMPLE 22-2 | 33.2 | 56.4 | 10.0 | 0.4 | 32.9 | 56.0 | 9.9 | 0.4 | 473 | 59 | 9.4 |
| EXAMPLE 22-3 | 33.1 | 56.4 | 10.0 | 0.5 | 32.8 | 55.8 | 9.9 | 0.5 | 495 | 60 | 9.4 |
| EXAMPLE 22-4 | 32.9 | 56.1 | 10.0 | 1.0 | 32.6 | 55.6 | 9.9 | 1.0 | 511 | 55 | 9.6 |
| EXAMPLE 22-5 | 32.2 | 54.8 | 10.0 | 3.0 | 31.9 | 54.3 | 9.9 | 3.0 | 522 | 53 | 9.3 |
| EXAMPLE 22-6 | 31.5 | 53.5 | 10.0 | 5.0 | 31.1 | 53.0 | 9.9 | 4.9 | 545 | 48 | 9.5 |
| EXAMPLE 22-7 | 30.3 | 51.7 | 10.0 | 8.0 | 30.1 | 51.2 | 9.9 | 7.9 | 574 | 42 | 9.4 |

$\frac{Co}{Sn+Co} = 37$ wt %

As Examples 23-1 through 23-7, secondary batteries were formed as in the case of Examples 15-1 through 15-8, except that as shown in Table 26, anode active materials in which as the material ratios of cobalt, tin, carbon and silicon, the material ratio of silicon was changed within a range from 0 wt % to 8.0 wt %, the Co/(Sn+Co) ratio was fixed to 37 wt %, and the material ratio of carbon was fixed to 20 wt % were synthesized, that is, anode active materials were synthesized as in the case of Examples 9-1 through 9-7.

It is evident from Table 25 through 27 that the same results as those in Examples 8-1 through 8-7, 9-1 through 9-7 and 10-1 through 10-7 were obtained. In other words, it was found out that even in the case where the gel electrolyte was used, when the size of the crystalline phase of CoSn was 10 nm or less, and the anode active material included silicon, the capacity could be improved, and the silicon content was preferably within a range from 0.5 wt % to 7.9 wt % inclusive.

TABLE 26

| | MATERIAL RATIO (WT %) | | | | ANALYTICAL VALUE (WT %) | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|
| | Co | Sn | C | Si | Co | Sn | C | Si | | | |
| EXAMPLE 23-1 | 29.6 | 50.4 | 20.0 | 0   | 29.3 | 49.9 | 19.8 | 0   | 497 | 74 | 9.8 |
| EXAMPLE 23-2 | 29.5 | 50.1 | 20.0 | 0.4 | 29.1 | 49.5 | 19.8 | 0.4 | 499 | 72 | 9.6 |
| EXAMPLE 23-3 | 29.4 | 50.1 | 20.0 | 0.5 | 29.1 | 49.6 | 19.8 | 0.5 | 516 | 73 | 9.5 |
| EXAMPLE 23-4 | 29.2 | 49.8 | 20.0 | 1.0 | 28.9 | 49.3 | 19.8 | 1.0 | 534 | 68 | 9.6 |
| EXAMPLE 23-5 | 28.5 | 48.5 | 20.0 | 3.0 | 28.2 | 48.0 | 19.8 | 3.0 | 547 | 62 | 9.4 |
| EXAMPLE 23-6 | 27.7 | 47.3 | 20.0 | 5.0 | 27.6 | 46.9 | 19.8 | 4.9 | 568 | 54 | 9.8 |
| EXAMPLE 23-7 | 26.6 | 45.4 | 20.0 | 8.0 | 26.4 | 44.9 | 19.8 | 7.9 | 601 | 50 | 9.7 |

$\frac{Co}{Sn+Co} = 37$ wt %

As Examples 24-1 through 24-7, secondary batteries were formed as in the case of Examples 15-1 through 15-8, except that as shown in Table 27, anode active materials in which as the material ratios of cobalt, tin, carbon and silicon, the material ratio of silicon was changed within a range from 0 wt % to 8.0 wt %, the Co/(Sn+Co) ratio was fixed to 37 wt %, and the material ratio of carbon was fixed to 30 wt % were synthesized, that is, anode active materials were synthesized as in the case of Examples 10-1 through 10-7.

Examples 25-1 Through 25-9

Secondary batteries were formed as in the case of Examples 15-1 through 15-8, except that anode active materials in which as the material ratios of cobalt, tin, carbon and titanium, as shown in Table 28, the material ratio of titanium

TABLE 27

| | MATERIAL RATIO (WT %) | | | | ANALYTICAL VALUE (WT %) | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|
| | Co | Sn | C | Si | Co | Sn | C | Si | | | |
| EXAMPLE 24-1 | 25.9 | 44.1 | 30.0 | 0   | 25.6 | 43.7 | 29.7 | 0   | 472 | 67 | 9.7 |
| EXAMPLE 24-2 | 25.8 | 43.8 | 30.0 | 0.4 | 25.6 | 43.5 | 29.7 | 0.4 | 474 | 66 | 9.5 |
| EXAMPLE 24-3 | 25.7 | 43.8 | 30.0 | 0.5 | 25.5 | 43.4 | 29.7 | 0.5 | 494 | 63 | 9.4 |
| EXAMPLE 24-4 | 25.5 | 43.5 | 30.0 | 1.0 | 25.3 | 43.1 | 29.7 | 1.0 | 510 | 59 | 9.5 |
| EXAMPLE 24-5 | 24.8 | 42.2 | 30.0 | 3.0 | 24.6 | 41.9 | 29.7 | 3.0 | 524 | 55 | 9.8 |
| EXAMPLE 24-6 | 24.1 | 40.9 | 30.0 | 5.0 | 23.9 | 40.6 | 29.7 | 4.9 | 543 | 49 | 9.6 |
| EXAMPLE 24-7 | 22.9 | 39.1 | 30.0 | 8.0 | 22.8 | 38.8 | 29.7 | 7.9 | 576 | 46 | 9.7 |

$\frac{Co}{Sn+Co} = 37$ wt %

The initial capacities and the cycle characteristics of the obtained secondary batteries of Examples 22-1 through 22-7, 23-1 through 23-7 and 24-1 through 24-7 were measured as in the case of Examples 1-1 through 1-8. The results are shown in Tables 25 through 27.

was changed within a range from 0 wt % to 15.0 wt % inclusive, and the Co/(Sn+Co) ratio was fixed to 39 wt % and the material ratio of carbon was fixed to 20 wt % were synthesized, that is, anode active materials were synthesized as in the case of Examples 11-1 through 11-9.

TABLE 28

| | MATERIAL RATIO (WT %) | | | | ANALYTICAL VALUE (WT %) | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|
| | Co | Sn | C | Ti | Co | Sn | C | Ti | | | |
| EXAMPLE 25-1 | 31.2 | 48.8 | 20.0 | 0 | 31.0 | 48.4 | 19.8 | 0 | 485 | 64 | 9.8 |
| EXAMPLE 25-2 | 30.2 | 47.3 | 20.0 | 2.5 | 30.0 | 46.9 | 19.8 | 2.4 | 506 | 81 | 9.7 |
| EXAMPLE 25-3 | 29.5 | 46.5 | 20.0 | 4.0 | 29.3 | 45.9 | 19.8 | 4.0 | 518 | 85 | 9.6 |
| EXAMPLE 25-4 | 28.9 | 45.1 | 20.0 | 6.0 | 28.6 | 44.7 | 19.8 | 6.0 | 526 | 87 | 9.5 |
| EXAMPLE 25-5 | 28.1 | 43.9 | 20.0 | 8.0 | 27.8 | 43.5 | 19.8 | 7.9 | 534 | 89 | 9.3 |
| EXAMPLE 25-6 | 27.3 | 42.7 | 20.0 | 10.0 | 27.1 | 42.4 | 19.8 | 9.9 | 506 | 88 | 9.3 |
| EXAMPLE 25-7 | 26.1 | 40.9 | 20.0 | 13.0 | 25.9 | 40.5 | 19.8 | 12.9 | 471 | 86 | 9.2 |
| EXAMPLE 25-8 | 25.4 | 39.6 | 20.0 | 15.0 | 25.2 | 39.3 | 19.8 | 14.9 | 453 | 83 | 9.1 |
| EXAMPLE 25-9 | 25.0 | 39.0 | 20.0 | 16.0 | 24.8 | 28.7 | 19.8 | 15.8 | 439 | 63 | 8.9 |

$\frac{Co}{Sn+Co} = 39$ wt %

Figure 27:
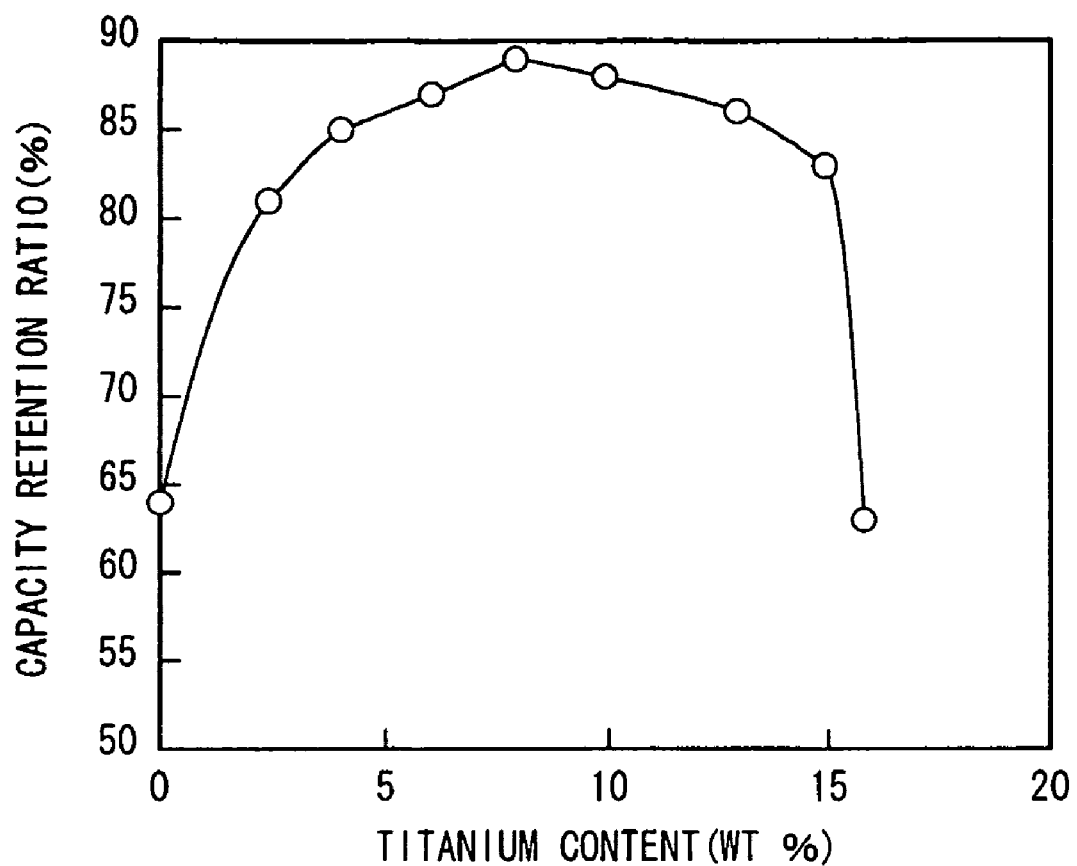
FIG. 27 is another plot showing a relationship between the titanium content in an anode active material and a capacity retention ratio.

The initial capacities and the cycle characteristics of the obtained secondary batteries of Examples 25-1 through 25-9 were measured as in the case of Examples 1-1 through 1-8. The results are shown in Tables 28 and FIG. 27.

It is evident from Table 28 that the same results as those in Examples 11-1 through 11-9 were obtained. In other words, even in the case where the gel electrolyte was used, when the size of the crystalline phase of CoSn was 10 nm or less, and the anode active material included titanium within a range of 14.9 wt % or less, the cycle characteristics could be further improved, and the titanium content was more preferably 2.4 wt % or more, and more preferably within a range from 4.0 wt % to 12.9 wt % inclusive.

Examples 26-1 Through 26-12, 27-1 Through 27-10, 28-1 Through 28-12

As Examples 26-1 through 26-12, secondary batteries were formed as in the case of Examples 15-1 through 15-8, except that anode active materials in which as the material ratios of cobalt, tin, carbon, titanium, molybdenum, niobium, aluminum, germanium, indium, phosphorus, gallium and bismuth, as shown in Table 29, the material ratio of titanium, molybdenum, niobium, aluminum, germanium, indium, phosphorus, titanium and gallium, or bismuth was 0 wt %, 3.8 wt %, 4.0 wt %, 5.0 wt %, 10.0 wt %, 15.0 wt % or 17.0 wt %, the Co/(Sn+Co) ratio was fixed to 39 wt %, and the material ratio of carbon was fixed to 10 wt % were synthesized, that is, anode active materials were synthesized as in the case of Examples 12-1 through 12-12. The initial charge capacities and the cycle characteristics of the obtained secondary batteries of Examples 26-1 through 26-12 were determined as in the case of Examples 1-1 through 1-8. The results are shown in Table 30.

TABLE 29

| | MATERIAL RATIO (WT %) | | | | | | | | | | | |
|---|---|---|---|---|---|---|---|---|---|---|---|---|
| | Co | Sn | C | Ti | Mo | Nb | Al | Ge | In | P | Ga | Bi |
| EXAMPLE 26-1 | 35.1 | 54.9 | 10.0 | — | — | — | — | — | — | — | — | — |
| EXAMPLE 26-2 | 33.5 | 52.5 | 10.0 | 4.0 | — | — | — | — | — | — | — | — |
| EXAMPLE 26-3 | 33.6 | 52.6 | 10.0 | — | 3.8 | — | — | — | — | — | — | — |
| EXAMPLE 26-4 | 33.6 | 52.6 | 10.0 | — | — | 3.8 | — | — | — | — | — | — |
| EXAMPLE 26-5 | 33.2 | 51.8 | 10.0 | — | — | — | 5.0 | — | — | — | — | — |
| EXAMPLE 26-6 | 33.2 | 51.8 | 10.0 | — | — | — | — | 5.0 | — | — | — | — |
| EXAMPLE 26-7 | 33.5 | 52.5 | 10.0 | — | — | — | — | — | 4.0 | — | — | — |
| EXAMPLE 26-8 | 33.2 | 51.8 | 10.0 | — | — | — | — | — | — | 5.0 | — | — |
| EXAMPLE 26-9 | 33.2 | 51.8 | 10.0 | 4.0 | — | — | — | — | — | — | 1.0 | — |
| EXAMPLE 26-10 | 31.2 | 48.8 | 10.0 | — | — | — | — | — | — | — | — | 10.0 |
| EXAMPLE 26-11 | 29.3 | 45.7 | 10.0 | — | — | — | — | — | — | — | — | 15.0 |
| EXAMPLE 26-12 | 28.5 | 44.5 | 10.0 | — | — | — | — | — | — | — | — | 17.0 |

$\frac{Co}{Sn+Co} = 39$ wt %

TABLE 30

| | ANALYTICAL VALUE (WT %) | | | | | | | | | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|---|---|---|---|
| | Co | Sn | C | Ti | Mo | Nb | Al | Ge | In | P | Ga | Bi | | | |
| EXAMPLE 26-1 | 34.8 | 54.4 | 9.9 | — | — | — | — | — | — | — | — | — | 473 | 63 | 9.5 |

TABLE 30-continued

| | ANALYTICAL VALUE (WT %) | | | | | | | | | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|---|---|---|---|
| | Co | Sn | C | Ti | Mo | Nb | Al | Ge | In | P | Ga | Bi | | | |
| EXAMPLE 26-2 | 33.2 | 52.0 | 9.9 | 4.0 | — | — | — | — | — | — | — | — | 504 | 70 | 9.3 |
| EXAMPLE 26-3 | 33.3 | 52.1 | 9.9 | — | 3.8 | — | — | — | — | — | — | — | 498 | 70 | 9.6 |
| EXAMPLE 26-4 | 33.3 | 52.1 | 9.9 | — | — | 3.8 | — | — | — | — | — | — | 504 | 69 | 9.8 |
| EXAMPLE 26-5 | 32.9 | 51.4 | 9.9 | — | — | — | 5.0 | — | — | — | — | — | 506 | 68 | 9.4 |
| EXAMPLE 26-6 | 32.9 | 51.4 | 9.9 | — | — | — | — | 5.0 | — | — | — | — | 492 | 69 | 9.5 |
| EXAMPLE 26-7 | 33.2 | 52.0 | 9.9 | — | — | — | — | — | 4.0 | — | — | — | 511 | 69 | 9.2 |
| EXAMPLE 26-8 | 32.9 | 51.4 | 9.9 | — | — | — | — | — | — | 5.0 | — | — | 539 | 68 | 9.4 |
| EXAMPLE 26-9 | 32.9 | 51.4 | 9.9 | 4.0 | — | — | — | — | — | — | 1.0 | — | 484 | 71 | 9.7 |
| EXAMPLE 26-10 | 30.9 | 48.4 | 9.9 | — | — | — | — | — | — | — | — | 9.9 | 433 | 74 | 9.3 |
| EXAMPLE 26-11 | 29.0 | 45.3 | 9.9 | — | — | — | — | — | — | — | — | 14.9 | 418 | 73 | 9.3 |
| EXAMPLE 26-12 | 28.2 | 44.1 | 9.9 | — | — | — | — | — | — | — | — | 16.8 | 324 | 60 | 9.5 |

$\frac{Co}{Sn+Co} = 39$ wt %

As Examples 27-1 through 27-10, secondary batteries were formed as in the case of Examples 15-1 through 15-8, except that anode active materials in which as the material ratios of cobalt, tin, carbon, molybdenum, niobium, aluminum, germanium, indium, phosphorus, titanium, gallium and bismuth, as shown in Table 31, the material ratio of molybdenum, niobium, aluminum, germanium, indium, phosphorus, titanium and gallium, or bismuth was 3.8 wt %, 4.0 wt %, 5.0 wt %, 10.0 wt %, 15.0 wt % or 17.0 wt %, and the Co/(Sn+Co) ratio was fixed to 39 wt %, and the material ratio of carbon was fixed to 20 wt % were synthesized, that is, anode active materials were synthesized as in the case of Examples 13-1 through 13-10. The initial charge capacities and the cycle characteristics of the obtained secondary batteries of Examples 27-1 through 27-10 were determined as in the case of Examples 1-1 through 1-8. The results are shown in Table 32.

TABLE 31

| | MATERIAL RATIO (WT %) | | | | | | | | | | | |
|---|---|---|---|---|---|---|---|---|---|---|---|---|
| | Co | Sn | C | Ti | Mo | Nb | Al | Ge | In | P | Ga | Bi |
| EXAMPLE 25-1 | 31.2 | 48.8 | 20.0 | — | — | — | — | — | — | — | — | — |
| EXAMPLE 25-2 | 29.6 | 46.4 | 20.0 | 4.0 | — | — | — | — | — | — | — | — |
| EXAMPLE 27-1 | 29.7 | 46.5 | 20.0 | — | 3.8 | — | — | — | — | — | — | — |
| EXAMPLE 27-2 | 29.7 | 46.5 | 20.0 | — | — | 3.8 | — | — | — | — | — | — |
| EXAMPLE 27-3 | 29.3 | 45.7 | 20.0 | — | — | — | 5.0 | — | — | — | — | — |
| EXAMPLE 27-4 | 29.3 | 45.7 | 20.0 | — | — | — | — | 5.0 | — | — | — | — |
| EXAMPLE 27-5 | 29.6 | 46.4 | 20.0 | — | — | — | — | — | 4.0 | — | — | — |
| EXAMPLE 27-6 | 29.3 | 45.7 | 20.0 | — | — | — | — | — | — | 5.0 | — | — |
| EXAMPLE 27-7 | 29.3 | 45.7 | 20.0 | 4.0 | — | — | — | — | — | — | 1.0 | — |
| EXAMPLE 27-8 | 27.3 | 42.7 | 20.0 | — | — | — | — | — | — | — | — | 10.0 |
| EXAMPLE 27-9 | 25.4 | 39.6 | 20.0 | — | — | — | — | — | — | — | — | 15.0 |
| EXAMPLE 27-10 | 24.6 | 38.4 | 20.0 | — | — | — | — | — | — | — | — | 17.0 |

$\frac{Co}{Sn+Co} = 39$ wt %

TABLE 32

| | ANALYTICAL VALUE (WT %) | | | | | | | | | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|---|---|---|---|
| | Co | Sn | C | Ti | Mo | Nb | Al | Ge | In | P | Ga | Bi | | | |
| EXAMPLE 25-1 | 31.0 | 48.4 | 19.8 | — | — | — | — | — | — | — | — | — | 485 | 64 | 9.8 |
| EXAMPLE 25-3 | 29.4 | 46.0 | 19.8 | 4.0 | — | — | — | — | — | — | — | — | 518 | 85 | 9.6 |
| EXAMPLE 27-1 | 29.5 | 46.1 | 19.8 | — | 3.8 | — | — | — | — | — | — | — | 520 | 83 | 9.1 |
| EXAMPLE 27-2 | 29.5 | 46.1 | 19.8 | — | — | 3.8 | — | — | — | — | — | — | 525 | 85 | 9.8 |
| EXAMPLE 27-3 | 29.1 | 45.4 | 19.8 | — | — | — | 5.0 | — | — | — | — | — | 533 | 82 | 9.7 |
| EXAMPLE 27-4 | 29.1 | 45.4 | 19.8 | — | — | — | — | 5.0 | — | — | — | — | 514 | 82 | 9.9 |
| EXAMPLE 27-5 | 29.4 | 46.0 | 19.8 | — | — | — | — | — | 4.0 | — | — | — | 531 | 85 | 9.4 |
| EXAMPLE 27-6 | 29.1 | 45.4 | 19.8 | — | — | — | — | — | — | 5.0 | — | — | 558 | 77 | 9.7 |
| EXAMPLE 27-7 | 29.1 | 45.4 | 19.8 | 4.0 | — | — | — | — | — | — | 1.0 | — | 508 | 88 | 9.5 |
| EXAMPLE 27-8 | 27.1 | 42.4 | 19.8 | — | — | — | — | — | — | — | — | 9.9 | 455 | 91 | 9.6 |
| EXAMPLE 27-9 | 25.2 | 39.3 | 19.8 | — | — | — | — | — | — | — | — | 14.9 | 438 | 90 | 9.7 |
| EXAMPLE 27-10 | 24.4 | 38.1 | 19.8 | — | — | — | — | — | — | — | — | 16.8 | 345 | 62 | 9.7 |

$$\frac{Co}{Sn + Co} = 39 \text{ wt \%}$$

As Examples 28-1 through 28-12, secondary batteries were formed as in the case of Examples 15-1 through 15-8, except that anode active materials in which as the material ratio of cobalt, tin, carbon, titanium, molybdenum, niobium, aluminum, germanium, indium, phosphorus, gallium and bismuth, as shown in Table 33, the material ratio of titanium, molybdenum, niobium, aluminum, germanium, indium, phosphorus, titanium and gallium, or bismuth was 0 wt %, 3.8 wt %, 4.0 wt %, 5.0 wt %, 10.0 wt %, 15.0 wt % or 17.0 wt %, and the Co/(Sn+Co) ratio was fixed to 39 wt %, and the material ratio of carbon was fixed to 30 wt % were synthesized, that is, anode active materials were synthesized as in the case of Examples 14-1 through 14-12. The initial charge capacities and the cycle characteristics of the obtained secondary batteries of Examples 28-1 through 28-12 were determined as in the case of Examples 1-1 through 1-8. The results are shown in Table 34.

TABLE 33

| | MATERIAL RATIO (WT %) | | | | | | | | | | | |
|---|---|---|---|---|---|---|---|---|---|---|---|---|
| | Co | Sn | C | Ti | Mo | Nb | Al | Ge | In | P | Ga | Bi |
| EXAMPLE 28-1 | 27.3 | 42.7 | 30.0 | — | — | — | — | — | — | — | — | — |
| EXAMPLE 28-2 | 25.7 | 40.3 | 30.0 | 4.0 | — | — | — | — | — | — | — | — |
| EXAMPLE 28-3 | 25.8 | 40.4 | 30.0 | — | 3.8 | — | — | — | — | — | — | — |
| EXAMPLE 28-4 | 25.8 | 40.4 | 30.0 | — | — | 3.8 | — | — | — | — | — | — |
| EXAMPLE 28-5 | 25.4 | 39.6 | 30.0 | — | — | — | 5.0 | — | — | — | — | — |
| EXAMPLE 28-6 | 25.4 | 39.6 | 30.0 | — | — | — | — | 5.0 | — | — | — | — |
| EXAMPLE 28-7 | 25.7 | 40.3 | 30.0 | — | — | — | — | — | 4.0 | — | — | — |
| EXAMPLE 28-8 | 25.4 | 39.6 | 30.0 | — | — | — | — | — | — | 5.0 | — | — |
| EXAMPLE 28-9 | 25.4 | 39.6 | 30.0 | 4.0 | — | — | — | — | — | — | 1.0 | — |
| EXAMPLE 28-10 | 23.4 | 36.6 | 30.0 | — | — | — | — | — | — | — | — | 10.0 |
| EXAMPLE 28-11 | 21.5 | 33.5 | 30.0 | — | — | — | — | — | — | — | — | 15.0 |
| EXAMPLE 28-12 | 20.7 | 32.3 | 30.0 | — | — | — | — | — | — | — | — | 17.0 |

$$\frac{Co}{Sn + Co} = 39 \text{ wt \%}$$

TABLE 17

| | ANALYTICAL VALUE (WT %) | | | | | | | | | | | INITIAL CHARGE CAPACITY (mAh/g) | CAPACITY RETENTION RATIO (%) | CRYSTALLINE PHASE (nm) |
|---|---|---|---|---|---|---|---|---|---|---|---|---|---|---|
| | Co | Sn | C | Ti | Mo | Nb | Al | Ge | In | P | Ga | Bi | | | |
| EXAMPLE 28-1 | 27.1 | 42.3 | 29.7 | — | — | — | — | — | — | — | — | — | 475 | 66 | 9.5 |
| EXAMPLE 28-2 | 25.5 | 39.9 | 29.7 | 4.0 | — | — | — | — | — | — | — | — | 505 | 73 | 9.3 |
| EXAMPLE 28-3 | 25.6 | 40.0 | 29.7 | — | 3.8 | — | — | — | — | — | — | — | 497 | 74 | 9.2 |
| EXAMPLE 28-4 | 25.6 | 40.0 | 29.7 | — | — | 3.8 | — | — | — | — | — | — | 502 | 73 | 9.7 |
| EXAMPLE 28-5 | 25.2 | 39.3 | 29.7 | — | — | — | 5.0 | — | — | — | — | — | 509 | 69 | 9.5 |
| EXAMPLE 28-6 | 25.2 | 39.3 | 29.7 | — | — | — | — | 5.0 | — | — | — | — | 492 | 70 | 9.8 |
| EXAMPLE 28-7 | 25.5 | 39.9 | 29.7 | — | — | — | — | — | 4.0 | — | — | — | 501 | 73 | 9.8 |
| EXAMPLE 28-8 | 25.2 | 39.3 | 29.7 | — | — | — | — | — | — | 5.0 | — | — | 536 | 69 | 9.6 |
| EXAMPLE 8-9 | 25.2 | 39.3 | 29.7 | 4.0 | — | — | — | — | — | — | 1.0 | — | 485 | 76 | 9.3 |
| EXAMPLE 28-10 | 23.2 | 36.3 | 29.7 | — | — | — | — | — | — | — | — | 9.9 | 434 | 80 | 9.4 |
| EXAMPLE 28-11 | 21.3 | 33.2 | 29.7 | — | — | — | — | — | — | — | — | 14.9 | 419 | 77 | 9.9 |
| EXAMPLE 28-12 | 20.5 | 32.0 | 29.7 | — | — | — | — | — | — | — | — | 16.8 | 326 | 63 | 9.3 |

$$\frac{Co}{Sn+Co} = 39 \text{ wt \%}$$

It is evident from Tables 29 through 34 that the same results as those in Examples 12-1 through 12-12, 13-1 through 13-10, 14-1 through 14-12 were obtained. In other words, it was found out that even in the case where the gel electrolyte was used, when the size of the crystalline phase of CoSn was 10 nm or less, and the anode active material included at least one kind selected from the group consisting of titanium, molybdenum, niobium, aluminum, germanium, indium, phosphorus, gallium and bismuth within a range of 2.4 wt % or less, the cycle characteristics could be further improved.

Although the invention is described referring to the embodiment and the examples, the invention is not limited to the embodiment and the examples, and can be variously modified. For example, in the above-described embodiment and the above-described examples, the invention is described referring to the secondary batteries with a coin shape, a sheet shape and a spirally winding structure; however, the invention can be applied to a secondary battery with any other shape using a button-shaped package member, a prismatic-shaped package member or the like, and a secondary battery having a laminate structure in which a plurality of cathodes and a plurality of anodes are laminated.

Moreover, in the embodiment and the examples, the case where lithium was used as an electrode reactant is described; however, the invention can be applied to the case where any other Group 1 element such as sodium (Na) or potassium (K) in the long form of the periodic table of the elements, a Group 2 element such as magnesium or calcium (Ca) in the long form of the periodic table of the elements, other light metal such as aluminum, or an alloy including lithium or any of the above-described materials is used, as long as the materials can react with the anode active material, and the same effects can be obtained. At this time, a cathode active material capable of inserting and extracting the electrode reactant, a nonaqueous solvent or the like is selected according to the electrode reactant.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode active material, comprising:
    tin, cobalt and carbon,
    wherein a carbon content ranges from 9.9 wt % to 29.7 wt %, a tin content ranges from 23.8 wt % to 39.6 wt %, and a cobalt content ranges from 39.6 wt % to 55.4 wt % such that a ratio of cobalt to a total of tin and cobalt ranges from 50 wt % to 70 wt %,
    wherein the anode active material includes a crystalline phase of an intermetallic compound of cobalt and tin, and
    wherein a size of the crystalline phase measured by a small-angle X-ray scattering is 10 nm or less.

2. An anode active material according to claim 1, wherein a 1 s peak of carbon is obtained in a region lower than 284.5 eV by X-ray photoelectron spectroscopy.

3. An anode active material according to claim 1, further comprising silicon.

4. An anode active material according to claim 3, wherein a silicon content ranges from 0.5 wt % to 7.9 wt %.

5. An anode active material according to claim 1, further comprising at least one constituent selected from the group consisting of indium, niobium, germanium, titanium, molybdenum, aluminum, phosphorus, gallium and bismuth at 14.9 wt % or less.

6. An anode active material according to claim 5, wherein at least one constituent selected from the group consisting of indium, niobium, germanium, titanium, molybdenum, aluminum, phosphorus, gallium and bismuth at 2.4 wt % or more.

7. A battery, comprising:
a cathode;
an anode; and
an electrolyte,
wherein the anode includes an anode active material that includes tin, cobalt and carbon,
wherein a carbon content in the anode active material ranges from about 9.9 wt % to about 29.7 wt %, a tin content ranges from 23.8 wt % to 39.6 wt %, and a cobalt content ranges from 39.6 wt % to 55.4 wt % such that a ratio of cobalt to a total of tin and cobalt ranges from about 50 wt % to about 70 wt %,
wherein the anode active material includes a crystalline phase of an intermetallic compound of cobalt and tin, and
wherein a size of the crystalline phase measured by small-angle X-ray scattering is about 10 nm or less.

8. A battery according to claim 7, wherein a 1s peak of carbon is obtained in a region lower than 284.5 eV by X-ray photoelectron spectroscopy.

9. A battery according to claim 7, wherein the anode active material further includes silicon.

10. A battery according to claim 9, wherein a silicon content in the anode active material ranges from about 0.5 wt % to about 7.9 wt %.

11. A battery according to claim 7, wherein the anode active material further includes at least one constituent selected from the group consisting of indium, niobium, germanium, titanium, molybdenum, aluminum, phosphorus, gallium and bismuth at about 14.9 wt % or less.

12. A battery according to claim 11, wherein the anode active material includes at least one constituent selected from the group consisting of indium, niobium, germanium, titanium, molybdenum, aluminum, phosphorus, gallium and bismuth at about 2.4 wt % or more.

13. An anode active material according to claim 1, wherein the tin, cobalt and carbon constitute a first component of the anode active material,
the anode active material further comprising a second component of the anode active material that is a carbon material capable of inserting and extracting lithium,
wherein a ratio of the second component to the first component is within a range from 1 wt % to 95 wt %.

14. An anode material according to claim 1, wherein the tin, cobalt and carbon constitute a first component of the anode active material,
the anode active material further comprising a second component of the anode active material that is a carbon material capable of inserting and extracting lithium,
wherein a ratio of the second component to the first component is about 7:2.

15. A battery according to claim 7, wherein the tin, cobalt and carbon constitute a first component of the anode active material,
the anode active material further comprising a second component of the anode active material that is a carbon material capable of inserting and extracting lithium,
wherein a ratio of the second component to the first component is within a range from 1 wt % to 95 wt %.

16. A battery material according to claim 7, wherein the tin, cobalt and carbon constitute a first component of the anode active material,
the anode active material further comprising a second component of the anode active material that is a carbon material capable of inserting and extracting lithium,
wherein a ratio of the second component to the first component is about 7:2.

17. An anode active material according to claim 1, wherein a capacity retention ratio measured as 100×(the discharge capacity in the 300th cycle/discharge capacity in the second cycle) is about 85% to 90%.

18. An anode active material according to claim 17, wherein an initial charge capacity ranges from about 428 to about 454 mAh/g.

19. A battery according to claim 7, wherein a capacity retention ratio measured as 100×(the discharge capacity in the 300th cycle/discharge capacity in the second cycle) is about 85% to 90%.

20. A battery according to claim 19, wherein an initial charge capacity ranges from about 428 to about 454 mAh/g.

21. An anode active material according to claim 1, wherein the crystalline phase of an intermetallic compound of cobalt and tin is a crystalline phase of CoSn.

22. A battery according to claim 7, wherein the crystalline phase of an intermetallic compound of cobalt and tin is a crystalline phase of CoSn.

* * * * *